United States Patent
Kim

(10) Patent No.: US 11,382,053 B2
(45) Date of Patent: Jul. 5, 2022

(54) DEVICE AND METHOD FOR PERFORMING WIRELESS BACKHAUL COMMUNICATION IN WIRELESS COMMUNICATION SYSTEM

(71) Applicant: Samsung Electronics Co., Ltd., Suwon-si (KR)

(72) Inventor: Yung Soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 16/758,177

(22) PCT Filed: Oct. 24, 2018

(86) PCT No.: PCT/KR2018/012631
§ 371 (c)(1),
(2) Date: Apr. 22, 2020

(87) PCT Pub. No.: WO2019/083272
PCT Pub. Date: May 2, 2019

(65) Prior Publication Data
US 2020/0337000 A1    Oct. 22, 2020

(30) Foreign Application Priority Data
Oct. 24, 2017  (KR) .................. 10-2017-0138593

(51) Int. Cl.
*H04W 56/00* (2009.01)
*H04L 43/0864* (2022.01)
*H04W 24/08* (2009.01)

(52) U.S. Cl.
CPC ....... *H04W 56/001* (2013.01); *H04L 43/0864* (2013.01); *H04W 24/08* (2013.01); *H04W 56/0065* (2013.01)

(58) Field of Classification Search
CPC ............... H04W 56/001; H04W 24/08; H04W 56/0065; H04W 56/00; H04L 43/0864; H04J 11/00
See application file for complete search history.

(56) References Cited

U.S. PATENT DOCUMENTS

| | | | |
|---|---|---|---|
| 2010/0232285 A1* | 9/2010 | Lee ...................... | H04B 7/2606 370/329 |
| 2011/0018766 A1* | 1/2011 | Steer ......................... | G01S 5/04 342/368 |

(Continued)

FOREIGN PATENT DOCUMENTS

| KR | 10-2014-0035255 A | 3/2014 |
|---|---|---|
| KR | 10-2016-0008960 A | 1/2016 |
| KR | 10-2017-0030608 A | 3/2017 |

OTHER PUBLICATIONS

"Qin Ye et al. , : CN 109150338 B Published on Oct. 9, 2020, : CN 201710463304 A Filed on Jun. 16, 2017, IP.com machine translation retrieved on Dec. 7, 2021" (Year: 2020).*

(Continued)

*Primary Examiner* — Afshawn M Towfighi

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). An operating method of a base station in a wireless communication system includes: transmitting, to at least one node, information related to a transmission time for time synchronization of a wireless backhaul signal and a wireless access signal related to the base station; receiving, from the at least one node, at least one signal transmitted in accordance with the transmission time; and removing, from the at least one signal, interference between the wireless backhaul signal and the wireless access signal. The at least one signal (Continued)

includes the wireless backhaul signal and/or the wireless access signal.

19 Claims, 30 Drawing Sheets

(56) References Cited

U.S. PATENT DOCUMENTS

| | | |
|---|---|---|
| 2012/0063396 A1 | 3/2012 | Rayment et al. |
| 2012/0142364 A1 | 6/2012 | Duan |
| 2014/0073337 A1* | 3/2014 | Hong .................... H04W 16/28 |
| | | 455/452.1 |
| 2015/0038183 A1 | 2/2015 | Callard et al. |
| 2017/0195920 A1* | 7/2017 | Fan ....................... H04W 16/10 |
| 2017/0230893 A1 | 8/2017 | Miao et al. |
| 2017/0366984 A1* | 12/2017 | Na ........................ H04W 76/28 |
| 2020/0119821 A1* | 4/2020 | Qin ........................ H04B 7/088 |
| 2020/0351052 A1* | 11/2020 | Au .................... H04L 27/26025 |

OTHER PUBLICATIONS

ISA/KR, International Search Report and Written Opinion of the International Searching Authority, International Application No. PCT/KR2018/012631, dated Jan. 2, 2019, 12 pages.

* cited by examiner

DEVICE AND METHOD FOR PERFORMING WIRELESS BACKHAUL COMMUNICATION IN WIRELESS COMMUNICATION SYSTEM

CROSS-REFERENCE TO RELATED APPLICATIONS

This application is a 371 National Stage of International Application No. PCT/KR2018/012631, filed Oct. 24, 2018, which claims priority to Korean Patent Application No. 10-2017-0138593, filed Oct. 24, 2017, the disclosures of which are herein incorporated by reference in their entirety.

BACKGROUND

1. Field

The disclosure generally relates to a wireless communication system and, more particularly, to a device and method for performing wireless backhaul communication in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, a wireless backhaul network is considered. In this case, a base station may communicate with another base station via a wireless backhaul channel. Specifically, the base station may transmit a wireless backhaul signal to another base station and may receive a wireless backhaul signal from another base station, via a wireless backhaul channel. The base station may receive a wireless access signal from a terminal, or may transmit a wireless access signal to the terminal. When the base station concurrently transmits or receives a wireless backhaul signal and a wireless access signal, or receives, while transmitting one of a wireless backhaul signal and a wireless access signal, receives the other signal, interference may occur between the wireless backhaul signal and the wireless access signal.

SUMMARY

Based on the foregoing discussion, the disclosure provides a device and method for performing wireless backhaul communication in a wireless communication system.

The disclosure provides the device and method for reducing interference between the wireless access signal and the wireless backhaul signal in the wireless communication system.

The disclosure provides the device and method for time-synchronization of the wireless access signal and the wireless backhaul signal in the wireless communication system.

The disclosure provides the device and method for adjusting transmit time advance (TTA) of an uplink signal such that the wireless access signal and the wireless backhaul signal are time-synchronized with each other in the wireless communication system.

Technical Solution

According to various embodiments of the disclosure, an operating method of a base station in a wireless communication system includes: transmitting, to at least one node, information relating to a transmission time point for time-synchronization of a wireless access signal and a wireless backhaul signal related to the base station; receiving, from the at least one node, at least one signal transmitted in accordance with the transmission time point; and removing, from the at least one signal, interference between the wireless backhaul signal and the wireless access signal. The at least one signal includes at least one of the wireless backhaul signal and the wireless access signal.

According to various embodiments of the disclosure, an operation method of a terminal in a wireless communication system includes: receiving, from a base station, information relating to a transmission time point for time-synchronization of a wireless access signal and a wireless backhaul signal related to the base station; and transmitting, to the base station, the wireless access signal in accordance with the transmission time point.

According to various embodiments of the disclosure, a base station device in a wireless communication system includes: a transceiver configured to transmit, to at least one node, information relating to a transmission time point for time-synchronization of a wireless access signal and a wireless backhaul signal related to a base station, and receive, from the at least one node, at least one signal transmitted in accordance with the transmission time point; and a controller configured to remove, from the at least one signal, interference between the wireless backhaul signal and the wireless access signal. The at least one signal includes at least one of the wireless backhaul signal and the wireless access signal.

According to various embodiments of the disclosure, a terminal device in a wireless communication system includes a transceiver configured to receive, from a base station, information relating to a transmission time point for time-synchronization of a wireless backhaul signal and a wireless access signal related to the base station, and transmit the wireless access signal to the base station in accordance with the transmission time point.

Advantageous Effects

A device and method according to various embodiments of the disclosure may adjust transmit time advance (TTA) of an uplink signal such that a wireless access signal and a wireless backhaul signal are time-synchronized with each other, thereby enabling a base station to efficiently remove interference between the wireless access signal and the wireless backhaul signal, and easily identify a desired signal.

Effects which can be acquired by the disclosure are not limited to the above described effects, and other effects that have not been mentioned may be clearly understood by those skilled in the art from the following description.

DETAILED DESCRIPTION

Figure 1:
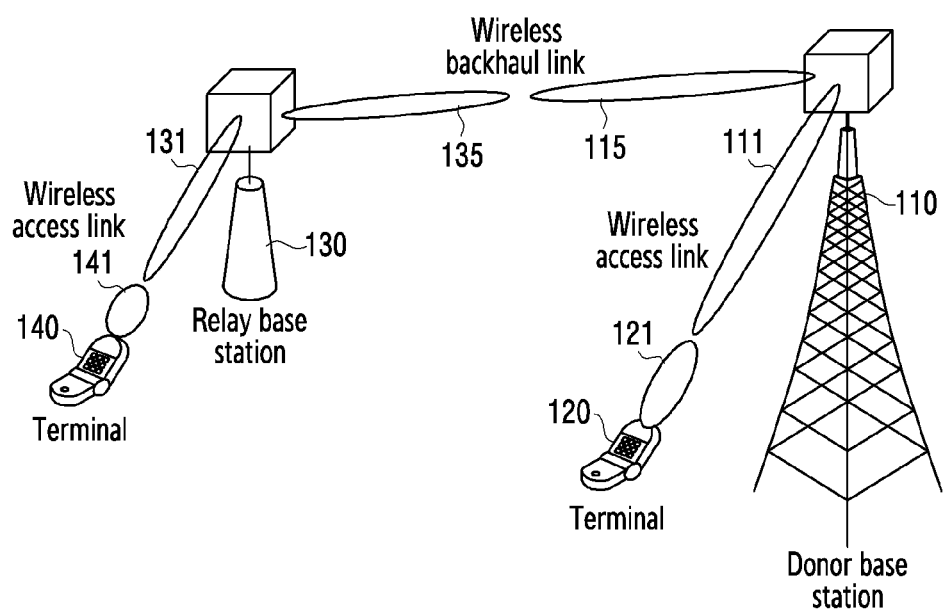
FIG. 1 illustrates a wireless communication system according to various embodiments of the disclosure.

The terms used in the disclosure are only used to describe specific embodiments, and are not intended to limit the disclosure. A singular expression may include a plural expression unless they are definitely different in context. Unless defined otherwise, all terms used herein, including technical and scientific terms, have the same meanings as those commonly understood by a person skilled in the art to which the disclosure pertains. Such terms as those defined in a generally used dictionary may be interpreted to have the meanings identical or similar to the contextual meanings in the relevant field of art, and are not to be interpreted to have ideal or excessively formal meanings unless clearly defined in the disclosure. In some cases, even the terms defined in the disclosure should not be interpreted to exclude embodiments.

Hereinafter, various embodiments will be described based on an approach of hardware. However, various embodiments include a technology that uses both hardware and software and thus, the various embodiments may not exclude the perspective of software.

The disclosure, hereinafter, relates to a device and method for reducing interference related to wireless backhaul communication in a wireless communication system. Specifically, the disclosure describes a technique for removing interference between a wireless access signal and a wireless backhaul signal in the wireless communication system.

Hereinafter, terms referring to a signal to be used, terms referring to a channel, terms referring to control information, terms referring to network entities, terms referring to elements of a device, and the like are illustrated for convenience of explanation. Accordingly, the disclosure is not limited to the following terms and other terms having the same technical meaning may be used.

The disclosure describes various embodiments by using terms used in some communication specifications (e.g., 3rd Generation Partnership Project (3GPP)), but this is merely illustrative. Various embodiments may also be easily modified and applied to other communication systems.

Hereinafter, definitions of terms used in the disclosure are as follows.

A "donor base station" refers to a base station that provides access to another base station via a wireless backhaul channel, and a "relay base station" refers to a base station that accesses another base station via the wireless backhaul channel. In other words, the donor base station refers to a base station that transmits a downlink signal to a relay base station via a wireless backhaul channel, and the relay base station refers to a base station that receives the downlink signal from the donor base station via the wireless backhaul channel.

A "wireless backhaul signal" refers to a signal transmitted or received via the wireless backhaul channel between the donor base station and the relay base station. According to various embodiments of the disclosure, the wireless backhaul signal may be also referred to as a "backhaul signal" or an "inter-BS signal".

A "wireless access signal" refers to a signal transmitted or received via a wireless backhaul channel between a terminal and a base station. According to various embodiments of the disclosure, the wireless access signal may be also referred to as an "access signal" or an "inter-BS signal".

A "reference synchronization time" may be defined with respect to a terminal or a base station. For example, the reference synchronization time point of a terminal refers to a point of time at which the terminal receives a downlink signal from a base station when the terminal receives a synchronization signal and is time-synchronized with the base station. The reference synchronization time point of the base station refers to a point of time at which the base station transmits a downlink signal to the terminal. In the wireless backhaul communication, a reference synchronization time point of a relay base station refers to a point of time at which the relay base station receives a downlink signal from a donor base station when the relay base station receives a synchronization signal from the donor base station and is time-synchronized with the donor base station. The relay base station may transmit a downlink signal to a terminal or another relay base station at the reference synchronization time point. The reference synchronization time point of the donor base station refers to a point of time at which the donor base station transmits a downlink signal to the terminal, or the relay base station.

"Transmit time advance (TTA)" refers to a time offset of a point of time, at which a certain node transmits an uplink signal, with respect to a reference synchronization time point of the node. For example, if TTA for a certain node has a positive value, the node transmits an uplink signal at a time point preceding, by the TTA, a reference synchronization time point. On the other hand, if TTA for a certain node has a negative value, the node transmits an uplink signal at a time point delayed by the TTA compared to the reference synchronization time point. As the above description, the sign of the TTA is defined as an example, and the sign of the TTA may be defined in reverse. Since a transmission time point of an uplink signal may be determined according to TTA, in the disclosure, the TTA may be used to have the same meaning as the transmission time point of the uplink signal. TTA may be referred to as time advance (TA).

"Receive time advance (RTA)" refers to a time offset of a point of time, at which a certain node receives an uplink signal, with respect to a reference synchronization time point of the node. For example, if RTA for a certain node has a positive value, the node receives an uplink signal at a time point preceding, by the RTA, a reference synchronization time point. On the other hand, if RTA for a certain node has a negative value, the node receives an uplink signal at a time point delayed by the RTA compared to the reference synchronization time point. As the above description, the sign of the RTA is defined as an example, and the sign of the RTA may be defined in reverse. Since a reception time point of an uplink signal may be determined according to RTA, in the disclosure, the RTA may be used to have the same meaning as the reception time point of the uplink signal.

A "round-trip time (RTT)" refers to a time taken for a signal to travel a round-trip distance between two nodes performing communication.

A "signal related to a base station" refers to a signal received or transmitted by the base station.

"Time-synchronization of signals" means that, with respect to a certain node related the signals, reception time points and transmission time points of the signals or a transmission time point and a reception time point of the signal match each other. In various embodiments of the disclosure, time-synchronization of signals may be used to have the same meaning as time-synchronization of subframes for the signals.

A "communication situation" indicates a direction in which a signal is transmitted or received in each of communication links defined in a wireless communication system.

Definitions of the described terms are exemplary and may be replaced with other terms having equivalent meanings. In the disclosure, the definitions of the described terms do not limit the scope of rights.

FIG. 1 illustrates a wireless communication system according to various embodiments of the disclosure. FIG. 1 illustrates a base station 110, a terminal 120, a base station 130, and a terminal 140, as a part of nodes using a wireless channel in the wireless communication system.

The base station 110 and the base station 130 are network infrastructures that provide wireless connections to the terminal 120 and the terminal 140, respectively. The base station 110 and/or the base station 130 have coverage defined as a predetermined geographic area on the basis of a distance in which a signal may be transmitted. The base station 110 and/or the base station 130 may be referred to as, in addition to a base station, an "access point (AP)", an "eNodeB (eNB)", a "$5^{th}$ generation (5G) node", a "wireless point", a "transmission/reception point (TRP)", or another term having an equivalent technical meaning.

Each of the terminal 120 and the terminal 140 is a device used by a user, wherein the terminal 120 may communicate with the base station 110 via a wireless channel, and the terminal 140 may communicate with the base station 130. In some cases, at least one of the terminal 120 and the terminal 140 may be operated without involvement of a user. That is, at least one of the terminal 120 and the terminal 140 is a device that performs machine type communication (MTC) and may not be carried by a user. Each of the terminal 120 and the terminal 140 may be referred to as, in addition to a terminal, a "user equipment (UE)", a "mobile station", a "subscriber station", a "remote terminal", a "wireless terminal", a "user device", or other terms having equivalent technical meanings.

The base station 110, the terminal 120, the base station 130, and the terminal 140 may transmit and receive wireless signals in a millimeter wave band (e.g., 28 GHz, 30 GHz, 38 GHz, and 60 Ghz). In order to improve a channel gain, the base station 110, the terminal 120, the base station 130, and the terminal 140 may perform beamforming. The beamforming may include transmission beamforming and reception beamforming. That is, the base station 110, the terminal 120, the base station 130, and the terminal 140 may assign a directivity to a transmission signal or a reception signal. To this end, the base station 110, the terminal 120, the base station 130, and the terminal 140 may select serving beams 111, 115, 131, and 135 via a beam search procedure or a beam management procedure. After the serving beams 111, 115, 131, and 135 are selected, communication may then be performed via resources that are in a quasi co-located (QCL)

relationship with resources at which the serving beams 111, 115, 131, and 135 are transmitted.

According to various embodiments of the disclosure, the base station 110 and the base station 130 may perform wireless backhaul communication via wireless backhaul channel. For example, the base station 110 may be a donor base station that provides a connection to the base station 130, and the base station 130 may be a relay base station that is connected to the base station 110. Although not illustrated, a plurality of relay base stations may be connected to the base station 130 via a wireless backhaul so as to be connected to a wireless communication network. In this case, the base station 130 may be a relay base station of the base station 110, while functioning as a donor base station for other relay base stations. As described above, a wireless communication environment in which a plurality of relay base stations are connected to each other via a wireless backhaul may be referred to as a multi-hop relay communication environment.

The base station 110 and the base station 130 may use a plurality of antennas for wireless access communication and/or wireless backhaul communication. For example, each of the base station 110 and the base station 130 may separately use an antenna only for wireless access communication and an antenna only for wireless backhaul communication, each antenna may be used for wireless backhaul communication or may be used for wireless access communication over time, and the same antenna may be concurrently used for wireless backhaul communication and wireless access communication. Various embodiments of the disclosure may be applied regardless of a type of the antenna use as described above, or may also be applied to all types of the antenna use in addition to the type of the antenna use as described above.

Figure 2:
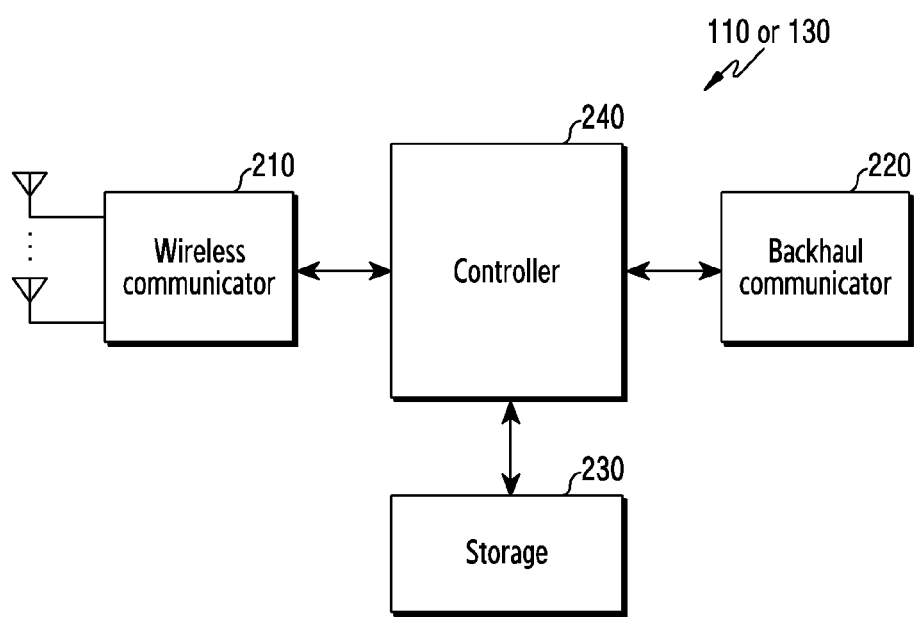
FIG. 2 illustrates a configuration of a base station in the wireless communication system according to various embodiments of the disclosure.

FIG. 2 illustrates a configuration of a base station in the wireless communication system according to various embodiments of the disclosure. The configuration illustrated in FIG. 2 may be understood as a configuration of the base station 110 or the base station 130. The term "-unit" or "-er" used hereinafter may refer to a unit for processing at least one function or operation and may be implemented in hardware, software, or a combination of hardware and software.

Referring to FIG. 2, the base station includes a wireless communicator 210, a backhaul communicator 220, a storage 230, and a controller 240.

The wireless communicator 210 performs functions to transmit or receive a signal through a wireless channel. For example, the wireless communicator 210 performs a function of conversion between a baseband signal and a bit stream according to a physical layer standard of a system. For example, when data is transmitted, the wireless communicator 210 generates complex symbols by encoding and modulating a transmission bit stream. Also, when data is received, the wireless communicator 210 restores a reception bit stream by demodulating and decoding a baseband signal.

Also, the wireless communicator 210 up-converts a baseband signal into an RF) band signal and transmits the same through an antenna, and down-converts an RF band signal received through an antenna into a baseband signal. To this end, the wireless communicator 210 may include a transmission filter, a reception filter, an amplifier, a mixer, an oscillator, a digital-to-analog convertor (DAC), an analog-to-digital convertor (ADC), and the like. Also, the wireless communicator 210 may include multiple transmission/reception paths. Further, the wireless communicator 210 may include at least one antenna array including multiple antenna elements.

In terms of hardware, the wireless communicator 210 may include a digital unit and an analog unit, wherein the analog unit includes multiple sub-units according to an operating power, an operating frequency, and the like. The digital unit may be implemented as at least one processor (e.g., a digital signal processor (DSP)).

The wireless communicator 210 transmits and receives a signal as described above. Accordingly, all or a part of the wireless communicator 210 may be referred to as a "transmission unit (transmitter)", a "reception unit (receiver)", or a "transmission/reception unit (transceiver)". Transmission and reception performed through a wireless channel, which will be described in the following descriptions, may be understood to mean that the above-described processing is performed by the wireless communicator 210.

The backhaul communicator 220 provides an interface for performing communication with other nodes within the network. The interface may include at least one of a wireless interface and a wired interface. In other words, the base station may wirelessly communicate with another base station via the backhaul communicator 220, and may communicate with another base station through a wire. The backhaul communicator 220 converts, into a physical signal, a bit stream transmitted from the base station to another node, for example, another access node, another base station, an upper node, a core network, etc., and converts a physical signal received from another node into a bit stream.

According to various embodiments of the disclosure, the base station 110 or the base station 130 may communicate with another base station or another network node via a wireless backhaul. In this case, the backhaul communicator 220 may be omitted.

The storage 230 may store data, such as a basic program for operation of a base station, an application program, configuration information, and the like. The storage 230 may include a volatile memory, a non-volatile memory, or a combination of a volatile memory and a non-volatile memory. The storage 230 provides stored data in response to a request of the controller 240.

The controller 240 controls overall operations of the base station. For example, the controller 240 transmits and receives a signal via the wireless communicator 210 or the backhaul communicator 220. Further, the controller 240 records data in the storage 230 and reads the recorded data. The controller 240 may perform functions of a protocol stack required by the communication standard. According to another implement, the processor stack may be included in the wireless communicator 210. To this end, the controller 240 may include at least one processor.

According to various embodiments, the controller 240 may transmit, to at least one node, information relating to a transmission time point for time-synchronization of a wireless access signal and a wireless backhaul signal related to the base station, may receive at least one signal transmitted according to the transmission time point from the at least one node, and may perform control to remove, from the at least one signal, interference between the wireless backhaul signal and the wireless access signal. The at least one signal may include at least one of the wireless backhaul signal and the wireless access signal. For example, the controller 240 may control the base station to perform operations according to various embodiments described below.

Figure 3:
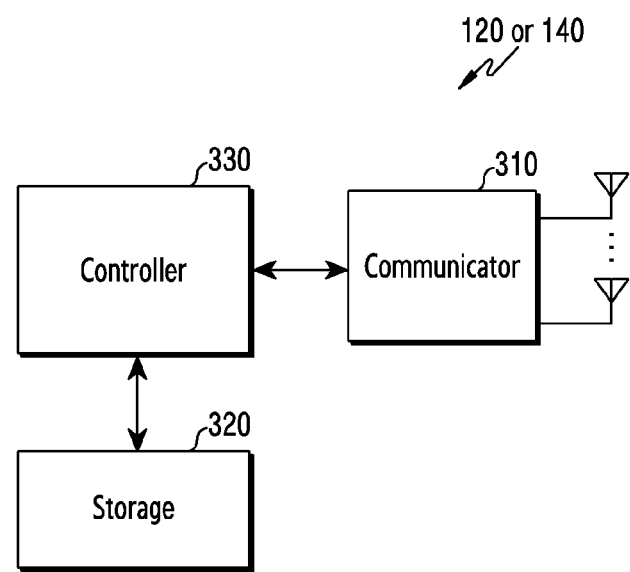
FIG. 3 illustrates a configuration of a terminal in the wireless communication system according to various embodiments of the disclosure.

FIG. 3 illustrates a configuration of a terminal in the wireless communication system according to various embodiments of the disclosure. The configuration illustrated in FIG. 3 may be understood as a configuration of the terminal 120 or the terminal 140. The term "-unit" or "-er" used hereinafter may refer to a unit for processing at least one function or operation and may be implemented in hardware, software, or a combination of hardware and software.

Referring to FIG. 3, the terminal includes a communicator 310, a storage 320, and a controller 330.

The communicator 310 performs functions for transmitting or receiving a signal through a wireless channel. For example, the communicator 310 performs a function of conversion between a baseband signal and a bit stream according to a physical layer standard of a system. For example, when data is transmitted, the communicator 310 generates complex symbols by encoding and modulating a transmission bit stream. Also, when data is received, the communicator 310 restores a reception bit stream by demodulating and decoding a baseband signal. Also, the communicator 310 up-converts a baseband signal into an RF band signal and transmits the same through an antenna, and down-converts an RF band signal received through an antenna into a baseband signal. For example, the communicator 310 may include a transmission filter, a reception filter, an amplifier, a mixer, an oscillator, a DAC, an ADC, and the like.

Also, the communicator 310 may include a plurality of transmission/reception paths. Further, the communicator 310 may include at least one antenna array including multiple antenna elements. In terms of hardware, the communicator 310 may include a digital circuit and an analog circuit (e.g., a radio frequency integrated circuit (RFIC)). The digital circuit and the analog circuit may be implemented in a single package. The communicator 310 may include a plurality of RF chains. Further, the communicator 310 may perform beamforming.

The communicator 310 transmits and receives a signal as described above. Accordingly, all or a part of the communicator 310 may be referred to as "a transmitter", "a receiver", or "a transceiver". Also, transmission and reception performed through a wireless channel, which will be described in the following descriptions, may be understood to mean that the above-described processing is performed by the communicator 310.

The storage 320 may store data, such as a basic program for operation of a UE, an application program, configuration information, and the like. The storage 320 may include a volatile memory, a non-volatile memory, or a combination of a volatile memory and a non-volatile memory. The storage 320 provides stored data in response to a request of the controller 330.

The controller 330 controls overall operations of the UE. For example, the controller 330 transmits and receives a signal via the communicator 310. Further, the controller 330 records data in the storage 320 and reads the recorded data. The controller 330 may perform functions of a protocol stack required by the communication standard. To this end, the controller 330 may include at least one processor or a micro-processor, or may be a part of a processor. A part of the communicator 310 and the controller 330 may be referred to as a communication processor (CP). According to various embodiments, the controller 330 may receive, from a base station, information relating to a transmission time point for time-synchronization of a wireless access signal and a wireless backhaul signal related to the base station, and may transmit the wireless access signal to the base station according to the transmission time point. For example, the controller 330 may control the terminal to perform operations according to various embodiments described below.

Figure 4A:
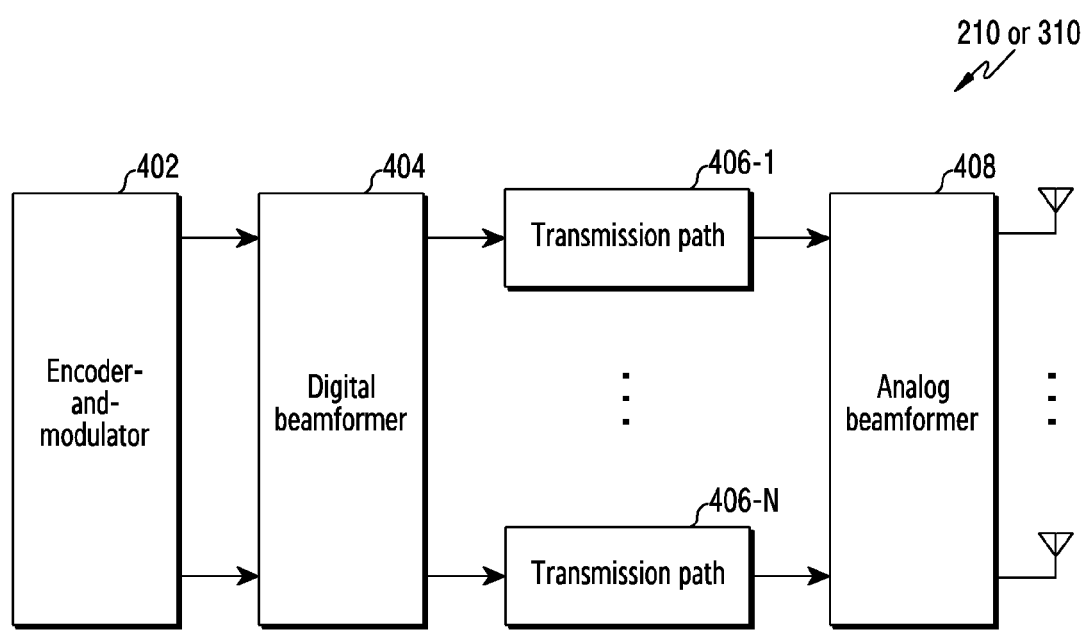
FIG. 4A to FIG. 4C illustrate a configuration of a communicator in the wireless communication system according to various embodiments of the disclosure.
Figure 4B:
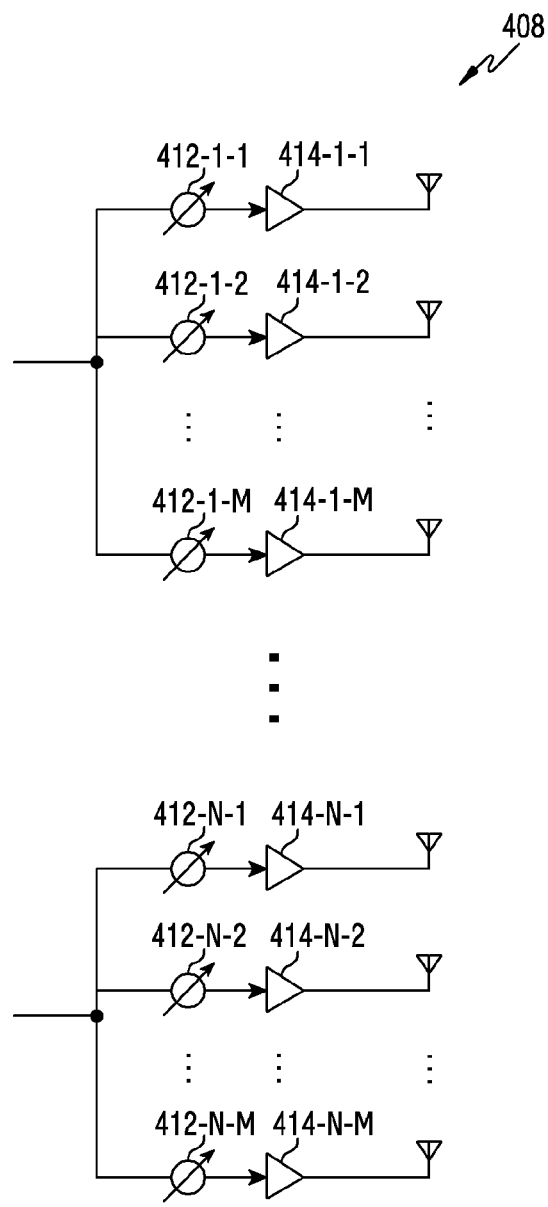
Figure 4C:
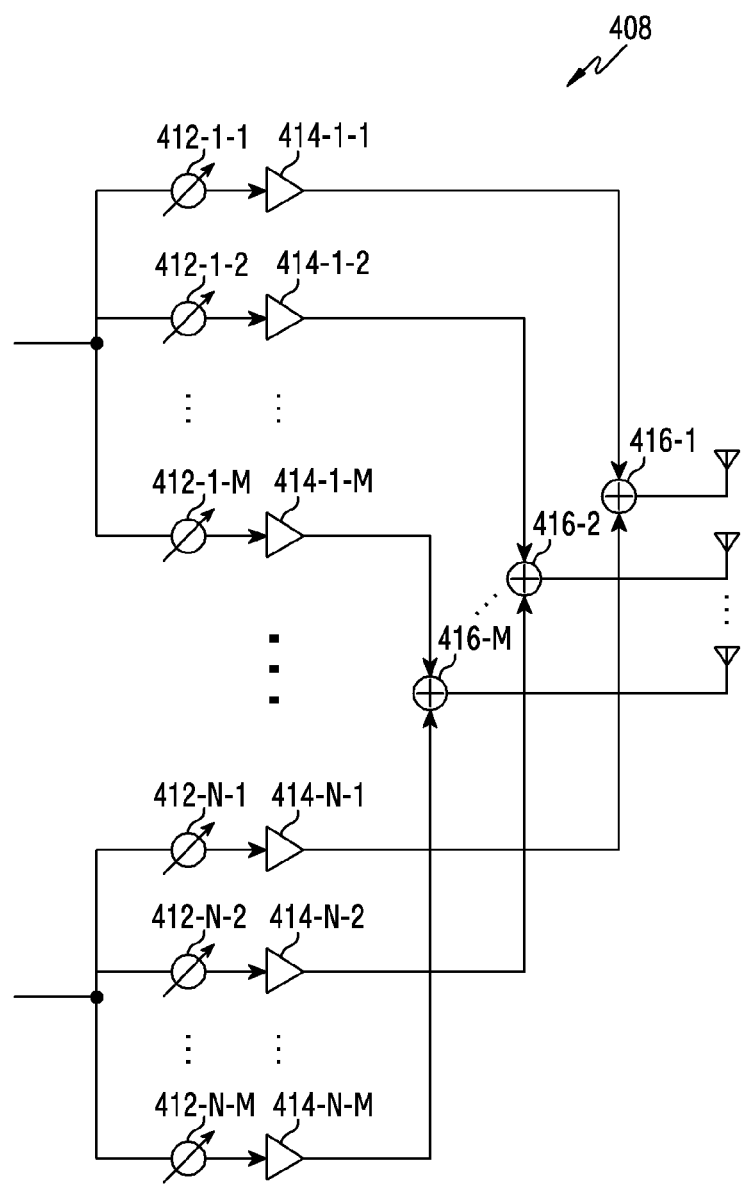

FIG. 4A to FIG. 4C illustrate a configuration of a communicator in the wireless communication system according to various embodiments of the disclosure. FIG. 4A to FIG. 4C illustrate examples of detailed configurations of the wireless communicator 210 of FIG. 2 or the communicator 310 of FIG. 3. Specifically, FIG. 4A to FIG. 4C illustrate elements to perform beamforming, as a part of the wireless communicator 210 of FIG. 2 or the communicator 310 of FIG. 3.

Referring to FIG. 4A, the wireless communicator 210 or the communicator 310 includes an encoder-and-modulator 402, a digital beamformer 404, a plurality of transmission paths 406-1 to 406-N, and an analog beamformer 408.

The encoder-and-modulator 402 performs channel encoding. For channel encoding, at least one among a low density parity check (LDPC) code, a convolution code, and a polar code may be used. The encoder-and-modulator 402 generates modulation symbols by performing constellation mapping.

The digital beamformer 404 performs beamforming on a digital signal (e.g., modulation symbols). To this end, the digital beamformer 404 multiplies modulation symbols by beamforming weights. Here, the beamforming weights are used to change a magnitude and phase of a signal, and may be referred to as "a precoding matrix", "a precoder", or the like. The digital beamformer 404 outputs digital-beamformed modulation symbols to the plurality of transmission paths 406-1 to 406-N. According to a multiple input multiple output (MIMO) transmission technique, the modulation symbols may be multiplexed or the same modulation symbols may be provided to the plurality of transmission paths 406-1 to 406-N.

The plurality of transmission paths 406-1 to 406-N convert digital beamformed-signals into analog-signals. To this end, each of the plurality of transmission paths 406-1 to 406-N may include an inverse fast Fourier transform (IFFT) calculator, a cyclic prefix (CP) insertion unit, a DAC, and an up-converter. The CP insertion unit is for an orthogonal frequency division multiplexing (OFDM) scheme, and may be excluded when another physical layer scheme (e.g., a filter bank multi-carrier (FBMC)) is applied. That is, the plurality of transmission paths 406-1 to 406-N provide independent signal processing processes to a plurality of streams generated via digital beamforming. However, depending on an implementation scheme, some elements of the plurality of transmission paths 406-1 to 406-N may be shared.

The analog beamformer 408 performs beamforming on an analog signal. To this end, the digital beamformer 404 multiplies analog signals by beamforming weights. The beamforming weights are used to change a magnitude and a phase of a signal. Specifically, according to a connection structure between the plurality of transmission paths 406-1 to 406-N and antennas, the analog beamformer 408 may be configured as shown in FIG. 4B or FIG. 4C.

Referring to FIG. 4B, signals input to the analog beamformer 408 are transmitted through the antennas via phase/magnitude conversion and amplification calculation. At this time, signals of respective paths are transmitted through different antenna sets, i.e., antenna arrays. Referring to processing of signals input through a first path, the signals are converted into signal sequences having different phases/magnitudes or the same phase/magnitude by phase/magnitude converters 412-1-1 to 412-1-M, amplified by the amplifiers 414-1-1 to 414-1-M, and then transmitted through the antennas.

Referring to FIG. 4C, signals input to the analog beamformer 408 are transmitted through the antennas via phase/magnitude conversion and amplification calculation. At this time, signals of respective paths are transmitted through the same antenna set, i.e., an antenna array. Referring to processing of signals input through the first path, the signals are converted into signal sequences having different phases/magnitudes or the same phase/magnitude by the phase/magnitude converters 412-1-1 to 412-1-M, and amplified by the amplifiers 414-1-1 to 414-1-M. For transmission through a single antenna array, the amplified signals are combined by combiners 416-1-1 to 416-1-M on the basis of antenna elements, and then transmitted through the antennas.

FIG. 4B shows an example in which an independent antenna array for each transmission path is used, and FIG. 4C shows an example in which transmission paths share one antenna array. However, according to another embodiment, some transmission paths may use an independent array, and the remaining paths may share one antenna array. Further, according to still another embodiment, a structure adaptively changeable depending on a situation may be used by applying a structure switchable between transmission paths and antenna arrays.

Figure 5:
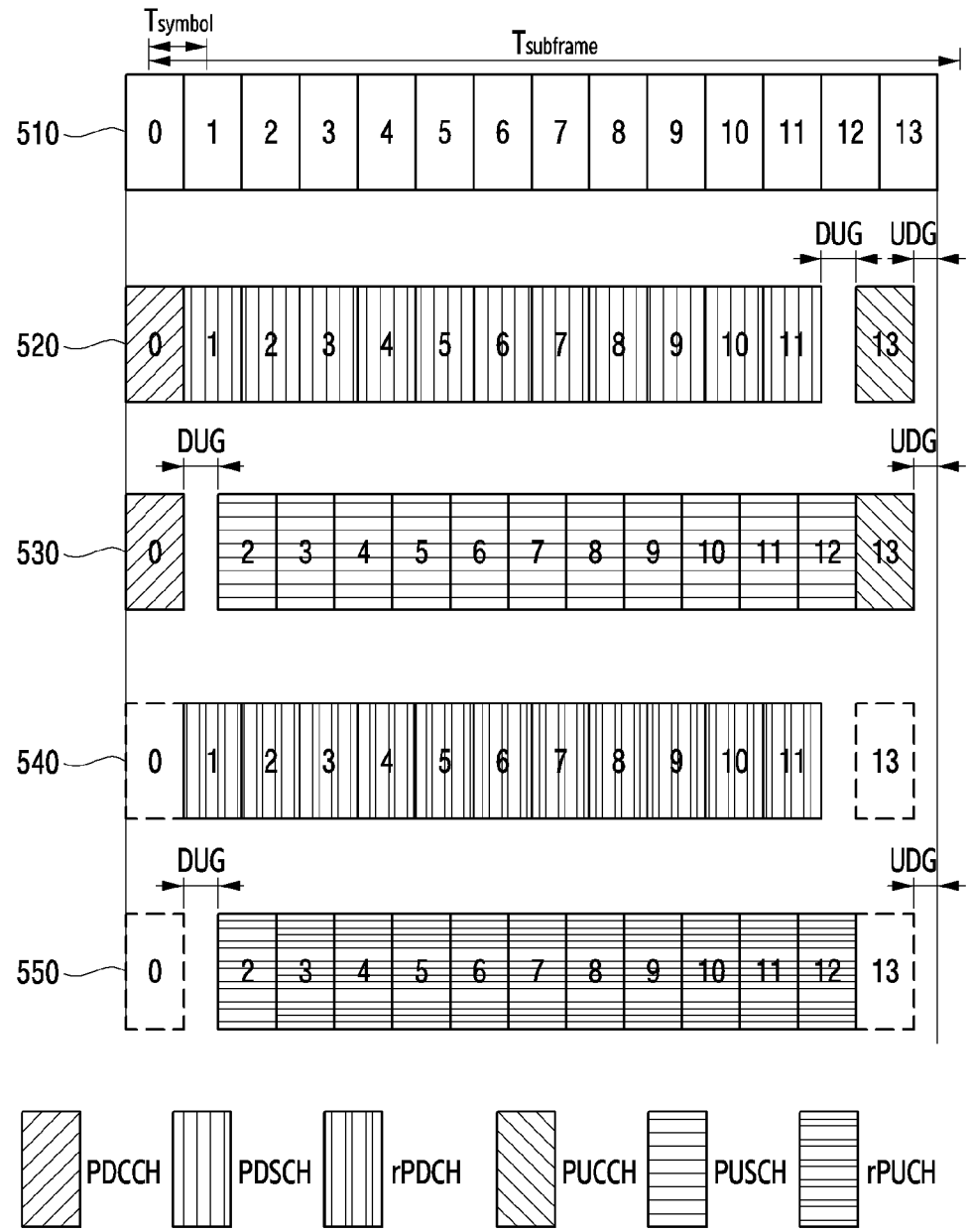
FIG. 5 illustrates structures of various subframes according to various embodiments of the disclosure.

FIG. 5 illustrates structures of various subframes according to various embodiments of the disclosure.

In general, a frame may include a plurality of subframes, and the subframes may include a plurality of symbols, respectively. For example, the symbols may be generated on the basis of an orthogonal frequency division multiplexing (OFDM) scheme. A procedure of generating and transmitting a symbol by a transmitter (e.g., the base station 110, the terminal 120, the base station 130, and the terminal 140) on the basis of the OFDM scheme may be as follows. For example, the transmitter may modulate data to be transmitted into an M number of quadrature amplitude modulation (QAM) or phase shift keying (PSK) symbols, and an inverse fast Fourier transform (IFFT) or an inverse discrete Fourier transform (IDFT) of size N (where N≥M) is performed on the modulated symbols, so that the modulated symbols are converted into time domain signals of N samples. Then, the transmitter copies an Ncp number of samples at the back of the N samples, inserts the copied samples as a cyclic prefix (CP) at the front part of the N samples, and generates a time domain OFDM symbol including an Ncp+N number of samples. The transmitter generates OFDM symbols in this way and transmits the generated OFDM symbols to a receiver. A procedure of receiving and processing a symbol by a receiver (e.g., the base station 110, the terminal 120, the base station 130, and the terminal 140) on the basis of the OFDM scheme may be as follows. The receiver removes a CP corresponding to an Ncp number of samples at the front part of each time domain OFDM symbol of a received signal, performs DFT or FFT of size N on the remaining N samples to compensate for signal distortion due to a wireless channel, acquires the original M number of QAM or PSK symbols, and then acquires data from the symbols.

In the above example, although it is described that the transmitter and/or the receiver process symbols on the basis of the OFDM scheme, this is exemplary and the transmitter and/or receiver may process the symbols on the basis of various schemes. For example, the transmitter and/or receiver may process symbols on the basis of a single carrier-frequency division multiple access (SC-FDMA) scheme and/or a DFT-spread OFDM scheme.

If signals received by the receiver are not time-synchronized with each other, N sample sections considered when performing DFT or FFT of the received signals may not match N sample sections applied to a transmission signal, and symbols adjacent to the N sample sections may be further included so as to cause interference to occur. As a result, performance of receiving the signal may be degraded. As a time-synchronization error between the received signals becomes larger, reception performance may be further degraded. Therefore, in order to prevent the occurrence of interference and the degradation of the received signals, the signals received by the receiver need to be time-synchronized with each other.

In general, a subframe 510 may include 14 symbols of symbol 0 to symbol 13. For example, a time interval of the subframe 510 may be 0.25 ms. As another example, the time interval of the subframe 510 may be 1 ms. A CP may be attached to each of the symbol 0 to symbol 13. CP lengths may be the same for all symbols, but may be different for some symbols.

A subframe 520 shows an example of a downlink subframe for wireless access communication in a time division duplex (TDD) scheme. For example, a base station may transmit information corresponding to a physical downlink control channel (PDCCH) to a terminal via first symbol 0 of the subframe 520, and may transmit information corresponding to a physical downlink shared channel (PDSCH) to the terminal via symbol 1 to symbol 11, and the terminal may transmit information corresponding to a physical uplink control channel (PUCCH) to the base station via symbol 13. Symbol 12 of the subframe 520 may be used as a guard time (GT). The guard time may include a downlink-to uplink transmission gap (DUG) which is a time required to switch a communication mode from downlink to uplink, and a uplink-to-downlink transmission gap (UDG) which is a time required to switch the communication mode from uplink to downlink. The UDG may provide a time required to change, by the base station, configurations of base station elements for receiving uplink signals to configurations for transmitting downlink signals, and may provide a time required to change, by the terminal, configurations of terminal elements for transmitting uplink signals to configurations for receiving downlink signals. On the contrary, the DUG may provide a time required to change, by the base station, configurations of base station elements for transmitting downlink signals to configurations for receiving uplink signals, and may provide a time required to change, by the terminal, configurations of terminal elements for receiving downlink signals to configurations for transmitting uplink signals. Further, the DUG may provide a time required for the base station to time-synchronize uplink signals, which are received from a plurality of terminals, with respect to the base station.

A subframe 530 shows an example of an uplink subframe for wireless access communication in a TDD scheme. For example, the base station may transmit information corresponding to the PDCCH to the terminal via symbol 0, and the terminal may transmit information corresponding to a physical uplink shared channel (PUSCH) to the base station via symbol 2 to symbol 12, and may transmit the PUCCH to the base station via symbol 13. In the subframe 530, symbol 1 may be used as guard time.

A subframe 540 shows an example of a downlink subframe for wireless backhaul communication in the TDD scheme. For example, a donor base station (e.g., the base station 110) may transmit information corresponding to a relay physical downlink channel (rPDCH) to a relay base station (e.g., the base station 130) via symbol 1 to symbol 11 in the subframe 540. The rPDCH may include a PDCCH (rPDCCH) for the relay base station and a PDSCH (rPDSCH) for the relay base station. According to FIG. 5, symbol 0 and symbol 13 may not be used for communication in the subframe 540. However, this is exemplary and symbol 0 and symbol 13 in the subframe 540 may be used for communication.

A subframe 550 shows an example of an uplink subframe for wireless backhaul communication in the TDD scheme. For example, the relay base station may transmit, in subframe 550, information corresponding to a relay physical uplink channel (rPUCH) to the donor base station via symbol 2 to symbol 12. The rPUCH may include a PUCCH (rPUCCH) for the relay base station and a PUSCH (rPUSCH) for the relay base station. According to FIG. 5, symbol 0 and symbol 13 may not be used for communication in the subframe 550. However, this is exemplary and symbol 0 and symbol 13 in the subframe 550 may be used for communication.

The subframe structure illustrated in FIG. 5 is exemplary. In other words, subframe structures and types of information assigned to the symbols in each of subframes 520, 530, 540, and 550 may be different from illustration in FIG. 5.

The terminal may receive a synchronization signal so as to be time-synchronized with the base station. For example, the synchronization signal may include at least one of a primary synchronization signal (PSS), a secondary synchronization signal (SSS), and a third synchronization signal (TSS). After the terminal is time-synchronized with the base station, if the terminal transmits an uplink signal to the base station according to a reference synchronization time point of the terminal, the signal transmitted from the terminal is delayed, by an RTT between the terminal and the base station, from a reference synchronization time point of the base station, and reaches the base station. In other words, a time that the uplink signal transmitted by the terminal reaches the base station may vary depending on a distance between the base station and the terminal. Therefore, uplink signals transmitted by a plurality of terminals communicating with the same base station may reach the base station at different times depending on the distance between the terminal and each of the plurality of terminals, and the uplink signals may not be time-synchronized with each other. In order to time-synchronize the uplink signals received from the plurality of terminals, the plurality of terminals may transmit the respective uplink signals at time points preceding, by the RTT, reference synchronization time points thereof. In this case, TTA may be RTT, and all the uplink signals transmitted from the plurality of terminals may be received by the base station at a reference synchronization time point of the base station. In addition, in order for the base station to secure a UDG, TTA may be determined in consideration of the UDG as well as the RTT. When the UDG is considered, the TTA in which the terminals transmit uplink signals may be determined as in shown in <Equation 1> below.

$$TTA=RTT+UDG \qquad [\text{Equation 1}]$$

The TTA refers to a time offset at which the terminal transmits an uplink signal, the RTT refers to a time required for the signal to travel a round-trip distance between the base station and the terminal, and the UDG refers to a minimum time required for the base station to change configurations of base station elements, which receive the uplink signal, to configurations for transmission of a downlink signal. The base station may configure TTA for a plurality of terminals, and the TTA may be configured differently for each terminal. Configuration of the TTA as shown in <Equation 1] is exemplary, and the base station may configure TTA differently in <Equation 1>.

If the terminal transmits an uplink signal according to the TTA determined by <Equation 1>, the base station may receive the uplink signal at a time point preceding, by a UDG, a reference synchronization time point of the base station. In other words, if the TTA of the terminal is represented as shown in <Equation 1>, RTA of the base station may be determined as in the following <Equation 2>.

$$RTA=TTA-RTT \qquad [\text{Equation 2}]$$

The RTA refers to a time offset at which a base station receives an uplink signal, the TTA refers to a time offset at which a terminal transmits the uplink signal, and the RTT refers to a time taken for a signal to travel a round-trip distance between the base station and the terminal.

If the base station concurrently performs wireless access communication and wireless backhaul communication, interference may occur, and the interference may degrade communication performance. According to various embodiments of the disclosure, RTA or TTA of a wireless access signal and a wireless backhaul signal related to the base station match each other (that is, when the wireless access signal and the wireless backhaul signal related to the base station match each other), the base station may efficiently remove interference of the wireless access signal and the wireless backhaul signal even if the wireless backhaul signal and the wireless access signal are concurrently transmitted or received. For example, on the basis of a symbol structure as shown in FIG. 6, the base station may efficiently remove interference of the wireless access signal and the wireless backhaul signal.

Figure 6:
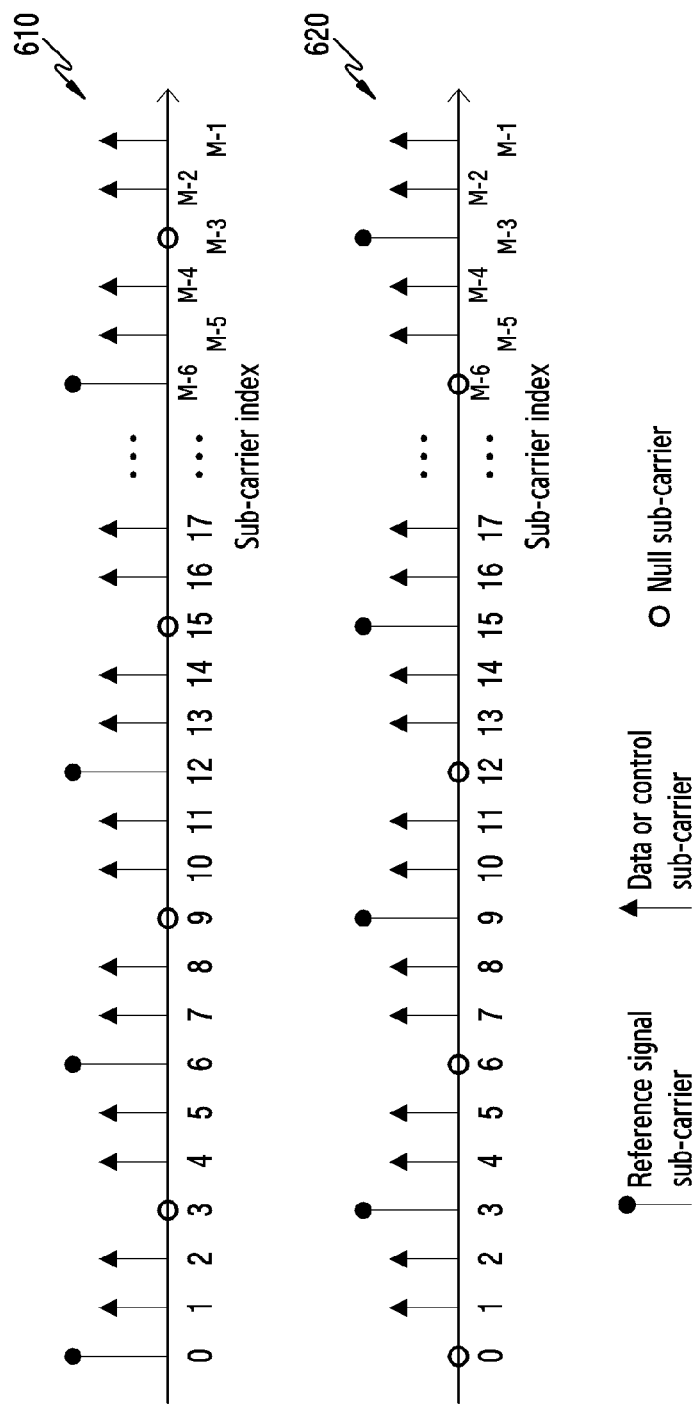
FIG. 6 illustrates a symbol structure for at least one symbol of a wireless backhaul signal and a wireless access signal in the wireless communication system according to various embodiments of the disclosure.

FIG. 6 illustrates a symbol structure for at least one symbol of a wireless backhaul signal and a wireless access signal in the wireless communication system according to various embodiments of the disclosure.

According to FIG. 6, a symbol 610 may be at least one symbol of a wireless access signal. In the symbol 610, a reference signal (RS) may be assigned to sub-carrier index n=6k (k=0, 1, . . . , M/6−1, where M is a total number of sub-carriers), no signal may be assigned to sub-carrier index n=6k+3 (null sub-carrier), and data may be assigned to the remaining sub-carriers (=an M*4/6 number of sub-carrier indexes).

A symbol 620 may be at least one symbol of the wireless backhaul signal. In the symbol 620, the reference signal may be assigned to sub-carrier index n=6k+3, no signal may be assigned to sub-carrier index n=6k, and data may be assigned to the remaining sub-carriers (=an M*4/6 number of sub-carrier indexes).

According to various embodiments of the disclosure, a symbol number of the symbol 610 in a subframe for the wireless access signal may be the same as a symbol number of the symbol 620 in a subframe for the wireless backhaul signal. For example, the symbol 610 and the symbol 620 may be assigned to symbol location 4 in the subframe for the wireless access signal and symbol location 4 in the subframe for the wireless backhaul signal, respectively. This allows the base station to effectively remove interference between the wireless access signal and the wireless backhaul signal from a desired signal when the wireless access signal and the wireless backhaul signal related to the base station are time-synchronized.

For example, in a communication situation where the base station receives the wireless access signal and receives the wireless backhaul signal, the base station may receive the symbol 610 and the symbol 620 at a symbol location of a specific number (e.g., symbol location 4) via a reception antenna for wireless access communication, may estimate a wireless access channel value on the basis of reference signals assigned to sub-carrier index n=6k (k=0, 1, . . . , M/6−1, where M is a total number of sub-carriers), and may estimate an interference channel value on the basis of the reference signals assigned to sub-carrier index n=6k+3. Further, in the same communication situation, the base station may receive the symbol 610 and the symbol 620 at a symbol location of a specific number (e.g., symbol location 4) via a reception antenna for wireless backhaul communication, may estimate a wireless backhaul channel value on the basis of reference signals assigned to sub-carrier index n=6k+3, and may estimate an interference channel value on the basis of the reference signals assigned to sub-carrier index n=6k. On the basis of estimated channel values, the base station may remove interference from each of the wireless access signal and the wireless backhaul signal.

As another example, in a communication situation where the base station receives the wireless access signal and transmits the wireless backhaul signal, the base station may receive the symbol 610 and the symbol 620 at a symbol location of a specific number (e.g., symbol location 4) via a reception antenna for wireless access communication, may estimate a wireless access channel value on the basis of reference signals assigned to sub-carrier index n=6k (k=0, 1, . . . , M/6−1, where M is a total number of sub-carriers), and may estimate interference channel values on the basis of the reference signals assigned to sub-carrier index n=6k+3. The base station may estimate interference for the wireless access signal and may remove interference from the wireless access signal, on the basis of the estimated channel values.

As still another example, in a communication situation where the base station transmits the wireless access signal and receives the wireless backhaul signal, the base station may receive the symbol 610 and the symbol 620 at a symbol location of a specific number (e.g., symbol location 4) via a reception antenna for wireless backhaul communication, may estimate a wireless backhaul channel value on the basis of reference signals assigned to sub-carrier index n=6k+3 (k=0, 1, . . . , M/6−1, where M is a total number of sub-carriers), and may estimate interference channel values on the basis of the reference signals assigned to sub-carrier index n=6k+3. The base station may estimate interference for the wireless backhaul signal and may remove interference from the wireless backhaul signal, on the basis of the estimated channel values.

In FIG. 6, it has been described that the symbol 610 is at least one symbol of the wireless access signal, and the symbol 620 is at least one symbol of the wireless backhaul signal. However, this is exemplary, and the symbol 610 may be at least one symbol of the wireless backhaul signal, and the symbol 620 may be at least one symbol of wireless access signal. Further, the symbols 610 and 620 may have different structures from those shown in FIG. 6. For example, the symbol 610 and the symbol 620 may have any symbol structure in which a reference signal for the wireless backhaul signal and a reference signal for the wireless access signal in the symbol 610 and the symbol 620 are arranged in sub-carriers of different indexes in the same index symbol. Further, it has been described that the symbol 610 and the symbol 620 are assigned to symbol location 4. However, this is exemplary, and the symbol 610 and the symbol 620 may be assigned to a symbol location of a number other than 4.

As described above, if the wireless backhaul signal and the wireless access signal related to the base station are time-synchronized, and the symbol 610 and the symbol 620 are transmitted at symbol locations of an identical number in a subframe for the wireless access signal and a subframe for the wireless backhaul signal, respectively, the base station may easily estimate an interference channel and interference, and may efficiently remove interference from a desired signal. Hereinafter, a method for time-synchronization of the wireless backhaul signal and the wireless access signal related to the base station will be described in more detail.

Figure 7:
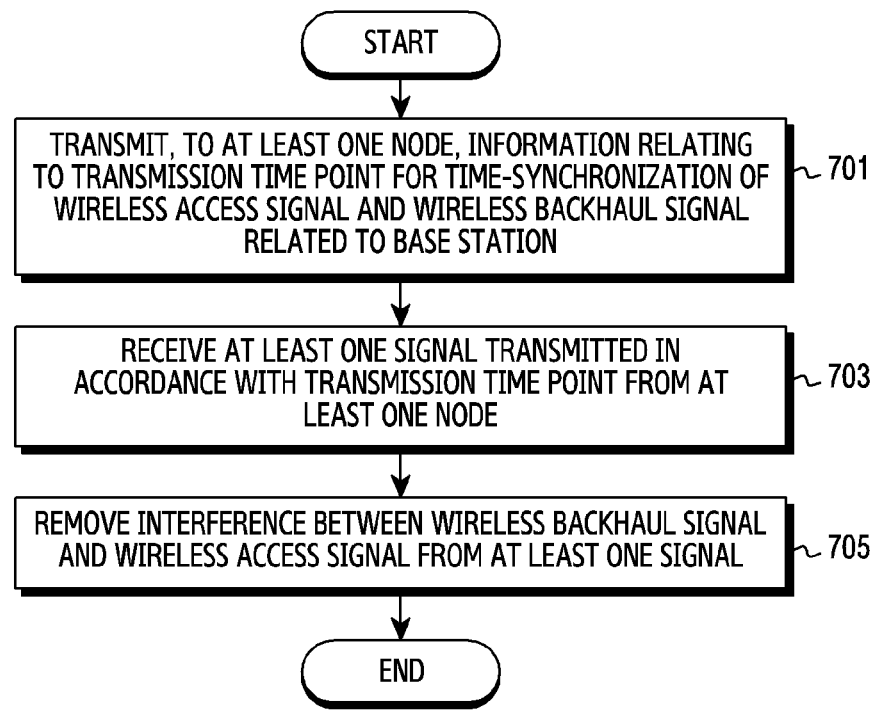
FIG. 7 illustrates a flowchart of a base station in the wireless communication system according to various embodiments of the disclosure.

FIG. 7 illustrates a flowchart of a base station in the wireless communication system according to various embodiments of the disclosure. For example, FIG. 7 illustrates an operation method of the base station 110 or the base station 130.

Referring to FIG. 7, operation 701, a base station transmits, to at least one node, information relating to a transmission time point for time-synchronization of a wireless access signal and a wireless backhaul signal related to the base station. Here, the at least one node may include at least one of a base station (i.e., a relay base station), which performs wireless backhaul communication with the base station, and a terminal performing wireless backhaul communication with the base station. The information relating to the transmission time point may include at least one among an index of a value for the transmission time point, a list of values for a plurality of transmission time points including the transmission time point, information relating to a current communication situation, information relating to a sequence in which the plurality of communication situations are repeated, and a period in which the plurality of communication situations are repeated. The information relating to the transmission time point may be transmitted during a procedure of accessing the base station by at least one node.

In operation 703, the base station receives at least one signal transmitted according to the transmission time point from at least one node. The at least one signal may include at least one of the wireless access signal and the wireless backhaul signal.

For example, the at least one node may be a terminal. If the terminal transmits, to the base station, the wireless access signal according to the transmission time point indicated by the base station, RTA of the wireless access signal for the base station and RTA or TTA of the wireless backhaul signal related to the base station may be the same. In other words, the wireless access signal transmitted by the terminal according to the transmission time point indicated by the base station may be time-synchronized with the wireless backhaul signal related to the base station.

As another example, the at least one node may be a relay base station. If a relay base station transmits, to the base station, the wireless backhaul signal according to the transmission time point indicated by the base station, RTA of the wireless backhaul signal for the base station and RTA or TTA of the wireless access signal related to the base station may be the same. In other words, the wireless backhaul signal transmitted by the relay base station according to the transmission time point indicated by the base station may be time-synchronized with the wireless access signal related to the base station.

As still another example, the at least one node may include a relay base station and a terminal. If a relay base station transmits the wireless backhaul signal to the base station according to the transmission time point indicated by the base station, and a terminal also transmits the wireless access signal to the base station according to the transmission time point indicated by the base station, RTA of the wireless backhaul signal for the base station and RTA of the wireless access signal for the base station may be the same. In other words, the wireless access signal and the wireless backhaul signal may be time-synchronized.

In operation 705, the base station removes interference between the wireless backhaul signal and the wireless access signal, in at least one signal. In more detail, the base station may estimate an interference channel on the basis of at least one of a reference signal for the wireless backhaul signal and a reference signal for the wireless access signal, and may estimate interference on the basis of the estimated interference channel. The reference signal for the wireless backhaul signal and the reference signal for the wireless access signal may be disposed in sub-carriers of different indexes in symbols of the same index.

Figure 8:
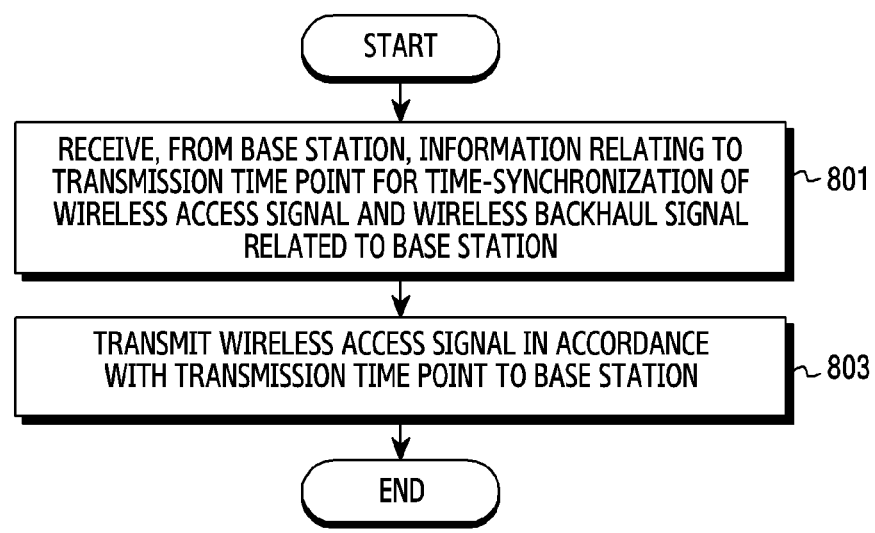
FIG. 8 illustrates a flowchart of a terminal in the wireless communication system according to various embodiments of the disclosure.

FIG. 8 illustrates a flowchart of a terminal in the wireless communication system according to various embodiments of the disclosure. FIG. 8 illustrates an operation method of the terminal 120 or the terminal 140.

Referring to FIG. 8, in operation 801, a terminal receives, from a base station, information relating to a transmission time point for time-synchronization of a wireless access signal and a wireless backhaul signal related to the base station. The information relating to the transmission time point may include at least one among an index of a value for the transmission time point, a list of values for a plurality of transmission time points including the transmission time point, information relating to a current communication situation, information relating to a sequence in which the plurality of communication situations are repeated, and a period in which the plurality of communication situations are repeated. The information relating to the transmission time point may be received during a procedure of accessing the base station by the terminal.

In operation 803, the terminal transmits the wireless access signal to the base station according to the transmission time point. If the terminal transmits the wireless access signal according to the transmission time point indicated by the base station, RTA of the wireless access signal for the base station and RTA or TTA of the wireless backhaul signal related to the base station may be the same. In other words, the wireless access signal transmitted by the terminal according to the transmission time point indicated by the base station may be time-synchronized with the wireless backhaul signal related to the base station. This allows the base station to estimate an interference channel and interference on the basis of reference signals of a symbol received at a symbol location of a specific number, and to effectively remove the interference from a desired signal.

The transmission time point of the wireless access signal and/or the transmission time point of the wireless backhaul signal may vary depending on a communication situation. Hereinafter, examples of a case where a transmission time point is determined in each communication situation will be described with reference to FIG. 9 to FIG. 15.

Figure 9A:
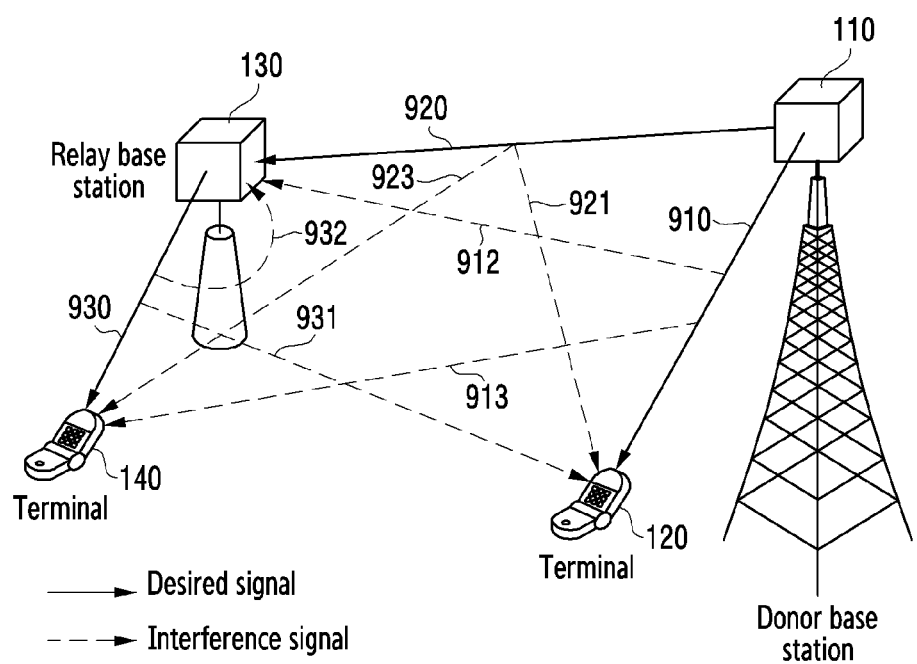
FIG. 9A and FIG. 9B are diagrams illustrating principles of interference estimation and determination of a transmission time point in a first communication situation of the wireless communication system according to various embodiments of the disclosure.
Figure 9B:
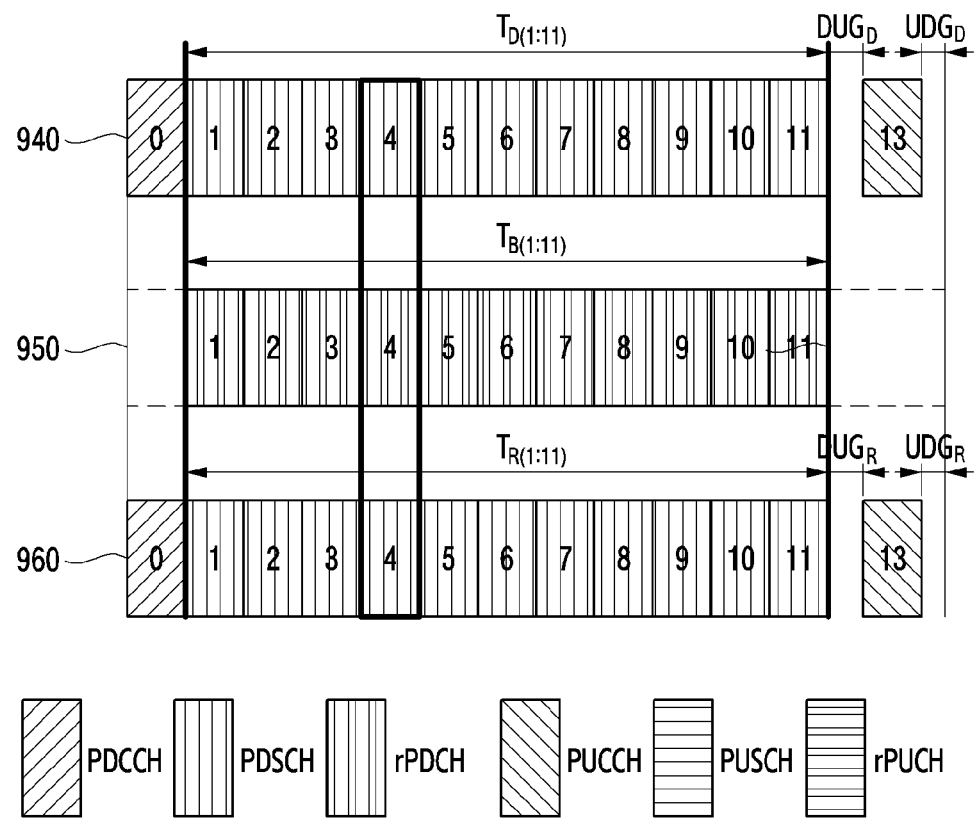

FIG. 9A and FIG. 9B are diagrams illustrating principles of interference estimation and determination of a transmission time point in a first communication situation of the wireless communication system according to various embodiments of the disclosure. In FIG. 9A and FIG. 9B, the base station 110 may be a donor base station, and the base station 130 may be a relay base station.

According to the first communication situation, the base station 110 transmits a wireless access signal 910, which is a downlink signal, to the terminal 120 and transmits a wireless backhaul signal 920, which is a downlink signal, to the base station 130, and the base station 130 transmits a wireless access signal 930, which is a downlink signal, to the terminal 140. These signals may be concurrently transmitted or received via respective wireless channels. In particular, the base station 130 may transmit the wireless access signal 930 to the terminal 140, while receiving the wireless backhaul signal 920 from the base station 110. In this case, interference 932 occurring from the wireless access signal 930 is a self-interference (SI), and may be received together with the wireless backhaul signal 920 by the base station 130. Therefore, in order to identify the wireless backhaul signal 920, the base station 130 should remove the interference 932 from the received signals.

A subframe 940 indicates a downlink subframe for the wireless access signal 910. In the wireless access signal 910, downlink data for the terminal 120 may be transmitted from the base station 110 via symbol 1 to symbol 11 of the subframe 940. A subframe 950 indicates a downlink subframe for the wireless backhaul signal 920. In the wireless backhaul signal 920, downlink data for the base station 130 may be transmitted from the base station 110 via symbol 1 to symbol 11 of the subframe 950. The wireless access signal 910 and the wireless backhaul signal 920 are both downlink signals, and therefore the base station 110 transmits the wireless access signal 910 and the wireless backhaul signal 920 at a reference synchronization time point. That is as illustrated in FIG. 9B, the subframe 940 and the subframe 950 may be time-synchronized with each other.

A subframe 960 indicates a downlink subframe for the wireless access signal 930. In the wireless access signal 930, downlink data for the terminal 140 may be transmitted from the base station 130 via symbol 1 to symbol 11 of the subframe 960. The wireless backhaul signal 920 and the wireless access signal 930 are both downlink signals, and therefore the base station 130 receives the interference 932, which has occurred from the wireless backhaul signal 920 and the wireless access signal 930, at the reference synchronization time point. That is, as illustrated in FIG. 9B, the subframe 950 and the subframe 960 may be time-synchronized, and the base station 130 may select a DFT section or an FFT section, in which no interference occurs between adjacent symbols, and may perform DFT or FFT calculation of size N for the received signals (including the wireless backhaul signal 920 and the interference 932).

In the first communication situation, a result of the DFT or FFT calculation of size N for the received signals by the base station 130 may be represented as the following <Equation 3>.

$$R_{1\_130}[n]=Y_{920}[n]+Y_{932}[n]+N[n], n=0,1,\ldots,M-1 \quad \text{[Equation 3]}$$

$R_{1\_130}[n]$ refers to received signals of the base station 130 in the first communication situation, $Y_{920}[n]$ refers to the wireless backhaul signal 920, $Y_{932}[n]$ refers to the interference 932, $N[n]$ refers to noise, in which n is a sub-carrier index, and M refers to a total number of sub-carriers.

If the symbol 610 and the symbol 620 are transmitted at symbol locations of the same number (e.g., symbol number 4) in the time-synchronized wireless backhaul signal 920 and wireless access signal 930, respectively, the base station 130 may estimate a channel value of the wireless backhaul signal 920 and a channel value of the interference 932 on the basis of the received signals. The interference 932 received by the base station 130 may be determined on the basis of the channel value of the interference 932 and the wireless access signal 930 transmitted by the base station 130, as shown in <Equation 4>.

$$Y_{932}[n]=X_{930}[n]*H_{932}[n], n=0,1,\ldots,M-1 \quad \text{[Equation 4]}$$

$Y_{932}[n]$ refers to the interference 932, $X_{930}[n]$ refers to the wireless access signal 930, $H_{932}[n]$ refers to the channel value of the interference 932, in which n is a sub-carrier index, and M refers to a total number of sub-carriers.

Then, according to <Equation 5>, the base station 130 may remove the interference 932 from the received signals, and may detect data of the wireless backhaul signal 932.

$$R_{920}[n]=R_{1\_130}[n]-Y_{932}[n]=R_{1\_130}[n]-(X_{930}[n]*H_{932}[n]), n=0,1,\ldots,M-1 \quad \text{[Equation 5]}$$

$R_{920}[n]$ refers to the wireless backhaul signal 920 from which interference has been removed, $R_{1\_130}[n]$ refers to the received signals of the base station 130 in the first communication situation, $Y_{932}[n]$ refers to the interference 932, $X_{930}[n]$ refers to the wireless access signal 930, $H_{932}[n]$ refers to the channel value of the interference 932, in which n is a sub-carrier index, and M refers to a total number of sub-carriers.

According to various embodiments of the disclosure, other interferences 912, 913, 921, 923, and 931 may also occur, but it is assumed that the interferences may be easily removed according to a suitable interference cancellation technique (e.g., a minimum mean square error-ordered successive interference cancellation (MMSE-OSIC) and MMSE-OSIC$^2$). For example, interference 912 and the interference 921 may occur from the wireless backhaul signal 930 and the wireless access signal 910 transmitted by the base station 110, but the base station 110 may remove the reference 912 and the reference 921 in advance in a signal transmission procedure, by means of at least one of the described interference cancellation techniques, and may transmit the wireless access signal 910 and the wireless backhaul signal 920.

Figure 10A:
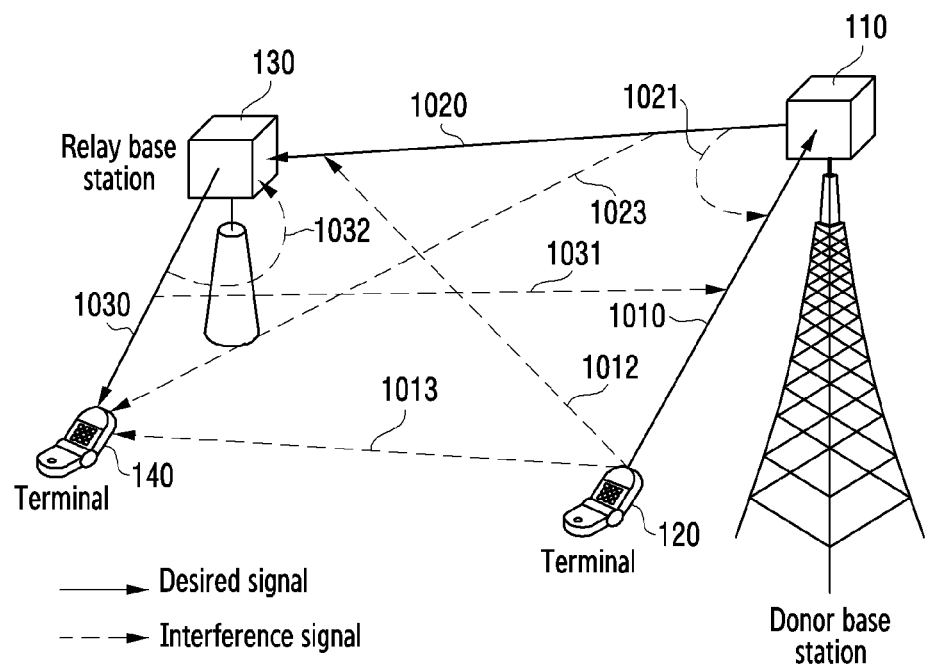
FIG. 10A and FIG. 10B are diagrams illustrating principles of interference estimation and determination of a transmission time point in a second communication situation of the wireless communication system according to various embodiments of the disclosure.
Figure 10B:
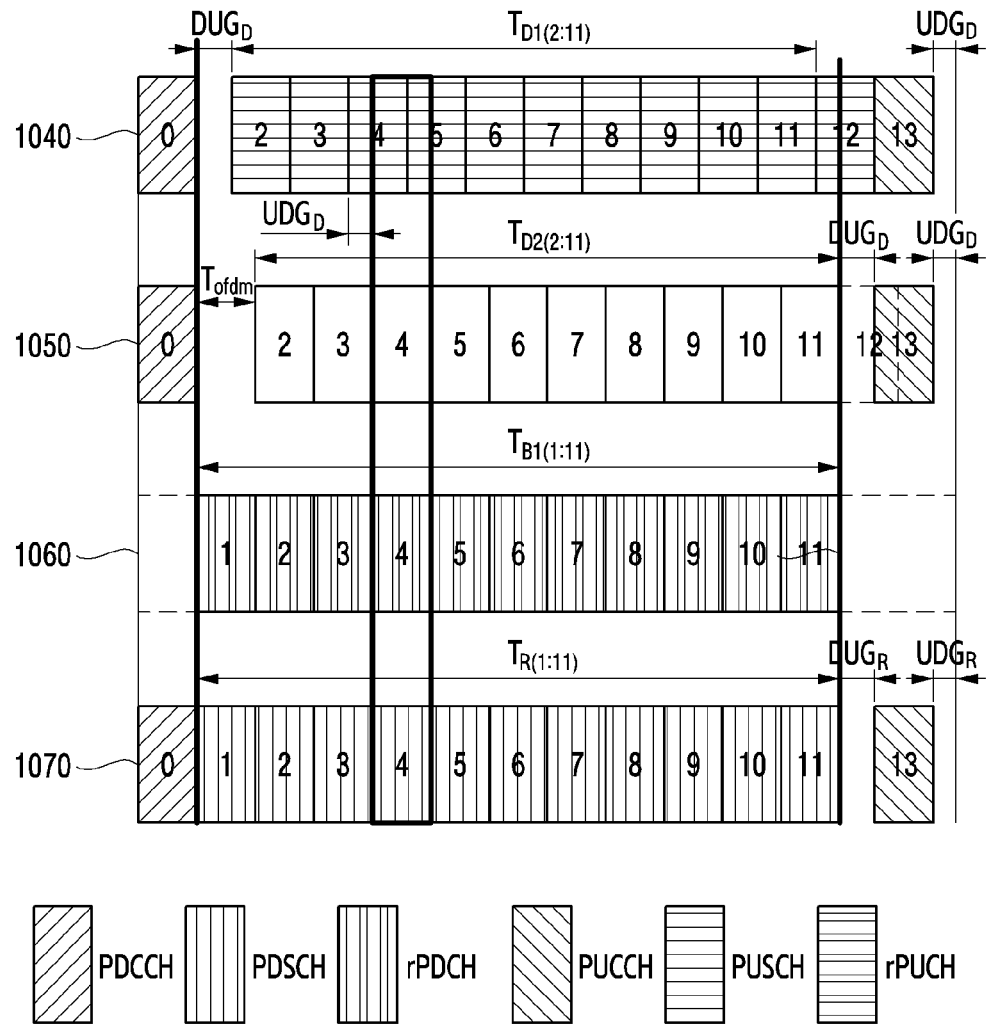

FIG. 10A and FIG. 10B are diagrams illustrating principles of interference estimation and determination of a transmission time point in a second communication situation of the wireless communication system according to various embodiments of the disclosure. In FIG. 10A and FIG. 10B, the base station 110 may be a donor base station, and the base station 130 may be a relay base station.

According to the second communication situation, the base station 110 receives a wireless access signal 1010, which is an uplink signal, from the terminal 120 and transmits a wireless backhaul signal 1020, which is a downlink signal, to the base station 130, and the base station 130 transmits a wireless access signal 1030, which is a downlink signal, to the terminal 140. These signals may be concurrently transmitted or received via respective wireless channels. In particular, the base station 110 may transmit the wireless backhaul signal 1020 to the base station 130, while receiving the wireless access signal 1010 from the terminal 120. In this case, interference 1021 occurring from the wireless backhaul signal 1020 is an SI, and may be received together with the wireless access signal 1010 by the base station 110. Therefore, in order to identify the wireless access signal 1010, the base station 110 should remove the interference 1021 from the received signals. The base station 130 may transmit the wireless access signal 1030 to the terminal 140, while receiving the wireless backhaul signal 1020 from the base station 110. In this case, interference 1032 occurring from the wireless access signal 1030 is an SI, and may be received together with the wireless backhaul signal 1020 by the base station 130. Therefore, in order to identify the wireless backhaul signal 1020, the base station 130 should remove the interference 1032 from the received signals.

In general, in order to secure a UDG, the base station 110 determines TTA for the terminal 120 such that an uplink signal transmitted by the terminal 120 is received at a time point preceding by the UDG compared to a reference synchronization time point of the base station 110. In this case, the TTA for the terminal 120 may be determined as shown in <Equation 6> below.

$$TTA_{D1}=RTT_D+UDG_D \quad \text{[Equation 6]}$$

$TTA_{D1}$ refers to a time offset at which the terminal 120 transmits an uplink wireless access signal, $RTT_D$ refers to a time taken for a signal to travel a round-trip distance between the base station 110 and the terminal 120, and $UDG_D$ refers to a minimum time required for the base station 110 to change configurations of base station elements for receiving the uplink wireless access signal to configurations for transmitting a downlink wireless access signal.

If the terminal 120 transmits the wireless access signal according to $TTA_{D1}$, the base station 110 may receive the wireless access signal 1010 at a time point preceding, by $UDG_D$, the reference synchronization time point of the base station 110. In other words, RTA for the terminal 110 may be determined as shown in <Equation 7> below.

$$RTA_{D1}=TTA_{D1}-RTT_D=UDG_D \quad \text{[Equation 7]}$$

$RTA_{D1}$ refers to a time offset at which the base station 110 receives the wireless access signal 1010, $TTA_{D1}$ refers to a time offset at which the terminal 120 transmits the wireless access signal 1010, $RTT_D$ refers to a time taken for a signal to travel the round-trip distance between the base station 110 and the terminal 120, and $UDG_D$ refers to the minimum time required for the base station 110 to change configurations of base station elements for receiving the wireless access signal 1010 to configurations for transmitting a downlink wireless access signal.

If the terminal 120 transmits the wireless access signal 1010 according to $TTA_{D1}$, a subframe 1040 indicates an uplink subframe for the wireless access signal 1010 received by the base station 110. In the wireless access signal 1010, uplink data for the base station 110 may be transmitted from the terminal 120 via symbol 2 to symbol 12 of the subframe 1040. A subframe 1060 indicates a downlink subframe for the wireless backhaul signal 1020. In the wireless backhaul signal 1020, downlink data for the base station 130 may be transmitted from the base station 110 via symbol 1 to symbol 11 of the subframe 1060. The base station 110 receives the wireless access signal 1010 at the time point preceding, by $UDG_D$, the reference synchronization time point as shown in <Equation 7>, but transmits the wireless backhaul signal 1020 at the reference synchronization time point, and therefore the wireless access signal 1010 and the wireless backhaul signal 1020 are not time-synchronized. In other words, the subframe 1040 and the subframe 1060 are not time-synchronized with each other as illustrated in FIG. 10B, and therefore the base station 110 may not efficiently remove the interference 1021 occurring from the wireless backhaul signal 1020, and performance of signal reception may be degraded.

Therefore, according to various embodiments of the disclosure, the base station 110 determines TTA for the terminal 120 such that the wireless access signal 1010 transmitted by the terminal 120 is received at the transmission time point (i.e., the reference synchronization time point of the base station 110) of the wireless backhaul signal 1020. In this case, the TTA for the terminal 120 may be determined as shown in <Equation 8> below.

$$TTA_{D2}=RTT_D \quad \text{[Equation 8]}$$

$TTA_{D2}$ refers to a time offset at which the terminal 120 transmits the wireless access signal 1010 in the second communication situation, and $RTT_D$ refers to the time taken for a signal to travel the round-trip distance between the base station 110 and the terminal 120.

If the terminal 120 transmits the wireless access signal according to $TTA_{D2}$, the base station 110 may receive the wireless access signal 1010 at the reference synchronization time point of the base station 110. In other words, the RTA of the wireless access signal 1010 for the base station 110 may be determined as shown in <Equation 9> below.

$$RTA_{D2}=TTA_{D2}-RTT_D=0 \quad \text{[Equation 9]}$$

$RTA_{D2}$ refers to a time offset at which the base station 110 receives the wireless access signal 1010 in the second communication situation, $TTA_{D2}$ refers to a time offset at which the terminal 120 transmits the wireless access signal 1010 in the second communication situation, and $RTT_D$ refers to the time taken for a signal to travel the round-trip distance between the base station 110 and the terminal 120.

A subframe 1050 indicates an uplink subframe for the wireless access signal 1010 in a case where the terminal 120 transmits the wireless access signal 1010 according to $TTA_{D2}$. Referring to FIG. 10B, the subframe 1050 and the subframe 1060 may be time-synchronized with each other. In other words, the interference 1021 occurring from the wireless backhaul signal 1020 and the wireless access signal 1010 may be time-synchronized with each other with respect to the base station 110. Here, a value of $RTA_{D2}$ is smaller than a value of $UDG_D$, and therefore a protection section may be required for the base station 110 to secure $UDG_D$. To this end, the terminal 120 may transmit symbol 2 to symbol 11 of the subframe 1050, and may not transmit symbol 12. The base station 110 may use time sections corresponding to symbol 1 and symbol 12 as protection sections.

In the embodiment described above, the terminal 120 did not transmit symbol 12 so as to allow the base station to secure $UDG_D$, but this is exemplary. The terminal may not transmit a symbol other than symbol 12. For example, in order to allow the base station to secure $UDG_D$, the terminal 120 may transmit symbol 12, but may not transmit symbol 13.

If the base station 110 receives the interference 1021 having occurred from the wireless access signal 1010 transmitted according to $TTA_{D2}$ of <Equation 8> and the wireless backhaul signal 1020 transmitted at the reference synchronization time point, and performs DFT or FFT calculation of size N for the received signals, interference between adjacent symbols may not occur. In the second communication situation, a result of the DFT or FFT calculation of size N for the received signals by the base station 110 may be represented as the following <Equation 10>.

$$R_{2\_110}[n]=Y_{1010}[n]+Y_{1021}[n]+N[n], n=0,1,\ldots,M-1 \quad \text{[Equation 10]}$$

$R_{2\_110}[n]$ refers to received signals of the base station 110 in the second communication situation, $Y_{1010}[n]$ refers to the wireless access signal 1010, $Y_{1021}[n]$ refers to the interference 1021, N[n] refers to noise, in which n is a sub-carrier index, and M refers to a total number of sub-carriers.

If the symbol 610 and the symbol 620 are transmitted at symbol locations of the same number (e.g., symbol number 4) in the time-synchronized wireless backhaul signal 1010 and wireless access signal 1020, respectively, the base station 110 may estimate a channel value of the wireless access signal 1010 and a channel value of the interference 1021 on the basis of the received signals. The interference 1021 received by the base station 110 may be determined on the basis of the channel value of the interference 1021 and the wireless backhaul signal 1020 transmitted by the base station 110, as shown in <Equation 11>.

$$Y_{1011}[n]=X_{1020}[n]*H_{1021}[n], n=0,1,\ldots,M-1 \quad \text{[Equation 11]}$$

$Y_{1021}[n]$ refers to the interference 1021, $X_{1020}[n]$ refers to the wireless backhaul signal 1020, $H_{1021}[n]$ refers to the channel value of the interference 1021, in which n is a sub-carrier index, and M refers to a total number of sub-carriers.

Then, according to <Equation 12>, the base station 110 may remove the interferences 1021 from the received signals, and may detect data of the wireless access signal 932.

$$R_{1010}[n]=R_{2\_110}[n]-Y_{1021}[n]=R_{2\_110}[n]-(X_{1020}[n]*H_{1021}[n]), n=0,1,\ldots,M-1 \quad \text{[Equation 12]}$$

$R_{1010}[n]$ refers to the wireless access signal 1010 from which interference has been removed, $R_{2\_110}[n]$ refers to the received signals of the base station 110 in the second communication situation, $Y_{1021}[n]$ refers to the interference 1021, $X_{1020}[n]$ refers to the wireless backhaul signal 1020 transmitted by the base station 130, $H_{1021}[n]$ refers to the channel value of the interference 1021, in which n is a sub-carrier index, and M refers to a total number of sub-carriers.

A subframe 1070 indicates a downlink subframe for the wireless access signal 1030. In the wireless access signal 1030, downlink data for the terminal 140 may be transmitted from the base station 130 via symbol 1 to symbol 11 of the subframe 1070. The wireless backhaul signal 1020 and the wireless access signal 1030 are both downlink signals, and therefore the base station 130 receives the interference 1032, which has occurred from the wireless backhaul signal 1020 and the wireless access signal 1030, at the reference synchronization time point. That is, as illustrated in FIG. 10B, the subframe 1060 and the subframe 1070 may be time-synchronized, and if the base station 130 performs DFT or FFT calculation of size N for each symbol in the received signals (including the wireless backhaul signal 1020 and interference 1032), interference between adjacent symbols may not occur.

In the second communication situation, a result of the DFT or FFT calculation of size N for the received signals of the base station 130 may be expressed as the following <Equation 13>.

$$R_{2\_130}[n]=Y_{1020}[n]+Y_{1032}[n]+N[n], n=0,1,\ldots,M-1 \quad \text{[Equation 13]}$$

$R_{2\_130}[n]$ refers to received signals of the base station 130 in the second communication situation, $Y_{1020}[n]$ refers to the wireless backhaul signal 1020, $Y_{1032}[n]$ refers to the interference 1032, N[n] refers to noise, in which n is a sub-carrier index, and M refers to a total number of sub-carriers.

If the symbol 610 and the symbol 620 are transmitted at symbol locations of the same number (e.g., symbol number 4) in the time-synchronized wireless backhaul signal 1020 and wireless access signal 1030, respectively, the base station 130 may estimate a channel value of the wireless backhaul signal 1020 and a channel value of the interference 1032 on the basis of the received signals. The interference 1032 received by the base station 130 may be determined on the basis of the channel value of the interference 1032 and the wireless access signal 1030 transmitted by the base station 130, as shown in <Equation 14>.

$$Y_{1032}[n]=X_{1030}[n]*H_{1032}[n], n=0,1,\ldots,M-1 \quad \text{[Equation 14]}$$

$Y_{1032}[n]$ refers to the interference 1032, $X_{1030}[n]$ refers to the wireless access signal 1030, $H_{1032}[n]$ refers to the channel value of the interference 1032, in which n is a sub-carrier index, and M refers to a total number of sub-carriers.

Then, according to <Equation 15>, the base station 130 may remove the interference 1032 from the received signals, and may detect data of the wireless backhaul signal 1020.

$$R_{1020}[n]=R_{2\_130}[n]-Y_{1032}[n]=R_{2\_130}[n]= \\ (X_{1030}[n]*H_{1032}[n]), n=0,1,\ldots,M-1 \quad \text{[Equation 15]}$$

$R_{1020}[n]$ refers to the wireless backhaul signal 1020 from which interference has been removed, $R_{2\_130}[n]$ refers to the received signals of the base station 130 in the second communication situation, $Y_{1032}[n]$ refers to the interference 1032, $X_{1030}[n]$ refers to the wireless access signal 1030, $H_{1032}[n]$ refers to the channel value of the interference 1032, in which n is a sub-carrier index, and M refers to a total number of sub-carriers.

According to various embodiments of the disclosure, other interferences 1012, 1013, 1023, and 1031 may also occur, but it is assumed that the interferences may be easily removed according to a suitable interference cancellation technique (e.g., MMSE-OSIC and MMSE-OSIC$^2$).

Figure 11A:
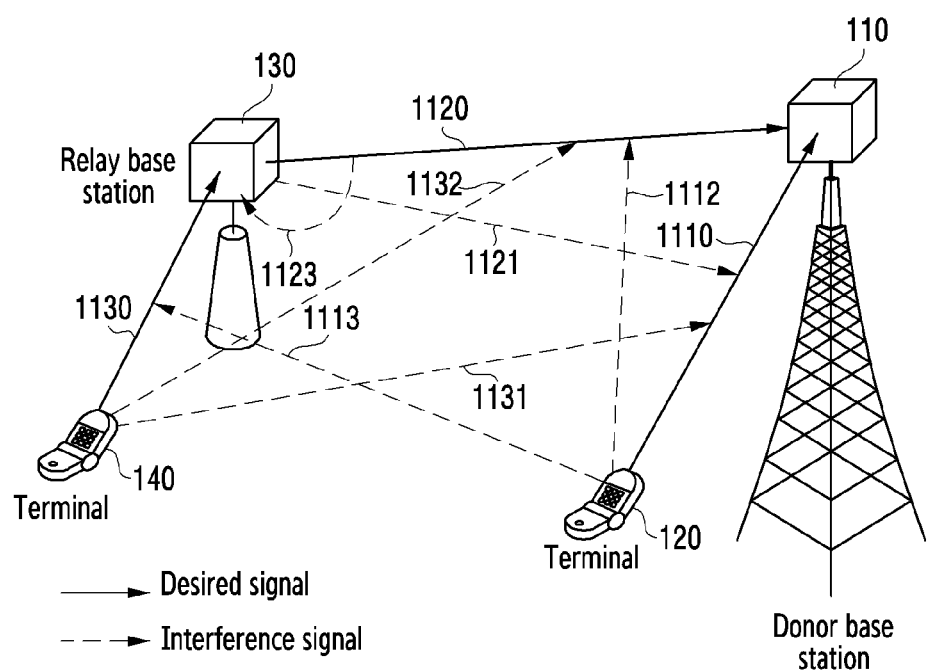
FIG. 11A and FIG. 11B are diagrams illustrating principles of interference estimation and determination of a transmission time point in a third communication situation of the wireless communication system according to various embodiments of the disclosure.
Figure 11B:
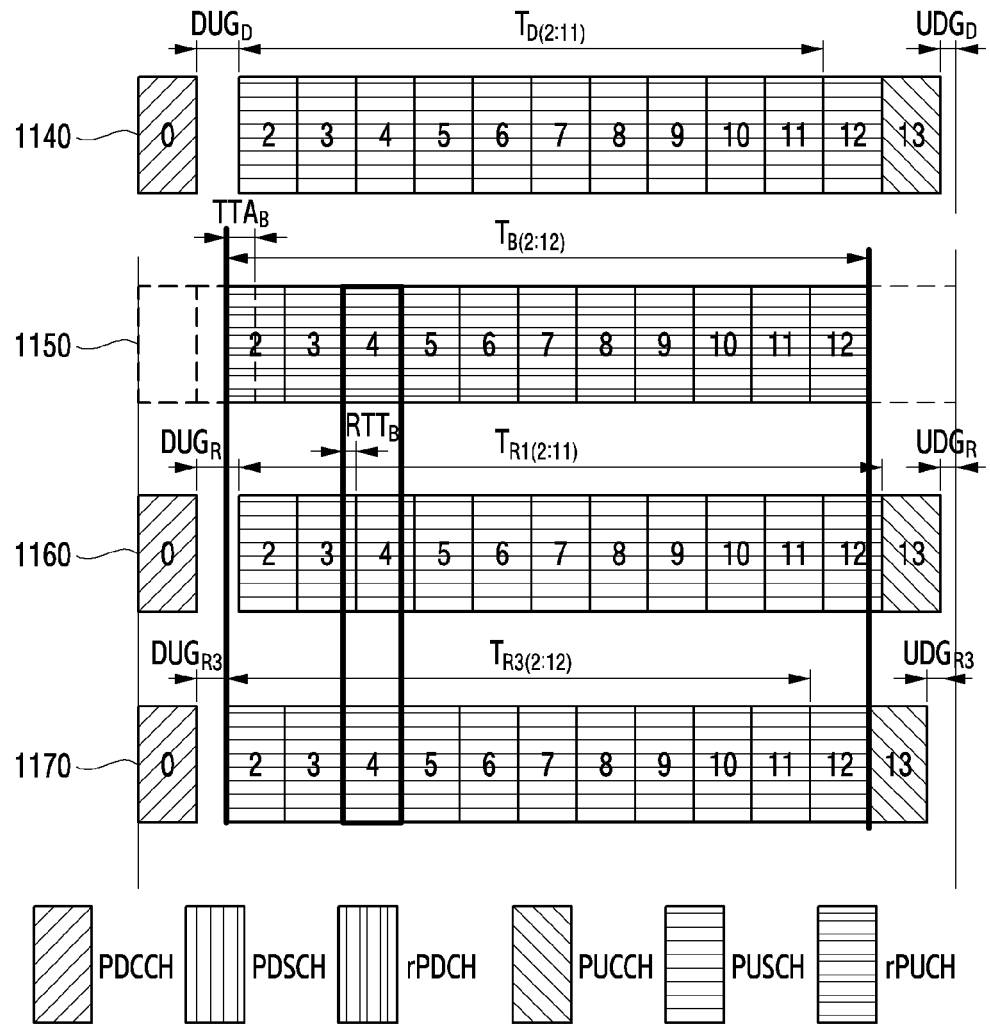

FIG. 11A and FIG. 11B are diagrams illustrating principles of interference estimation and determination of a transmission time point in a third communication situation of the wireless communication system according to various embodiments of the disclosure. In FIG. 11A and FIG. 11B, the base station 110 may be a donor base station, and the base station 130 may be a relay base station.

According to a third communication situation, the base station 110 receives the wireless access signal 1110, which is an uplink signal, from the terminal 120, and receives the wireless backhaul signal 1120, which is an uplink signal, from the base station 130, and the base station 130 receives the wireless access signal 1130, which is an uplink signal, from the terminal 140. These signals may be concurrently transmitted or received via respective wireless channels. In particular, the base station 110 may receive the wireless backhaul signal 1120 from the base station 130, while receiving the wireless access signal 1110 from the terminal 120. In this case, interference 1121 occurring from the wireless backhaul signal 1120 may influence reception of the wireless access signal 1110, and interference 1112 occurring from the wireless access signal 1110 may influence reception of the wireless backhaul signal 1120. Therefore, in order to identify the wireless access signal 1110 and the wireless backhaul signal 1120, the base station 110 should remove the interference 1112 and the interference 1121 from the received signals. The base station 130 may receive the wireless access signal 1130 from the terminal 140, while transmitting the wireless backhaul signal 1120 to the base station 110. In this case, interference 1123 occurring from the wireless backhaul signal 1120 is an SI, and may be received together with the wireless access signal 1130 by the base station 130. Therefore, in order to identify the wireless access signal 1130, the base station 130 should remove the interference 1123 from the received signals.

In order to secure a UDG for the base station 110, the terminal 120 may transmit the wireless access signal 1110 according to the $TTA_{D1}$ of <Equation 6>. If the terminal 120 transmits the wireless access signal 1110 according to the $TTA_{D1}$ of <Equation 6>, a subframe 1140 indicates an uplink subframe for the wireless access signal 1110 received by the base station 110. In the wireless access signal 1110, uplink data for the base station 110 may be transmitted from the terminal 120 via symbol 2 to symbol 12 of the subframe 1140. According to the subframe 1140, the base station 110 may receive the wireless access signal 1110 at a time point preceding, by $UDG_D$, the reference synchronization time point of the base station 110 according to <Equation 7>.

For time-synchronization of the wireless backhaul signal 1120 and the wireless access signal 1130, the base station 130 may transmit the wireless backhaul signal 1120 according to TTA determined by the following <Equation 16>.

$$TTA_{B1}=RTT_B+UDG_D \quad \text{[Equation 16]}$$

$TTA_{B1}$ refers to a time offset at which the base station 130 transmits the wireless backhaul signal 1120, $RTT_B$ refers to a time taken for a signal to travel the round-trip distance between the base station 110 and the base station 130, and $UDG_D$ refers to the minimum time required for the base station 110 to change configurations of base station elements for receiving the uplink wireless access signal to configurations for transmitting a downlink wireless access signal.

If the base station 130 transmits the wireless backhaul signal 1020 according to $TTA_{B1}$, the base station 110 may receive the wireless backhaul signal 1120 at a time point preceding, by $UDG_D$, the reference synchronization time point of the base station 110. In other words, the RTA of the wireless backhaul signal 1120 for the base station 110 may be determined as shown in <Equation 17> below.

$$RTA_{B1}=TTA_{B1}-RTT_B=UDG_D \quad \text{[Equation 17]}$$

$RTA_{B1}$ refers to a time offset at which the base station 110 receives the wireless backhaul signal 1120 in the third communication situation, $TTA_{B1}$ refers to a time offset at which the base station 130 transmits the wireless backhaul signal 1120 in the third communication situation, $RTT_B$ refers to the time taken for a signal to travel the round-trip distance between the base station 110 and the base station 130, and $UDG_D$ refers to the minimum time required for the base station 110 to change configurations of base station elements for receiving the wireless access signal to configurations for transmitting a downlink wireless access signal.

A subframe 1150 indicates an uplink subframe for the wireless backhaul signal 1120 in a case where the base station 130 transmits the wireless backhaul signal 1120 according to $TTA_{B1}$. In the wireless backhaul signal 1120, uplink data for the base station 110 may be transmitted from the base station 130 via symbol 2 to symbol 12 of the subframe 1150.

As described above, if the terminal 120 transmits the wireless access signal 1110 according to the $TTA_{D1}$ of <Equation 6>, and the base station 130 transmits the wireless backhaul signal 1120 according to $TTA_{B1}$ of <Equation 16>, the base station 110 may receive the wireless access signal 1110 and the wireless backhaul signal 1120 at a time point preceding, by $UDG_D$, the reference synchronization time point of the base station 110. The interference 1112 having occurred from the wireless access signal 1110 and the interference 1121 having occurred from the wireless backhaul signal 1120 may also be received at a time point preceding, by $UDG_D$, the reference synchronization time point of the base station 110. Therefore, all the wireless access signal 1110, the interference 1112, the wireless backhaul signal 1120, and the interference 1121 may be time-synchronized for the base station 110, and the base station 110 may select a DFT section or an FFT section, in which no interference occurs between adjacent symbols, and may perform DFT or FFT calculation of size N for the received signals (including the wireless access signal 1110, the interference 1112, the wireless backhaul signal 1120 and the interference 1121).

In the third communication situation, a result of the DFT or FFT calculation of size N for the received signals by the base station 110 may be represented as the following <Equation 18>.

$$R_{3\_110}[n] = \begin{pmatrix} R_{1110}[n] \\ R_{1120}[n] \end{pmatrix}, n = 0, 1, \cdots, M - 1 \quad \text{[Equation 18]}$$

$R_{3\_110}[n]$ refers to the received signals of the base station 110 in the third communication situation, $R_{1110}[n]$ refers to a signal received in the base station 110 through a reception antenna for wireless access communication, $R_{1120}[n]$ refers to a signal received in the base station 110 through a reception antenna for wireless backhaul communication, in which n is a sub-carrier index, and M refers to a total number of sub-carriers.

If the symbol 610 and the symbol 620 are transmitted at symbol locations of the same number (e.g., symbol number 4) in the time-synchronized wireless backhaul signal 1010 and wireless access signal 1120, respectively, the base station 110 may estimate a channel value of the wireless access signal 1110, a channel value of the interference 1112, a channel value of the wireless backhaul signal 1120, and a channel value of the interference 1121 on the basis of the received signals. A channel matrix estimated by the base station 110 may be represented as shown in <Equation 19> below.

$$H_{3\_110}[n] = \begin{pmatrix} H_{1110}[n] & H_{1121}[n] \\ H_{1112}[n] & H_{1120}[n] \end{pmatrix}, n = 0, 1, \cdots, M - 1 \quad \text{[Equation 19]}$$

$H_{3\_110}[n]$ refers to the channel matrix estimated by the base station 110 in the third communication situation, $H_{1110}[n]$ refers to the channel value of the wireless access signal 1110, $H_{1121}[n]$ refers to the channel value of the reference 1121, $H_{1112}[n]$ refers to the channel value of the reference 1112, $H_{1120}[n]$ refers to the channel value of the wireless backhaul signal 1120, in which n is a sub-carrier index, and M refers to a total number of sub-carriers.

Then, the base station 110 may remove the interference 1112 and the interference 1121 in the received signals by means of the estimated channel matrix, and may detect data of the wireless access signal 1110 and data of the wireless backhaul signal 1120. In order to detect data of the wireless access signal 1110 and data of the wireless backhaul signal 1120, a suitable multi-antenna detection technique (e.g., MMSE-OSIC and MMSE-OSIC$^2$) may be used.

In general, in order to secure the UDG, the base station 130 determines TTA for the terminal 140 such that an uplink signal transmitted by the terminal 140 is received at a time point preceding, by the UDG, the reference synchronization time point of the base station 130. In this case, the TTA for the terminal 140 may be determined as shown in <Equation 20> below.

$$TTA_{R1} = RTT_R + UDG_R \quad \text{[Equation 20]}$$

$TTA_{R1}$ refers to a time offset at which the terminal 140 transmits an uplink wireless access signal, $RTT_R$ refers to a time taken for a signal to travel a round-trip distance between the base station 130 and the terminal 140, and $UDG_R$ refers to a minimum time required for the base station 130 to change configurations of base station elements for receiving the uplink wireless access signal to configurations for transmitting a downlink wireless access signal.

If the terminal 140 transmits the wireless access signal 1130 according to $TTA_{R1}$, the base station 130 may receive the wireless access signal 1130 at a time point preceding, by $UDG_R$, the reference synchronization time point of the base station 130. In other words, RTA of the terminal 110 for the wireless access signal 130 may be determined as shown in <Equation 21> below.

$$RTA_{R1} = TTA_{R1} - RTT_R = UDG_R \quad \text{[Equation 21]}$$

$RTA_{R1}$ refers to a time offset at which the base station 130 receives the wireless access signal 1130, $TTA_{R1}$ refers to a time offset at which the terminal 140 transmits the wireless access signal 1130, $RTT_R$ refers to the time taken for a signal to travel the round-trip distance between the base station 130 and the terminal 140, and $UDG_R$ refers to the minimum time required for the base station 130 to change configurations of base station elements for receiving the wireless access signal 1130 to configurations for transmitting a downlink wireless access signal.

If the terminal 140 transmits the wireless access signal 1130 according to $TTA_{R1}$, a subframe 1160 indicates an uplink subframe for the wireless access signal 1130 received by the base station 130. In the wireless access signal 1130, uplink data for the base station 130 may be transmitted from the terminal 140 via symbol 2 to symbol 12 of the subframe 1160. If the terminal 140 transmits the wireless access signal 1130 according to $TTA_{R1}$, the base station 130 receives the wireless access signal 1130 at a time point preceding, by $UDG_R$, the reference synchronization time point of the base station 130. However, the base station 130 transmits the wireless backhaul signal 1130 according to $TTA_{B1}$ in the third communication situation, the wireless backhaul signal 120 and the wireless access signal 1130 are not time-synchronized. In other words, as illustrated in FIG. 11B, the subframe 1150 and the subframe 1160 are not time-synchronized with each other. If $UDG_R$ and $UDG_D$ are the same, a time-synchronization error of $TTA_{B1} - TTA_{R1} = RTT_B$ may exist between the wireless backhaul signal 1120 and the wireless access signal 1130, and a time-synchronization error corresponding to $RTT_B$ may be much larger than a CP length of the symbol. In this case, when the base station 130 performs the DFT or FFT calculation of size N for the received signals (the interference 1123 occurring from the wireless backhaul signal 1120 and the wireless access signal 1130), interference between adjacent symbols may occur, and this may prevent the base station 130 from efficiently removing the interference 1123 and may decrease performance of signal reception.

Therefore, according to various embodiments of the disclosure, the base station 130 determines TTA for the terminal 140 such that the wireless access signal 1130 transmitted by the terminal 140 is received at the transmission time point (i.e., a time point preceding, by $TTA_{B1}$, the reference synchronization time point of the base station 130) of the wireless backhaul signal 1120. In this case, TTA of the wireless access signal 1130 for the base station 140 may be determined as shown in <Equation 22> below.

$$TTA_{R3} = RTT_R + TTA_{B1} \quad \text{[Equation 22]}$$

$TTA_{R3}$ refers to a time offset at which the terminal 140 transmits the wireless access signal 1130 in the third communication situation, $RTT_R$ refers to the time required for a signal to travel the round-trip distance between the base station 130 and the terminal 140, and $TTA_{B1}$ refers to a time offset at which the base station 130 transmits the wireless backhaul signal 120.

If the terminal 140 transmits the wireless access signal 1130 according to $TTA_{R3}$, the base station 130 may receive the wireless access signal 1130 at a time point preceding, by $TTA_{B1}$, the reference synchronization time point of the base station 130. In other words, RTA of the wireless access signal 1130 for the base station 130 may be determined as shown in <Equation 23> below.

$$RTA_{R3} = TTA_{R3} - RTT_R = TTA_{B1} \quad \text{[Equation 23]}$$

$RTA_{R3}$ refers to a time offset at which the base station 130 receives the wireless access signal 1130 in the third communication situation, $TTA_{R3}$ refers to a time offset at which the terminal 140 transmits the wireless access signal 1130 in the third communication situation, $RTT_R$ refers to the time taken for a signal to travel the round-trip distance between the base station 130 and the terminal 140, and $TTA_{B1}$ refers to a time offset at which the base station 130 transmits the wireless backhaul signal 1120.

A subframe 1170 indicates an uplink subframe for the wireless access signal 1130 in a case where the terminal 140 transmits the wireless access signal 1130 according to $TTA_{R3}$. Referring to FIG. 11B, the subframe 1150 and the subframe 1170 are time-synchronized with each other. In other words, the interference 1123 occurring from the wireless backhaul signal 1120 and the wireless access signal 1130 may be time-synchronized with each other with respect to the base station 130. The base station 130 may secure a UDG corresponding to $TTA_{B1}$.

If, in the third communication situation, the base station 130 receives the interference 1123 having occurred from the wireless backhaul signal 1120 transmitted according to $TTA_{B1}$ of <Equation 16> and the wireless access signal 1130 transmitted according to $TTA_{R3}$ of <Equation 22>, and performs DFT or FFT calculation of size N for the received signals, interference between adjacent symbols may not occur. In the third communication situation, a result of the DFT or FFT calculation of size N for the received signals by the base station 130 may be represented as the following <Equation 24>.

$$R_{3\_130}[n] = Y_{1123}[n] + Y_{1130}[n] + N[n], n=0,1,\ldots,M-1 \quad \text{[Equation 24]}$$

$R_{3\_130}[n]$ refers to received signals of the base station 130 in the third communication situation, $Y_{1123}[n]$ refers to the interference 1123, $Y_{1130}[n]$ refers to the wireless access signal 1130, $N[n]$ refers to noise, in which n is a sub-carrier index, and M refers to a total number of sub-carriers.

If the symbol 610 and the symbol 620 are transmitted at symbol locations of the same number (e.g., symbol number 4) in the time-synchronized wireless backhaul signal 1120 and wireless access signal 1130, respectively, the base station 130 may estimate a channel value of the wireless access signal 1130 and a channel value of the interference 1123 on the basis of the received signals. The interference 1123 received by the base station 130 may be determined on the basis of the channel value of the interference 1123 and the wireless backhaul signal 1120 transmitted by the base station 130, as shown in <Equation 25>.

$$Y_{1123}[n] = X_{1120}[n] * H_{1123}[n], n=0,1,\ldots,M-1 \quad \text{[Equation 25]}$$

$Y_{1123}[n]$ refers to the interference 1123, $X_{1120}[n]$ refers to the wireless backhaul signal 1120, $H_{1123}[n]$ refers to the channel value of the interference 1123, in which n is a sub-carrier index, and M refers to a total number of sub-carriers.

Then, according to <Equation 26>, the base station 130 may remove the interferences 1123 from the received signals, and may detect data of the wireless access signal 1130.

$$R_{1130}[n] = R_{3\_130}[n] - Y_{1123}[n] = R_{3\_130}[n] - (X_{1120}[n] * H_{1123}[n]), n=0,1,\ldots,M-1 \quad \text{[Equation 26]}$$

$R_{1130}[n]$ refers to the wireless access signal 1130 from which interference has been removed, $R_{3\_130}[n]$ refers to the received signals of the base station 110 in the third communication situation, $Y_{1123}[n]$ refers to the interference 1123, $X_{1120}[n]$ refers to the wireless backhaul signal 1130 transmitted by the base station 130, $H_{1123}[n]$ refers to the channel value of the interference 1123, in which n is a sub-carrier index, and M refers to a total number of sub-carriers.

According to various embodiments of the disclosure, other interferences 1113, 1131, and 1132 may also occur, but it is assumed that the interferences may be easily removed according to a suitable interference cancellation technique (e.g., MMSE-OSIC and MMSE-OSIC$^2$).

Figure 12A:
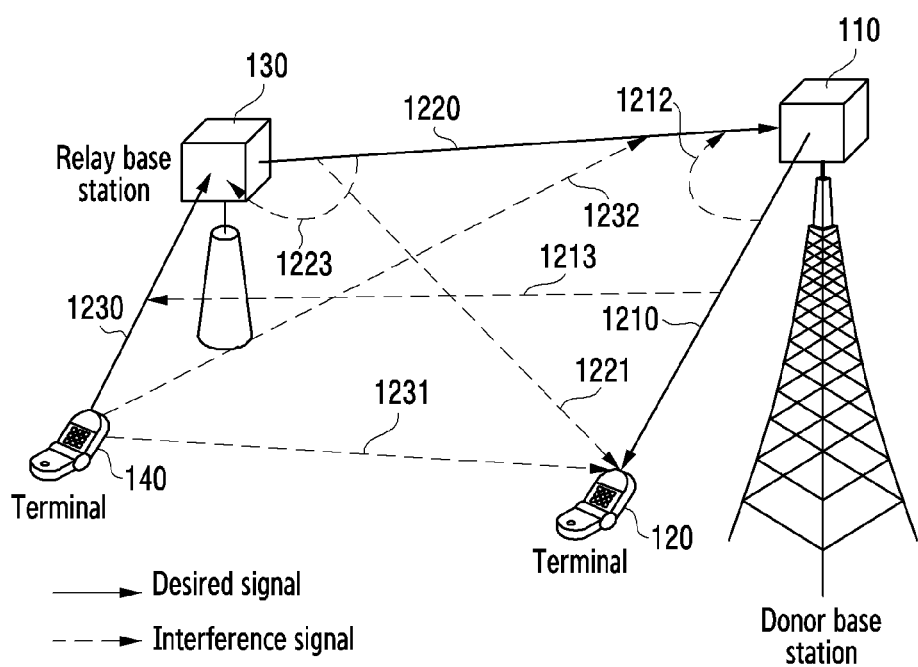
FIG. 12A and FIG. 12B are diagrams illustrating principles of interference estimation and determination of a transmission time point in a fourth communication situation of the wireless communication system according to various embodiments of the disclosure.
Figure 12B:
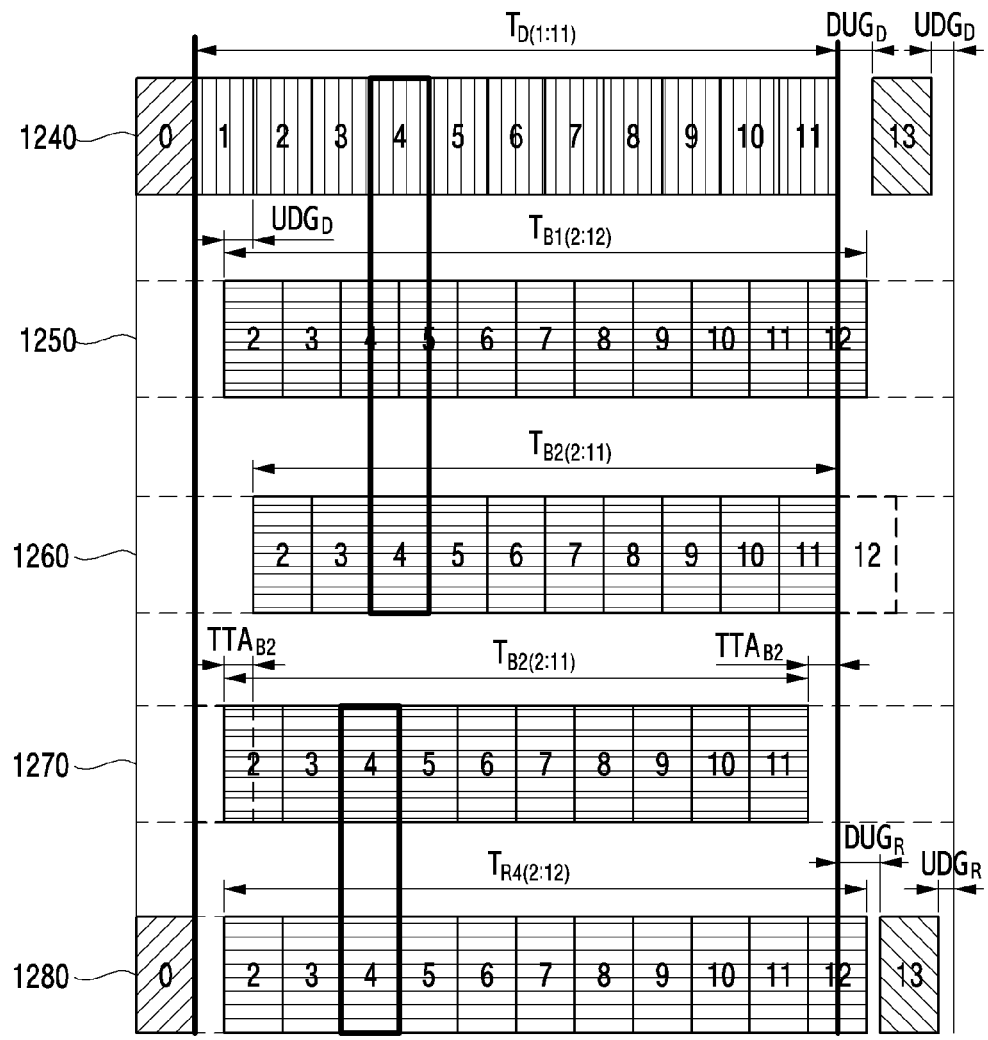

FIG. 12A and FIG. 12B are diagrams illustrating principles of interference estimation and determination of a transmission time point in a fourth communication situation of the wireless communication system according to various embodiments of the disclosure. In FIG. 12A and FIG. 12B, the base station 110 may be a donor base station, and the base station 130 may be a relay base station.

According to the fourth communication situation, the base station 110 transmits a wireless access signal 1210, which is a downlink signal, to the terminal 120 and receives a wireless backhaul signal 1220, which is an uplink signal, from the base station 130, and the base station 130 receives a wireless access signal 1230, which is an uplink signal, from the terminal 140. These signals may be concurrently transmitted or received via respective wireless channels. In particular, the base station 110 may receive the wireless backhaul signal 1220 from the base station 130, while transmitting the wireless access signal 1210 to the terminal 120. In this case, interference 1212 occurring from the wireless access signal 1210 is an SI, and may be received together with the wireless backhaul signal 1220 by the base station 110. Therefore, in order to identify the wireless backhaul signal 1220, the base station 110 should remove the interference 1212 from the received signals. The base station 130 may receive the wireless access signal 1230 from the terminal 140, while transmitting the wireless backhaul signal 1220 to the base station 110. In this case, interference 1223 occurring from the wireless backhaul signal 1220 is an SI, and may be received together with the wireless access signal 1230 by the base station 130. Therefore, in order to identify the wireless access signal 1230, the base station 130 should remove the interference 1223 from the received signals.

A subframe 1240 indicates a downlink subframe for the wireless access signal 1210. In the wireless access signal 1210, downlink data for the terminal 120 may be transmitted from the base station 110 via symbol 1 to symbol 11 of the subframe 1240. A subframe 1250 indicates an uplink subframe for the wireless backhaul signal 1220 in a case where the base station 130 transmits the wireless backhaul signal 1220 according to $TTA_{B1}$ of <Equation 16>. In the wireless backhaul signal 1220, uplink data for the base station 110 may be transmitted from the base station 130 via symbol 2 to symbol 12 of the subframe 1250. If the base station 130 transmits the wireless backhaul signal 1220 according to $TTA_{B1}$ of <Equation 16>, the base station 110 may receive the wireless backhaul signal 1220 at a time point preceding, by $UDG_D$, the reference synchronization time point of the base station 110 according to <Equation 17>. However, the base station 110 transmits the wireless access signal 1210 at the reference synchronization time point, and therefore the wireless access signal 1210 and the wireless backhaul signal 1220 may not be time-synchronized. In other words, the subframe 1240 and the subframe 1250 are not time-synchronized with each other as illustrated in FIG. 12B, and therefore the base station 110 may not efficiently remove the interference 1212 occurring from the wireless access signal 1210, and performance of signal reception may be degraded.

Therefore, according to various embodiments of the disclosure, the base station 110 determines TTA for the base station 130 such that the wireless backhaul signal 1220 transmitted by the base station 130 is received at the transmission time point (i.e., the reference synchronization time point of the base station 110) of the wireless access signal 1210. In this case, the TTA for the base station 130 may be determined as shown in <Equation 27> below.

$$TTA_{B2}=RTT_B \quad \text{[Equation 27]}$$

$TTA_{B2}$ refers to a time offset at which the base station 130 transmits the wireless backhaul signal 1220 in the fourth communication situation, and $RTT_B$ refers to the time taken for a signal to travel the round-trip distance between the base station 110 and the base station 130.

If the base station 130 transmits the wireless backhaul signal 1220 according to $TTA_{B2}$, the base station 110 may receive the wireless backhaul signal 1220 at the reference synchronization time point of the base station 110. In other words, the RTA of the wireless backhaul signal 1220 for the base station 110 may be determined as shown in <Equation 28> below.

$$RTA_{B2}=TTA_{B2}-RTT_B=0 \quad \text{[Equation 28]}$$

$RTA_{B2}$ refers to a time offset at which the base station 110 receives the wireless backhaul signal 1220 in the fourth communication situation, $TTA_{B2}$ refers to a time offset at which the base station 130 transmits the wireless backhaul signal 1220 in the fourth communication situation, and $RTT_B$ refers to the time taken for a signal to travel the round-trip distance between the base station 110 and the base station 130.

If the base station 130 transmits the wireless backhaul signal 1220 according to $TTA_{B2}$, a subframe 1260 indicates an uplink subframe for the wireless backhaul signal 1220 received by the base station 110. Referring to FIG. 12B, the subframe 1240 and the subframe 1260 may be time-synchronized with each other. In other words, the interference 1212 occurring from the wireless access signal 1210 and the wireless backhaul signal 1220 may be time-synchronized with each other for the base station 110. Here, symbol 13 of the subframe 1240 is received by the base station 110 from the terminal 120 according to $RTA_{D1}$ of <Equation 7>, and may thus collide with symbol 12 of the subframe 1260. In order to avoid collision, the base station 130 may not transmit symbol 12 of the subframe 1260.

In the embodiment described above, the base station 130 did not transmit symbol 12 of the subframe 1260 to avoid the collision with symbol 13 of the subframe 1240, but this is exemplary, and the base station 130 may not transmit a symbol other than symbol 12. For example, in order to avoid the collision with symbol 13 of the subframe 1240, the base station 130 may transmit symbol 12, but may not transmit symbol 13.

If the base station 110 receives the interference 1212 having occurred from the wireless access signal 1210 transmitted at the reference synchronization time point and the wireless backhaul signal 1220 transmitted according to $TTA_{B2}$ of <Equation 27>, and performs DFT or FFT calculation of size N for the received signals, interference between adjacent symbols may not occur. In the fourth communication situation, a result of the DFT or FFT calculation of size N for the received signals by the base station 110 may be represented as the following <Equation 29>.

$$R_{4\_110}[n]=Y_{1212}[n]+Y_{1220}[n]+N[n], n=0,1,\ldots,M-1 \quad \text{[Equation 29]}$$

$R_{4\_110}[n]$ refers to received signals of the base station 110 in the fourth communication situation, $Y_{1212}[n]$ refers to the interference 1212, $Y_{1220}[n]$ refers to the wireless backhaul signal 1220, N[n] refers to noise, in which n is a sub-carrier index, and M refers to a total number of sub-carriers.

If the symbol 610 and the symbol 620 are transmitted at symbol locations of the same number (e.g., symbol number 4) in the time-synchronized wireless access signal 1210 and wireless backhaul signal 1220, respectively, the base station 110 may estimate a channel value of the interference 1212 and a channel value of the wireless backhaul signal 1220 on the basis of the received signals. The interference 1212 received by the base station 110 may be determined on the basis of the channel value of the interference 1212 and the wireless access signal 1210 transmitted by the base station 110, as shown in <Equation 30>.

$$Y_{1212}[n]=X_{1210}[n]*H_{1212}[n], n=0,1,\ldots,M-1 \quad \text{[Equation 30]}$$

$Y_{1212}[n]$ refers to the interference 1212, $X_{1210}[n]$ refers to the wireless access signal 1210, $H_{1212}[n]$ refers to the channel value of the interference 1212, in which n is a sub-carrier index, and M refers to a total number of sub-carriers.

Then, according to <Equation 31>, the base station 110 may remove the interference 1212 from the received signals, and may detect data of the wireless backhaul signal 1220.

$$R_{1220}[n]=R_{4\_110}[n]-Y_{1212}[n]=R_{4\_110}[n]-(X_{1210}[n]*H_{1212}[n]), n=0,1,\ldots,M-1 \quad \text{[Equation 31]}$$

$R_{1220}[n]$ refers to the wireless backhaul signal 1220 from which interference has been removed, $R_{4\_110}[n]$ refers to the received signals of the base station 110 in the fourth communication situation, $Y_{1212}[n]$ refers to the interference 1212, $X_{1210}[n]$ refers to the wireless access signal 1210 transmitted by the base station 110, $H_{1212}[n]$ refers to the channel value of the interference 1212, in which n is a sub-carrier index, and M refers to a total number of sub-carriers.

A subframe 1270 indicates an uplink subframe for the wireless backhaul signal 1220 transmitted by the base station 130 according to $TTA_{B2}$. In order to efficiently remove interference 1223, the wireless backhaul signal 1220 and the wireless access signal 1230 are required to time-synchronized for the base station 130. To this end, according to various embodiments of the disclosure, the base station 130 determines TTA for the terminal 140 such that the wireless access signal 1230 transmitted by the terminal 140 is received at the transmission time point (i.e., a time point preceding, by $TTA_{B2}$, the reference synchronization time point of the base station 130) of the wireless backhaul signal 1220. In this case, TTA of the wireless access signal 1230 for the base station 140 may be determined as shown in <Equation 32> below.

$$TTA_{R4}=RTT_R+TTA_{B2}=RTT_R+RTT_B \quad \text{[Equation 32]}$$

$TTA_{R4}$ refers to a time offset at which the terminal 140 transmits the wireless access signal 1230 in the fourth communication situation, $RTT_R$ refers to the time required for a signal to travel the round-trip distance between the base station 130 and the terminal 140, $TTA_{B2}$ refers to a time offset at which the base station 130 transmits the wireless backhaul signal 120 in the fourth communication situation, and $RTT_B$ refers to the time taken for a signal to travel the round-trip distance between the base station 110 and the base station 130.

If the terminal 140 transmits the wireless access signal 1230 according to $TTA_{R4}$, the base station 130 may receive the wireless access signal 1230 at a time point preceding, by $TTA_{B2}$, the reference synchronization time point of the base station 130. In other words, RTA of the wireless access signal 1230 for the base station 130 may be determined as shown in <Equation 33> below.

$$RTA_{R4}=TTA_{R4}-RTT_R=TTA_{B2}=RTT_B \quad \text{[Equation 33]}$$

$RTA_{R4}$ refers to a time offset at which the base station 130 receives the wireless access signal 1230 in the fourth communication situation, $TTA_{R4}$ refers to a time offset at which the terminal 140 transmits the wireless access signal 1230 in the fourth communication situation, $RTT_R$ refers to the time taken for a signal to travel the round-trip distance between the base station 130 and the terminal 140, $TTA_{B2}$ refers to a time offset at which the base station 130 transmits the wireless backhaul signal 1220 in the fourth communication situation, and $RTT_B$ refers to the time taken for a signal to travel the round-trip distance between the base station 110 and the base station 130.

If the terminal 140 transmits the wireless access signal 1230 according to $TTA_{R4}$, a subframe 1280 indicates an uplink subframe for the wireless access signal 1230 received by the base station 130. Referring to FIG. 12B, the subframe 1270 and the subframe 1280 are time-synchronized with each other. In other words, the interference 1223 occurring from the wireless backhaul signal 1220 and the wireless access signal 1230 may be time-synchronized with each other with respect to the base station 130.

If, in the fourth communication situation, the base station 140 receives the interference 1223 having occurred from the wireless backhaul signal 1220 transmitted according to $TTA_{B2}$ of <Equation 27> and the wireless access signal 1230 transmitted according to $TTA_{R4}$ of <Equation 32>, and performs DFT or FFT calculation of size N for the received signals, interference between adjacent symbols may not occur. In the fourth communication situation, a result of the DFT or FFT calculation of size N for the received signals of the base station 140 may be represented as the following <Equation 34>.

$$R_{4\_130}[n]=Y_{1223}[n]+Y_{1230}[n]+N[n], n=0,1,\ldots,M-1 \quad \text{[Equation 34]}$$

$R_{4\_130}[n]$ refers to received signals of the base station 130 in the fourth communication situation, $Y_{1223}[n]$ refers to the interference 1223, $Y_{1230}[n]$ refers to the wireless access signal 1230, $N[n]$ refers to noise, in which n is a sub-carrier index, and M refers to a total number of sub-carriers.

If the symbol 610 and the symbol 620 are transmitted at symbol locations of the same number (e.g., symbol number 4) in the time-synchronized wireless backhaul signal 1220 and wireless access signal 1230, respectively, the base station 130 may estimate a channel value of the wireless access signal 1230 and a channel value of the interference 1223 on the basis of the received signals. The interference 1223 received by the base station 130 may be determined on the basis of the channel value of the interference 1223 and the wireless backhaul signal 1220 transmitted by the base station 130, as shown in <Equation 35>.

$$Y_{1223}[n]=X_{1220}[n]*H_{1223}[n], n=0,1,\ldots,M-1 \quad \text{[Equation 35]}$$

$Y_{1223}[n]$ refers to the interference 1223, $X_{1220}[n]$ refers to the wireless backhaul signal 1220, $H_{1223}[n]$ refers to the channel value of the interference 1223, in which n is a sub-carrier index, and M refers to a total number of sub-carriers.

Then, according to <Equation 36>, the base station 130 may remove the interferences 1223 from the received signals, and may detect data of the wireless access signal 1230.

$$R_{1230}[n]=R_{4\_130}[n]-Y_{1223}[n]=R_{3\_130}[n]-(X_{1220}[n]*H_{1223}[n], n=0,1,\ldots,M-1 \quad \text{[Equation 36]}$$

$R_{1130}[n]$ refers to the wireless access signal 1230 from which interference has been removed, $R_{3\_130}[n]$ refers to the received signals of the base station 130 in the fourth communication situation, $Y_{1223}[n]$ refers to the interference 1223, $X_{1220}[n]$ refers to the wireless backhaul signal 1230 transmitted by the base station 130, $H_{1223}[n]$ refers to the channel value of the interference 1223, in which n is a sub-carrier index, and M refers to a total number of sub-carriers.

According to various embodiments of the disclosure, other interferences 1213, 1221, 1231, and 1232 may also occur, but it is assumed that the interferences may be easily removed according to a suitable interference cancellation technique (e.g., MMSE-OSIC and MMSE-OSIC$^2$).

Figure 13A:
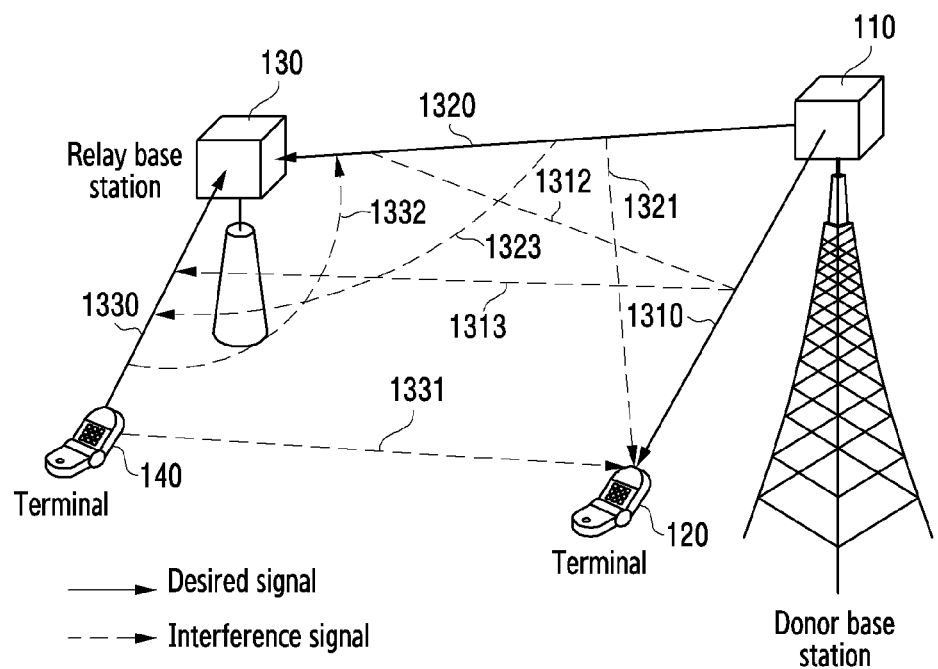
FIG. 13A and FIG. 13B are diagrams illustrating principles of interference estimation and determination of a transmission time point in a fifth communication situation of the wireless communication system according to various embodiments of the disclosure.
Figure 13B:
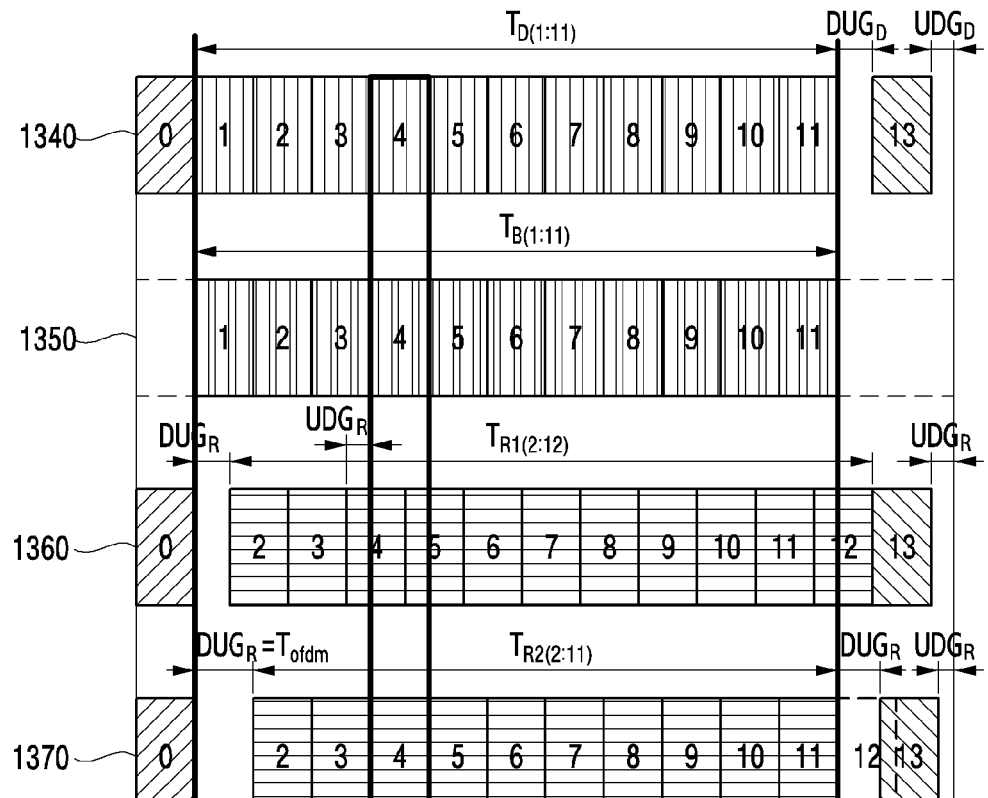

FIG. 13A and FIG. 13B are diagrams illustrating principles of interference estimation and determination of a transmission time point in a fifth communication situation of the wireless communication system according to various embodiments of the disclosure. In FIG. 13A and FIG. 13B, the base station 110 may be a donor base station, and the base station 130 may be a relay base station.

According to the fifth communication situation, the base station 110 transmits a wireless access signal 1310, which is a downlink signal, to the terminal 120 and transmits a wireless backhaul signal 1320, which is a downlink signal, to the base station 130, and the base station 130 receives a wireless access signal 1330, which is an uplink signal, from the terminal 140. These signals may be concurrently transmitted or received via respective wireless channels. In particular, the base station 130 may receive the wireless access signal 1330 from the terminal 140, while receiving the wireless backhaul signal 1320 from the base station 110. In this case, interference 1323 occurring from the wireless backhaul signal 1320 may influence reception of the wireless access signal 1330, and interference 1332 occurring from the wireless access signal 1330 may influence reception of the wireless backhaul signal 1320. Therefore, in order to identify the wireless backhaul signal 1320 and the wireless access signal 1330, the base station 130 should remove the interference 1323 and the interference 1332 from the received signals.

A subframe 1340 indicates a downlink subframe for the wireless access signal 1310. In the wireless access signal 1310, downlink data for the terminal 120 may be transmitted from the base station 110 via symbol 1 to symbol 11 of the subframe 1340. A subframe 1350 indicates a downlink subframe for the wireless backhaul signal 1320. In the wireless backhaul signal 1320, downlink data for the base station 130 may be transmitted from the base station 110 via symbol 1 to symbol 11 of the subframe 1350. The wireless access signal 1310 and the wireless backhaul signal 1320 are both downlink signals, and therefore the base station 110 transmits the wireless access signal 1310 and the wireless backhaul signal 1320 at a reference synchronization time point. That is, as illustrated in FIG. 13B, the subframe 1340 and the subframe 1350 may be time-synchronized with each other.

In order to secure a UDG for the base station 130, the terminal 140 may transmit the wireless access signal 1330 to the base station 130 according to the $TTA_{R1}$ of <Equation 20>. If the terminal 140 transmits the wireless access signal 1330 according to the $TTA_{R1}$ of <Equation 20>, a subframe 1360 indicates an uplink subframe for the wireless access signal 1330 received by the base station 130. According to the subframe 1360, the base station 130 may receive the wireless access signal 1330 at a time point preceding, by $UDG_R$, the reference synchronization time point of the base station 130 according to <Equation 21>. However, the base station 130 receives the wireless backhaul signal 1320 at the reference synchronization time point, and therefore the wireless backhaul signal 1320 and the wireless access signal 1330 may not be time-synchronized. In other words, since the subframe 1350 and the subframe 1360 are not time-synchronized with each other as illustrated in FIG. 13B, when the base station 130 performs the DFT or FFT calculation of size N for the received signals, interference between adjacent symbols may occur, and therefore performance of signal reception may be degraded. Therefore, according to various embodiments of the disclosure, the base station 130 determines TTA for the wireless access signal 1330 with respect to the terminal 140 such that the wireless access signal 1330 transmitted by the terminal 140 is received at a reception time point (i.e., the reference synchronization time point of the base station 130) of the wireless backhaul signal 1320. In this case, TTA of the wireless access signal 1330 for the terminal 140 may be determined as shown in <Equation 37> below.

$$TTA_{R2} = RTT_R \qquad [\text{Equation 37}]$$

$TTA_{R2}$ refers to a time offset at which the terminal 140 transmits the wireless access signal 1330 in the fifth communication situation, and $RTT_R$ refers to the time taken for a signal to travel the round-trip distance between the base station 130 and the terminal 140.

If the terminal 140 transmits the wireless access signal according to $TTA_{R2}$, the base station 130 may receive the wireless access signal 1330 at the reference synchronization time point of the base station 130. In other words, RTA of the wireless access signal 1330 for the base station 130 may be determined as shown in <Equation 38> below.

$$RTA_{R2} = TTA_{R2} - RTT_R = 0 \qquad [\text{Equation 38}]$$

$RTA_{R2}$ refers to a time offset at which the base station 130 receives the wireless access signal 1330 in the fifth communication situation, $TTA_{R2}$ refers to a time offset at which the terminal 140 transmits the wireless access signal 1330 in the fifth communication situation, and $RTT_R$ refers to the time taken for a signal to travel the round-trip distance between the base station 130 and the terminal 140.

If the terminal 140 transmits the wireless access signal 1330 according to $TTA_{R2}$, a subframe 1370 indicates an uplink subframe for the wireless access signal 1330 received by the base station 130. Referring to FIG. 13B, the subframe 1350 and the subframe 1370 may be time-synchronized with each other. In other words, all the wireless backhaul signal 1320, the interference 1323 occurring from the wireless backhaul signal 1320, the wireless access signal 1330, and the interference 1332 occurring the wireless access signal 1330 may be time-synchronized with each other for the base station 130, and the base station 130 may select a DFT or FFT section, in which interference between adjacent symbols is not caused, so as to perform DFT or FFT calculation of size N for the received signals. In order to secure the UDG for the base station 130, symbol 13 corresponding to PUCCH should be received by the base station 130 at a time point preceding, by $UDG_R$, the reference synchronization time point of the base station 130 in the subframe 1370, and therefore symbol 13 may collide with symbol 12. In order to avoid the collision, a time section corresponding to symbol 12 of the subframe 1370 may be designated as a protection section, and the terminal 140 may not transmit symbol 12. In other words, the terminal 140 may transmit only symbol 2 to symbol 11 of the subframe 1370.

In the embodiment described above, the base station 130 did not transmit symbol 12 of the subframe 1370 to avoid the collision with symbol 13 of the subframe 1370, but this is exemplary, and the base station 130 may not transmit a symbol other than symbol 12. For example, the base station 130 may transmit symbol 12 of the subframe 1370, but may not transmit symbol 13.

In the fifth communication situation, a result of the DFT or FFT calculation of size N for the received signals by the base station 130 may be represented as the following <Equation 39>.

$$R_{5\_130}[n] = \begin{pmatrix} R_{1320}[n] \\ R_{1330}[n] \end{pmatrix}, n = 0, 1, \cdots, M-1 \qquad [\text{Equation 39}]$$

$R_{5\_130}[n]$ refers to the received signals of the base station 130 in the fifth communication situation, $R_{1\_320}[n]$ refers to a signal received in the base station 130 through a reception antenna for wireless backhaul communication, $R_{1330}[n]$ refers to a signal received in the base station 130 through a reception antenna for wireless access communication, in which n is a sub-carrier index, and M refers to a total number of sub-carriers.

If the symbol 610 and the symbol 620 are transmitted at symbol locations of the same number (e.g., symbol number 4) in the time-synchronized wireless backhaul signal 1320 and wireless access signal 1330, respectively, the base station 130 may estimate a channel value of the wireless backhaul signal 1320, a channel value of the interference 1323, a channel value of the wireless access signal 1330, and a channel value of the interference 1332 on the basis of the received signals. A channel matrix estimated by the base station 130 may be represented as shown in <Equation 40> below.

$$H_{5\_130}[n] = \begin{pmatrix} H_{1320}[n] & H_{1332}[n] \\ H_{1323}[n] & H_{1330}[n] \end{pmatrix}, n = 0, 1, \cdots, M-1 \qquad [\text{Equation 40}]$$

$H_{5\_130}[n]$ refers to the channel matrix estimated by the base station 130 in the fifth communication situation, $H_{1320}[n]$ refers to the channel value of the wireless backhaul signal 1320, $H_{1323}[n]$ refers to the channel value of the reference 1323, $H_{1332}[n]$ refers to the channel value of the reference 1332, $H_{1330}[n]$ refers to the channel value of the wireless access signal 1330, in which n is a sub-carrier index, and M refers to a total number of sub-carriers.

Then, the base station 110 may remove the interference 1332 and the interference 1323 in the received signals by means of the estimated channel matrix, and may detect data of the wireless access signal 1330 and data of the wireless backhaul signal 1320. In order to detect data of the wireless access signal 1330 and data of the wireless backhaul signal 1320, a suitable multi-antenna detection technique (e.g., MMSE-OSIC and MMSE-OSIC$^2$) may be used.

According to various embodiments of the disclosure, other interferences 1312, 1321, 1313, and 1331 may also occur, but it is assumed that the interferences may be easily removed according to a suitable interference cancellation technique (e.g., MMSE-OSIC and MMSE-OSIC$^2$). For example, interference 1312 and the interference 1321 may occur from the wireless backhaul signal 1320 and the wireless access signal 1310 transmitted by the base station 110, but the base station 110 may remove the reference 1312 and the reference 1321 in advance in a signal transmission procedure, by means of at least one of the described interference cancellation techniques, and may transmit the wireless access signal 1310 and the wireless backhaul signal 1320.

Figure 14A:
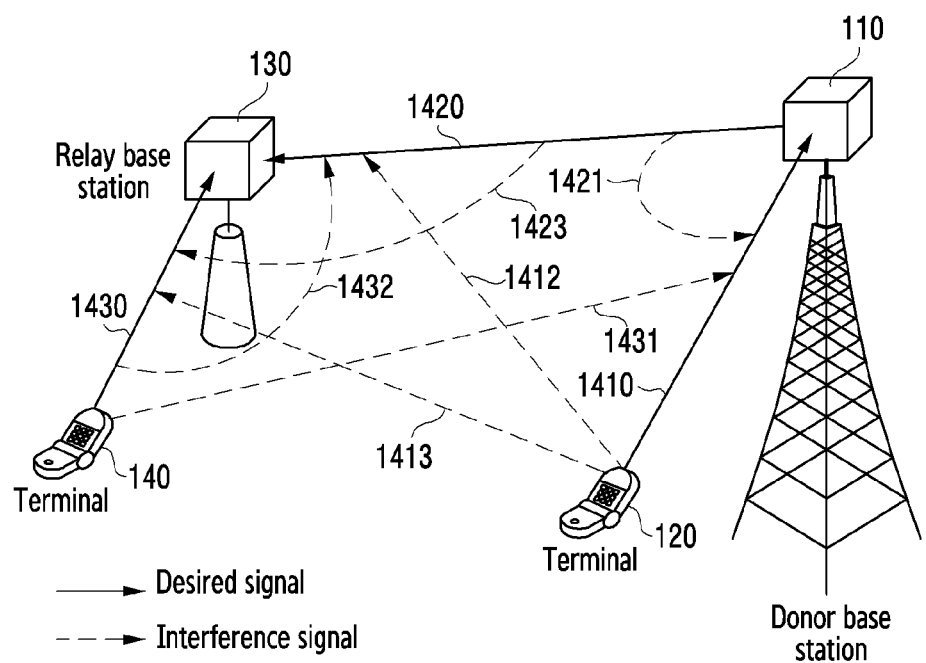
FIG. 14A and FIG. 14B are diagrams illustrating principles of interference estimation and determination of a transmission time point in a sixth communication situation of the wireless communication system according to various embodiments of the disclosure.
Figure 14B:
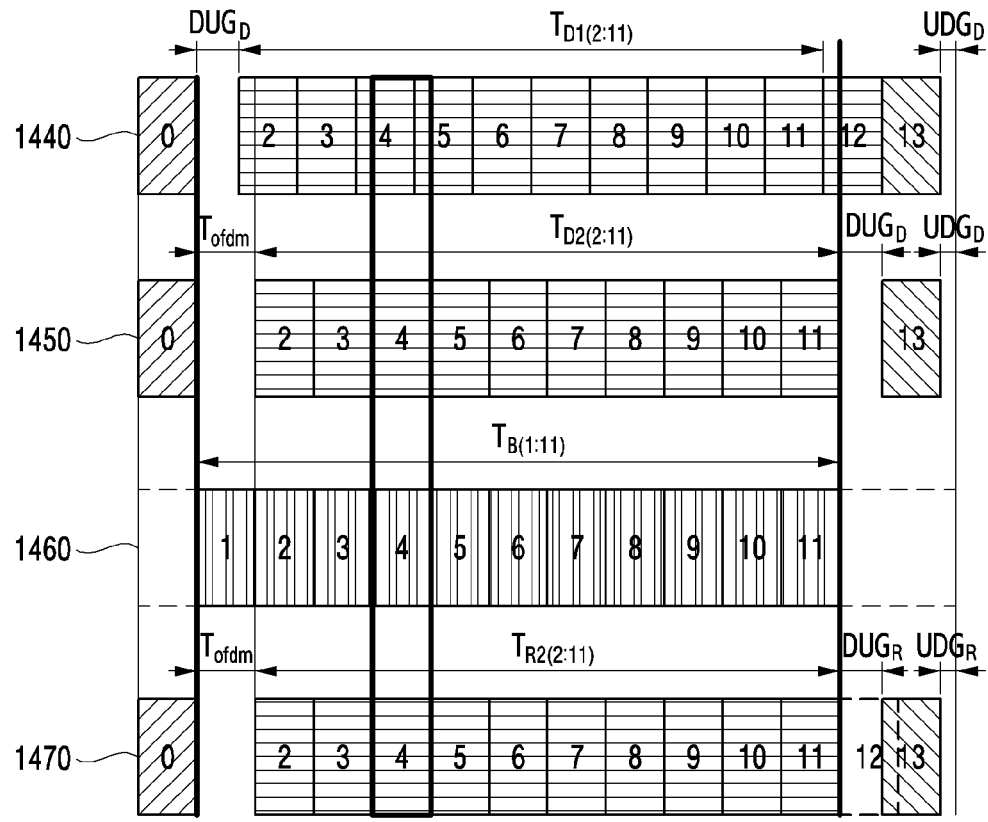

FIG. 14A and FIG. 14B are diagrams illustrating principles of interference estimation and determination of a transmission time point in a sixth communication situation of the wireless communication system according to various embodiments of the disclosure. In FIG. 14A and FIG. 14B, the base station 110 may be a donor base station, and the base station 130 may be a relay base station.

According to a sixth communication situation, the base station 110 receives a wireless access signal 1410 from the terminal 120, and transmits a wireless backhaul signal 1420 from the base station 130, and the base station 130 receives a wireless access signal 1430 from the terminal 140. These signals may be concurrently transmitted or received via respective wireless channels. In particular, the base station 110 may transmit the wireless backhaul signal 1420 to the base station 130, while receiving the wireless access signal 1410 from the terminal 120. In this case, interference 1421 occurring from the wireless backhaul signal 1420 is an SI, and may be received together with the wireless access signal 1410 by the base station 110. Therefore, in order to identify the wireless access signal 1410, the base station 110 should remove the interference 1421 from the received signals. Further, the base station 130 may receive the wireless access signal 1430 from the terminal 140, while receiving the wireless backhaul signal 1420 from the base station 110. In this case, interference 1423 occurring from the wireless backhaul signal 1420 may influence reception of the wireless access signal 1430, and interference 1432 occurring from the wireless access signal 1430 may influence reception of the wireless backhaul signal 1420. Therefore, in order to identify the wireless backhaul signal 1420 and the wireless access signal 1430, the base station 130 should remove the interference 1423 and the interference 1432 from the received signals.

In order to secure a UDG for the base station 110, the terminal 120 may transmit the wireless access signal 1410 according to the $TTA_{D1}$ of <Equation 6>. If the terminal 120 transmits the wireless access signal 1410 according to the $TTA_{D1}$ of <Equation 6>, a subframe 1440 indicates an uplink subframe for the wireless access signal 1410 received by the base station 110. In the wireless access signal 1410, uplink data for the base station 110 may be transmitted from the terminal 120 via symbol 2 to symbol 12 of the subframe 1440. According to the subframe 1440, the base station 110 may receive the wireless access signal 1410 at a time point preceding, by $UDG_D$, the reference synchronization time point of the base station 110 according to <Equation 7>. A subframe 1460 indicates a downlink subframe for the wireless backhaul signal 1420. In the wireless backhaul signal 1420, downlink data for the base station 130 may be transmitted from the base station 110 via symbol 1 to symbol 11 of the subframe 1460.

The base station 110 transmits the wireless backhaul signal 1420 to base station 130 at the reference syn time point, but receives the wireless access signal 1410 at a time point preceding, by $UDG_D$, the reference synchronization time point of the base station 110, and therefore the wireless access signal 1410 and the wireless backhaul signal 1420 are not time-synchronized. In other words, the subframe 1440 and the subframe 1460 are not time-synchronized with each other as illustrated in FIG. 14B, and therefore the base station 110 may not efficiently remove the interference 1421 occurring from the wireless backhaul signal 1420, and performance of signal reception may be degraded.

Therefore, according to various embodiments of the disclosure, the base station 110 determines TTA for the terminal 120 such that the wireless access signal 1410 transmitted by the terminal 120 is received at the transmission time point (i.e., the reference synchronization time point of the base station 110) of the wireless backhaul signal 1420. In this case, TTA of the wireless access signal 1410 for the terminal 110 may be determined as shown in <Equation 8> below. If the terminal 120 transmits the wireless access signal 1410 according to $TTA_{D2}$, the base station 110 may receive the wireless access signal 1410 at the reference synchronization time point of the base station 110 as shown in <Equation 9>.

If the terminal 120 transmits the wireless access signal 1410 according to $TTA_{D2}$, a subframe 1450 indicates an uplink subframe for the wireless access signal 1410 received by the base station 110. Referring to FIG. 14B, the subframe 1450 and the subframe 1460 may be time-synchronized with each other. In other words, the interference 1421 occurring from the wireless access signal 1410 and the wireless backhaul signal 1420 may be time-synchronized with each other for the base station 110. Here, symbol 13 of the subframe 1450 should be received by the base station 110 from the terminal 120 according to $RTA_{D1}$ of <Equation 7>, and may thus collide with symbol 12 of the subframe 1450. In order to avoid the collision, the terminal 120 may transmit only symbol 2 to symbol 11 of the subframe 1450, and may not transmit symbol 12.

In the embodiment described above, the terminal 120 did not transmit symbol 12 of the subframe 1250 to avoid the collision with symbol 13 of the subframe 1450, but this is exemplary, and the terminal 120 may not transmit a symbol other than symbol 12. For example, the terminal 120 may transmit symbol 12 of the subframe 1450, but may not transmit symbol 13.

If the base station 110 receives the interference 1421 having occurred from the wireless backhaul signal 1420 transmitted at the reference synchronization time point and the wireless access signal 1410 transmitted according to $TTA_{D2}$ of <Equation 8>, and performs DFT or FFT calculation of size N for the received signals, interference between adjacent symbols may not occur. In the sixth communication situation, a result of the DFT or FFT calculation of size N for the received signals by the base station 110 may be represented as the following <Equation 41>.

$$R_{6\_110}[n]=Y_{1410}[n]+Y_{1421}[n]+N[n], n=0,1,\ldots,M-1 \quad \text{[Equation 41]}$$

$R_{6\_110}[n]$ refers to received signals of the base station 110 in the sixth communication situation, $Y_{1410}[n]$ refers to the wireless access signal 1410, $Y_{1421}[n]$ refers to the interference 1421, $N[n]$ refers to noise, in which n is a sub-carrier index, and M refers to a total number of sub-carriers.

If the symbol 610 and the symbol 620 are transmitted at symbol locations of the same number (e.g., symbol number 4) in the time-synchronized wireless access signal 1410 and wireless backhaul signal 1420, respectively, the base station 110 may estimate a channel value of the interference 1421 and a channel value of the wireless access signal 1410 on the basis of the received signals. The interference 1421 received by the base station 110 may be determined on the basis of the channel value of the interference 1421 and the wireless backhaul signal 1420 transmitted by the base station 110, as shown in <Equation 42>.

$$Y_{1421}[n]=X_{1420}[n]*H_{1421}[n], n=0,1,\ldots,M-1 \quad \text{[Equation 42]}$$

$Y_{1421}[n]$ refers to the interference 1421, $X_{1420}[n]$ refers to the wireless backhaul signal 1420, $H_{1421}[n]$ refers to the channel value of the interference 1421, in which n is a sub-carrier index, and M refers to a total number of sub-carriers.

Then, according to <Equation 43>, the base station 110 may remove the interferences 1421 from the received signals, and may detect data of the wireless access signal 1410.

$$R_{1410}[n]=R_{6\_110}[n]-Y_{1421}[n]=R_{6\_110}[n]-\\(X_{1420}[n]*H_{1421}[n], n=0,1,\ldots,M-1$$  [Equation 43]

$R_{1410}[n]$ refers to the wireless access signal 1410 from which interference has been removed, $R_{6\_110}[n]$ refers to the received signals of the base station 110 in the sixth communication situation, $Y_{1421}[n]$ refers to the interference 1421, $X_{1420}[n]$ refers to the wireless backhaul signal 1420 transmitted by the base station 110, $H_{1421}[n]$ refers to the channel value of the interference 1421, in which n is a sub-carrier index, and M refers to a total number of sub-carriers.

The base station 130 receives the wireless backhaul signal 1420 from the base station 110 at the reference synchronization time point. Therefore, the base station 130 may determine, as $TTA_{R2}$, TTA for the wireless access signal 1430 for the terminal 140 such that the wireless access signal 1430 transmitted by the terminal 140 is received at a reception time point (i.e., the reference synchronization time point of the base station 130) of the wireless backhaul signal 1420, as shown in <Equation 37>. If the terminal 140 transmits the wireless access signal according to $TTA_{R2}$, the base station 130 may receive the wireless access signal 1430 at the reference synchronization time point of the base station 130, as shown in <Equation 38>.

If the terminal 140 transmits the wireless access signal 1430 according to $TTA_{R2}$, a subframe 1470 indicates an uplink subframe for the wireless access signal 1430 received by the base station 130. Referring to FIG. 13B, the subframe 1460 and the subframe 1470 are time-synchronized with each other. In other words, all the wireless backhaul signal 1420, the interference 1423 occurring from the wireless backhaul signal 1420, the wireless access signal 1430, and the interference 1432 occurring from the wireless access signal 1430 may be time-synchronized with each other for the base station 130, and the base station 130 may select a DFT or FFT section, in which interference between adjacent symbols is not caused, so as to perform DFT or FFT calculation of size N for the received signals. Here, in order to secure the UDG for the base station, in the subframe 1470, symbol 13 corresponding to PUCCH should be received by the base station 130 according to $RTA_{R1}$ of <Equation 21>, and may thus collide with symbol 12 of the subframe 1470. In order to avoid the collision, a time section corresponding to symbol 12 of the subframe 1470 may be designated as a protection section, and the terminal 140 may not transmit symbol 12. In other words, the terminal 140 may transmit only symbol 2 to symbol 11.

In the embodiment described above, the terminal 140 did not transmit symbol 12 of the subframe 1470 to avoid the collision with symbol 13 of the subframe 1470, but this is exemplary, and the terminal 140 may not transmit a symbol other than symbol 12. For example, the terminal 140 may transmit symbol 12 of the subframe 1470, but may not transmit symbol 13.

In the sixth communication situation, the base station 130 may perform DFT or FFT calculation of size N for the received signals, may determine a channel matrix by estimating a channel value of the wireless backhaul signal 1420, a channel value of the interference 1423, a channel value of the wireless access signal 1430, and a channel value of the interface 1432 on the basis of the received signals, and may detect data of the wireless access signal 1430 and data of the wireless backhaul signal 1420 by using a result of the DFT and FFT calculation and the channel matrix. The result of the DFT and FFT calculation for the received signals by the base station 130 may be expressed similarly to <Equation 39>, and the channel matrix may be expressed similarly to <Equation 40>. In a procedure of detecting the data of the wireless access signal 1430 and the data of the wireless backhaul signal 1420, the base station 130 may remove the interference 1423 and the interference 1432 from the received signals by using a suitable multi-antenna detection technique (e.g., MMSE-OSIC and MMSE-OSIC$^2$).

According to various embodiments of the disclosure, other interferences 1412, 1413, and 1431 may also occur, but it is assumed that the interferences may be easily removed according to a suitable interference cancellation technique (e.g., MMSE-OSIC and MMSE-OSIC$^2$).

Figure 15A:
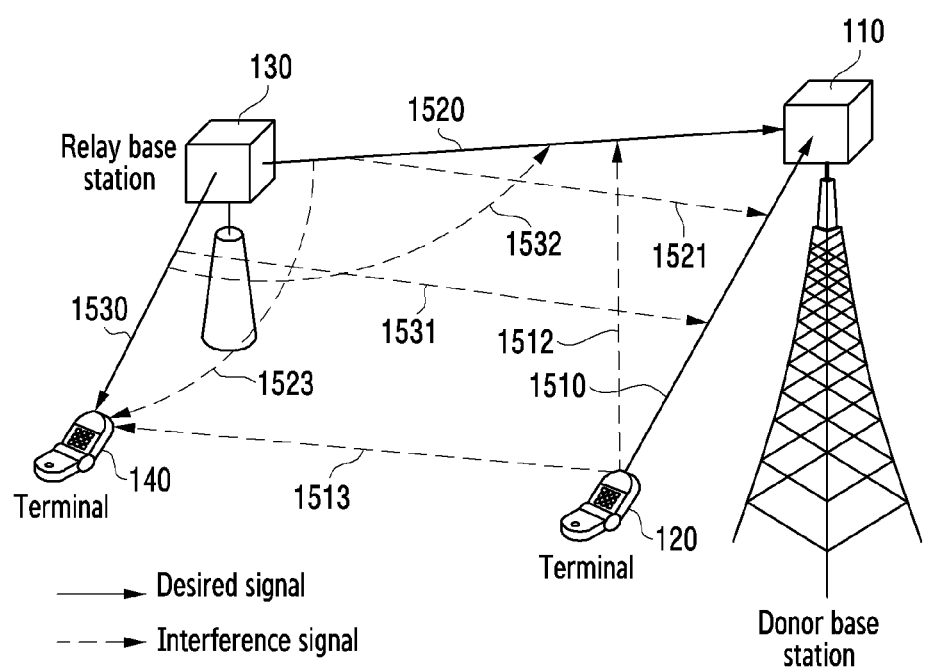
FIG. 15A and FIG. 15B are diagrams illustrating principles of interference estimation and determination of a transmission time point in a seventh communication situation of the wireless communication system according to various embodiments of the disclosure.
Figure 15B:
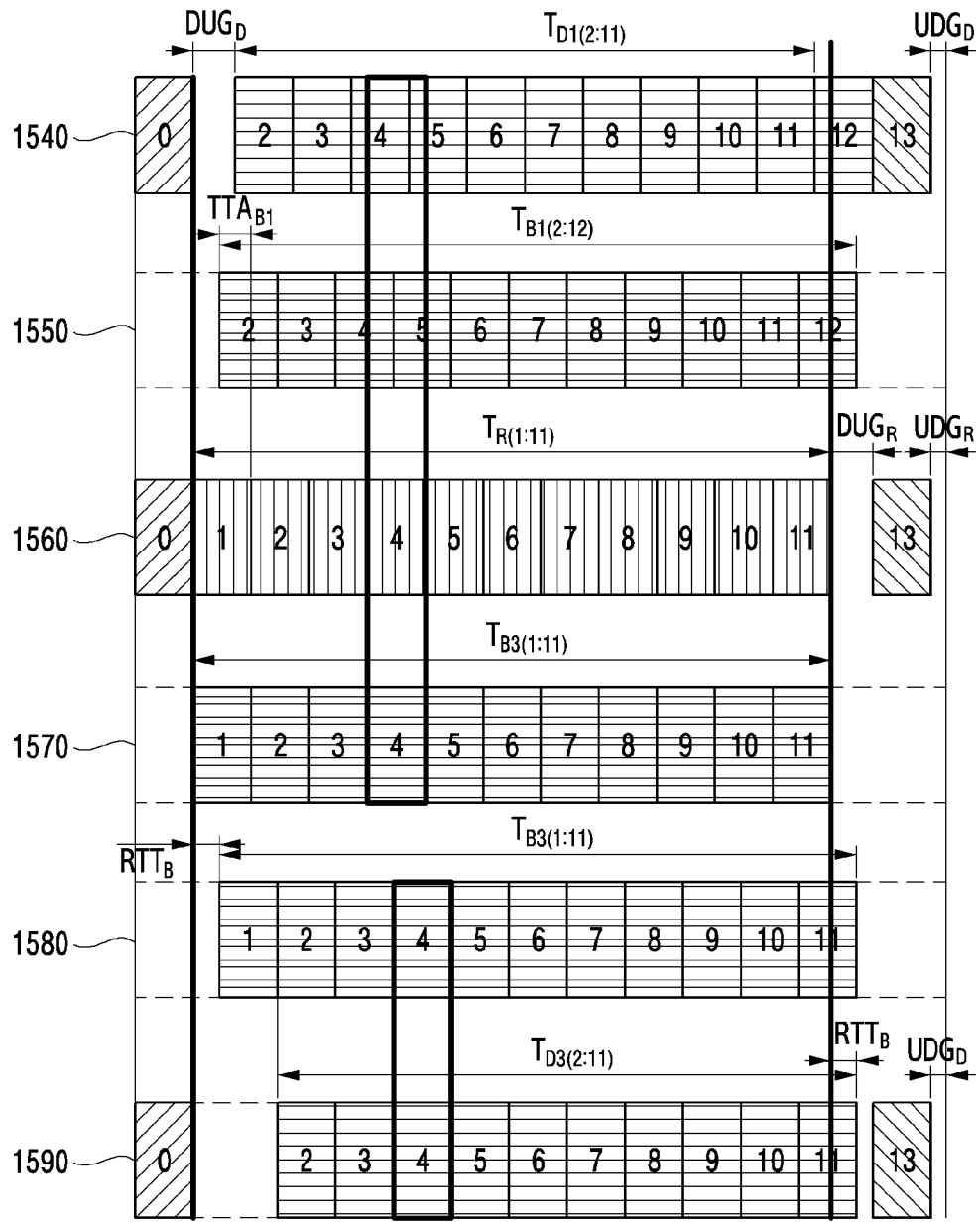
Figure 15B:
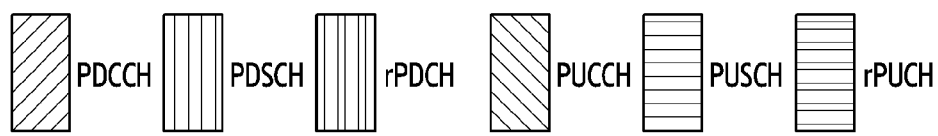

FIG. 15A and FIG. 15B are diagrams illustrating principles of interference estimation and determination of a transmission time point in a seventh communication situation of the wireless communication system according to various embodiments of the disclosure. In FIG. 15A and FIG. 15B, the base station 110 may be a donor base station, and the base station 130 may be a relay base station.

According to a seventh communication situation, the base station 110 receives a wireless access signal 1510 from the terminal 120, and receives a wireless backhaul signal 1520 from the base station 130, and the base station 130 transmits a wireless access signal 1530 to the terminal 140. These signals may be concurrently transmitted or received via respective wireless channels. In particular, the base station 130 may transmit the wireless access signal 1530 to the terminal 140, while transmitting the wireless backhaul signal 1520 from the base station 110. In this case, interference 1523 occurring from the wireless backhaul signal 1520 may influence transmission of the wireless access signal 1530, and interference 1532 occurring from the wireless access signal 1530 may influence transmission of the wireless backhaul signal 1520. Therefore, the base station 130 may be required to remove the interference 1523 and the interference of 1532 in advance, and transmit the wireless backhaul signal 1520 and the wireless access signal 1530. Further, the base station 110 may receive the wireless access signal 1510 from the terminal 120, while receiving the wireless backhaul signal 1520 from the base station 130. In this case, interference 1521 occurring from the wireless backhaul signal 1520 may influence reception of the wireless access signal 1510, and interference 1512 occurring from the wireless access signal 1510 may influence reception of the wireless backhaul signal 1520. Therefore, in order to identify the wireless backhaul signal 1520 and the wireless access signal 1510, the base station 110 should remove the interference 1521 and the interference 1512 from the received signals.

In order to secure the UDG for the base station 110, the base station 130 may transmit the wireless access backhaul signal 1520 according to the $TTA_{B1}$ of <Equation 16>. A subframe 1550 indicates an uplink subframe for the wireless backhaul signal 1520 transmitted by the base station 130 according to $TTA_{B1}$ of <Equation 16>. However, the base station 130 may transmit the wireless access signal 1530 at the reference synchronization time point. A subframe 1560 indicates a downlink subframe for the wireless access signal 1530. As illustrated in FIG. 15B, the subframe 1550 and the subframe 1560 may not be time-synchronized with each other. In other words, the wireless backhaul signal 1520 and the wireless access signal 1530 are not time-synchronized, and therefore the base station 130 may not efficiently remove the interface 1523 and the interference 1532.

Therefore, the base station 130 according to various embodiments of the disclosure transmits the wireless backhaul signal 1520 at the transmission time point (i.e., the reference synchronization time point of the base station 130) of the wireless access signal 1530. In this case, TTA of the wireless backhaul signal 1520 for the base station 130 may be determined as shown in <Equation 44> below.

$$TTA_{B3}=0 \qquad \text{[Equation 44]}$$

$TTA_{B3}$ refers to a time offset at which the base station 130 transmits the wireless backhaul signal 1520 in the seventh communication situation.

If the base station 130 transmits the wireless backhaul signal 1520 according to $TTA_{B3}$, RTA of the wireless backhaul signal 1520 for the base station 110 may be determined as shown in <Equation 45>.

$$RTA_{B3}=TTA_{B3}-RTT_B=-RTT_B \qquad \text{[Equation 45]}$$

$RTA_{B3}$ refers to a time offset at which the base station 110 receives the wireless backhaul signal 1520 in the seventh communication situation, $TTA_{B3}$ refers to a time offset at which the base station 130 transmits the wireless backhaul signal 1520 in the seventh communication situation, and $RTT_B$ refers to the time taken for a signal to travel the round-trip distance between the base station 110 and the base station 130. According to <Equation 45>, the base station 110 receives the wireless backhaul signal 1520 in the seventh communication situation at a time point delayed by $RTT_B$ from the reference synchronization time point of the base station 110.

A subframe 1570 indicates an uplink subframe for the wireless backhaul signal 1520 transmitted by the base station 130 according to $TTA_{B3}$. Referring to FIG. 15B, the subframe 1560 and the subframe 1570 may be time-synchronized with each other. In other words, the wireless backhaul signal 1520 and the wireless access signal 1530 may be time-synchronized with each other, and the interference 1523 occurring from the wireless backhaul signal 1520 and the interference 1532 occurring from the wireless access signal 1530 may also be time-synchronized. As a result, the base station 130 may remove the interference 1523 and the interference 1532 in advance and may transmit the wireless backhaul signal 1520 and the wireless access signal 1530 in a signal transmission procedure by using a suitable interference cancellation technique (e.g., MSE-OSIC and MMSE-OSIC$^2$).

In order to secure the UDG for the base station 110, the terminal 120 may transmit the wireless access signal 1510 according to the $TTA_{D1}$ of <Equation 6>. If the terminal 120 transmits the wireless access signal 1510 according to $TTA_{D1}$, a subframe 1540 indicates an uplink subframe for the wireless access signal 1510 received by the base station 110. According to the subframe 1540, the base station 110 receives the wireless access signal 1510 at a time point preceding, by $UDG_D$, the reference synchronization time point of the base station 110 according to <Equation 7>. However, as described above, in the seventh communication situation, the base station 110 receives the wireless backhaul signal 1520 at a time point delayed by $RTT_B$ from the reference synchronization time point of the base station 110. If the base station 130 transmits the wireless backhaul signal 1520 according to the $TTA_{B3}$ of <Equation 44>, a subframe 1580 indicates an uplink subframe for the wireless backhaul signal 1520 received by the base station 110. According to FIG. 15B, the subframe 1540 and the subframe 1580 may not be time-synchronized with each other. In other words, the wireless backhaul signal 1520 and the wireless access signal 1510 are not time-synchronized for the base station 110, and therefore the base station 110 may not efficiently remove the interface 1512 and the interference 1521, and performance of signal reception may be degraded.

Therefore, according to various embodiments of the disclosure, the base station 110 determines TTA of the wireless access signal 1510 for the terminal 120 such that the wireless access signal 1510 transmitted by the terminal 120 is received at a reception time point (i.e., a time point delayed by $RTT_B$ from the reference synchronization time point of the base station 110) of the wireless backhaul signal 1520. In this case, TTA of the wireless access signal 1510 for the terminal 120 may be determined as shown in <Equation 46> below.

$$TTA_{D3}=RTT_D-RTT_B \qquad \text{[Equation 46]}$$

$TTA_{D3}$ refers to a time offset at which the terminal 120 transmits the wireless access signal 1510 in the seventh communication situation, $RTT_D$ refers to the time required for a signal to travel the round-trip distance between the base station 110 and the terminal 120, and $RTT_B$ refers to the time required for a signal to travel the round-trip distance between the base station 110 and the base station 130.

If the terminal 120 transmits the wireless access signal 1510 according to $TTA_{D3}$, the base station 110 may receive the wireless access signal 1510 at a time point delayed by $RTT_B$ from the reference synchronization time point of the base station 110. In other words, RTA of the wireless access signal 1510 for the base station 110 may be determined as shown in <Equation 47> below.

$$RTA_{D3}=TTA_{D3}-RTT_D=-RTT_B \qquad \text{[Equation 47]}$$

$RTA_{D3}$ refers to a time offset at which the base station 110 receives the wireless access signal 1510 in the seventh communication situation, $TTA_{D3}$ refers to a time offset at which the terminal 120 transmits the wireless access signal 1510 in the seventh communication situation, $RTT_D$ refers to the time taken for a signal to travel the round-trip distance between the base station 110 and the terminal 120, and $RTT_B$ refers to the time taken for a signal to travel the round-trip distance between the base station 110 and the base station 130.

If the terminal 120 transmits the wireless access signal 1510 according to the $TTA_{D3}$ of <Equation 46>, a subframe 1590 indicates an uplink subframe for the wireless access signal 1510 received by the base station 110. Referring to FIG. 15B, the subframe 1580 and the subframe 1590 are time-synchronized with each other. In other words, all the wireless backhaul signal 1520, the interference 1521 occurring from the wireless backhaul signal 1520, the wireless access signal 1510, and the interference 1512 occurring the wireless access signal 1510 may be time-synchronized with each other for the base station 110, and the base station 110 may select a DFT or FFT section, in which interference between adjacent symbols is not caused, so as to perform DFT or FFT calculation of size N for the received signals. In order to secure the UDG for the base station 110, symbol 13 corresponding to PUCCH should be received by the base station 110 at a time point preceding, by $UDG_D$, the reference synchronization time point of the base station 110 in the subframe 1590, and therefore symbol 13 may collide with symbol 12. In order to avoid the collision, a time section corresponding to symbol 12 of the subframe 1590 may be designated as a protection section, and the terminal 120 may not transmit symbol 12.

In the embodiment described above, the terminal 120 did not transmit symbol 12 of the subframe 1590 to avoid the collision with symbol 13 of the subframe 1590, but this is exemplary, and the terminal 120 may not transmit a symbol other than symbol 12. For example, the terminal 120 may transmit symbol 12 of the subframe 1590, but may not transmit symbol 13.

In the seventh communication situation, the base station 110 may perform DFT or FFT calculation of size N for the received signals, may determine a channel matrix by estimating a channel value of the wireless backhaul signal 1520, a channel value of the interference 1523, a channel value of the wireless access signal 1510, and a channel value of the interface 1512 on the basis of the received signals, and may detect data of the wireless access signal 1510 and data of the wireless backhaul signal 1520 by using a result of the DFT and FFT calculation and the channel matrix. The result of the DFT and FFT calculation for the received signals by the base station 110 may be expressed similarly to <Equation 18>, and the channel matrix may be expressed similarly to <Equation 19>. In a procedure of detecting the data of the wireless access signal 1510 and the data of the wireless backhaul signal 1520, the base station 110 may remove the interference 1423 and the interference 1432 from the received signals by using a suitable multi-antenna detection technique (e.g., MMSE-OSIC and MMSE-OSIC$^2$).

In the seventh communication situation, the wireless backhaul signal 1520 transmitted to the base station 110 by the base station 130 is received at a time point delayed by $RTT_B$ from the reference synchronization time point of the base station 110. If the base station 110 receives wireless backhaul signals from a plurality of base stations such as the base station 130 in the seventh communication situation, RTT between the base station 110 and each of the base stations may be different for each base station, and therefore the received wireless backhaul signals may not time-synchronized with each other for the base station 110. Therefore, if the base station 110 performs wireless backhaul communication with the plurality of base stations such as the base station 130 in the seventh communication situation, while a wireless backhaul signal is received from one of the plurality of base stations, scheduling for the plurality of base stations may be required so that wireless backhaul signals are not received from the other base stations of the plurality of base stations. Further, the RTT between the base station 110 and each base station may be different for each base station, and therefore TTA of the wireless access signal for the terminal may be different for each base station communicating with the base station 110.

According to various embodiments of the disclosure, other interferences 1513 and 1531 may also occur, but it is assumed that the interferences may be easily removed according to a suitable interference cancellation technique (e.g., MMSE-OSIC and MMSE-OSIC$^2$).

Data symbols, guard symbols, and TTA of uplink signals for respective communication situations including the communication situations illustrated in FIG. 9 to FIG. 15 are shown in <Table 1>.

TABLE 1

| Number | Communication situation | | | Data symbol | | | Guard symbol | | | TTA of uplink signal | | |
|---|---|---|---|---|---|---|---|---|---|---|---|---|
| | WBH | UED | UER | WBH | UED | UER | WBH | UED | UER | WBH | UED | UER |
| 1 | UL | UL | UL | 2-12 | 2-12 | 2-12 | 1 | 1 | 1 | $TTA_{B1}$ | $TTA_{D1}$ | $TTA_{R3}$ |
| 2 | UL | UL | DL | 1-11 | 2-11 | 1-11 | 12 | 1, 12 | 12 | $TTA_{B3}$ | $TTA_{D3}$ | — |
| 3 | UL | DL | UL | 2-11 | 1-11 | 2-12 | 1, 12 | 12 | 1 | $TTA_{B2}$ | — | $TTA_{R4}$ |
| 4 | UL | DL | DL | N/A | N/A | N/A | N/A | N/A | N/A | N/A | N/A | N/A |
| 5 | DL | UL | UL | 1-11 | 2-11 | 2-11 | 12 | 1, 12 | 1, 12 | — | $TTA_{D2}$ | $TTA_{R2}$ |
| 6 | DL | UL | DL | 1-11 | 2-11 | 1-11 | 12 | 1, 12 | 12 | — | $TTA_{D2}$ | — |
| 7 | DL | DL | UL | 1-11 | 1-11 | 2-11 | 12 | 12 | 1, 12 | — | — | $TTA_{R2}$ |
| 8 | DL | DL | DL | 1-11 | 1-11 | 1-11 | 12 | 12 | 12 | — | — | — |
| 9 | Null | UL | UL | — | 2-12 | 2-12 | — | 1 | 1 | — | $TTA_{D1}$ | $TTA_{R1}$ |
| 10 | Null | UL | DL | — | 2-12 | 1-11 | — | 1 | 12 | — | $TTA_{D1}$ | — |
| 11 | Null | DL | UL | — | 1-11 | 2-12 | — | 12 | 1 | — | — | $TTA_{R1}$ |
| 12 | Null | DL | DL | — | 1-11 | 1-11 | — | 12 | 12 | — | — | — |

In <Table 1>, WBH refers to a wireless backhaul channel between a donor base station (e.g., the base station 110) and a relay base station (e.g., the base station 130), UED refers to a wireless access channel between the donor base station and a serving terminal (e.g., the terminal 120) of the donor base station, and UER refers to a wireless access channel between the relay base station and a serving terminal (e.g., the terminal 140) of the relay base station. According to <Table 1>, a communication situation may be defined on the basis of a signal direction (UP or DL) in each of WBH, UED, and UER. Data symbol items in <Table 1> indicate symbol numbers of symbols (e.g., PDSCH, PUSCH, rPDSCH, and rPUSCH) in which data is transmitted in one subframe for signals transmitted via WBH, UED, and UER respectively. Guard symbol items in <Table 1> indicate symbol numbers of symbols used as protection sections in one subframe for signals transmitted via WBH, UED, and UER respectively. If the signals transmitted via WBH, UED, and UER respectively are uplink signals, TTA items of the uplink signals of <Table 1> indicate TTA for nodes at which the uplink signals are transmitted. In <Table 1>, the signal direction of WBH is indicated as null in communication situations corresponding to numbers 9 to 12, and this indicates that the communication situations corresponding to numbers 9 to 12 are communication situations in which a signal is not transmitted or received via wireless backhaul between base stations. The RTA of the uplink signals may be naturally derived if the TTA of the uplink signals are determined, and is thus omitted from <Table 1>.

According to <Table 1>, the TTA of the uplink signals transmitted via WBH may be determined to be one value among $TTA_{B1}$, $TTA_{B2}$ and $TTA_{B3}$ depending on the communication situations. The principle of determining each of $TTA_{B1}$, $TTA_{B2}$ and $TTA_{B3}$, and a specific value thereof are as shown in <Table 2> below.

TABLE 2

| TTA (or RTA) index | TTA and RTA of uplink signal transmitted via WBH | WBH1 | WBH2 | WBH3 |
|---|---|---|---|---|
| 1 | $TTA_{B1} = RTT_B + UDG_D$ | 9.2 | 10.3 | 8.3 |
|   | $RTA_{B1} = UDG_D$ | 2.5 | 2.5 | 2.5 |
| 2 | $TTA_{B2} = RTT_B$ | 6.7 | 7.8 | 5.8 |
|   | $RTA_{B2} = 0$ | 0 | 0 | 0 |
| 3 | $TTA_{B3} = 0$ | 0 | 0 | 0 |
|   | $RTA_{B3} = -RTT_B$ | -6.7 | -7.8 | -5.8 |

In <Table 2>, WBH 1 refers to a wireless backhaul channel between a donor base station (e.g., the base station 110) and a first relay base station, WBH 2 refers to a wireless backhaul channel between the donor base station and a second relay base station, and WBH 3 refers to a wireless backhaul channel between the donor base station and a third relay base station. One of the first to third relay base stations may be the base station 130. In <Table 2>, values corresponding to WBH 1 refer to TTA or RTA of uplink signals transmitted via WBH 1, values corresponding to WBH 2 refer to TTA or RAT of uplink signals transmitted via WBH 2, and values corresponding to WBH 3 refer to TTA or RTA of uplink signals transmitted via WBH 3. In <Table 2>, units of the values expressed for WBH 1, WBH 2, and WBH 3, respectively, may be us. The values illustrated in <Table 2> are exemplary, and may vary depending on other elements (e.g., channel situations and distances between the donor base station and the relay base stations).

According to <Table 1>, the TTA of the uplink signals transmitted via UED may be determined to be one value among $TTA_{D1}$, $TTA_{D2}$ and $TTA_{D3}$ depending on the communication situations. The principle of determining each of $TTA_{D1}$, $TTA_{D2}$, and $TTA_{D3}$, and a specific value thereof are as shown in <Table 3> below.

TABLE 3

| TTA (or RTA) index | TTA and RTA of uplink signal transmitted via UED | UED1 | UED2 | UED3 | UED4 |
|---|---|---|---|---|---|
| 1 | $TTA_{D1} = RTT_D + UDG_D$ | 5.3 | 6.1 | 3.2 | 4.7 |
|   | $RTA_{D1} = UDG_D$ | 2.5 | 2.5 | 2.5 | 2.5 |
| 2 | $TTA_{D2} = RTT_D$ | 2.8 | 3.6 | 0.7 | 2.2 |
|   | $RTA_{D2} = 0$ | 0 | 0 | 0 | 0 |
| 3-1 | $TTA_{D3} = RTT_D - RTT_B$ | -3.9 | -3.1 | -6.0 | -4.5 |
|   | $RTA_{D3} = -RTT_B$ | -6.7 | -6.7 | -6.7 | -6.7 |
| 3-2 | $TTA_{D3} = RTT_D - RTT_B$ | -5.0 | -4.2 | -7.1 | -5.6 |
|   | $RTA_{D3} = -RTT_B$ | -7.8 | -7.8 | -7.8 | -7.8 |
| 3-3 | $TTA_{D3} = RTT_D - RTT_B$ | -3.0 | -2.2 | -5.1 | -3.6 |
|   | $RTA_{D3} = -RTT_B$ | -5.8 | -5.8 | -5.8 | -5.8 |

In <Table 3>, UED 1 refers to a wireless access channel between a donor base station (e.g., the base station 110) and a first terminal, UED 2 refers to a wireless access channel between the donor base station and a second terminal, UED 3 refers to a wireless access channel between the donor base station and a third terminal, and UED 4 refers to a wireless access channel between the donor base station and a fourth terminal. One of the first to fourth terminals may be the terminal 120. According to index 3-1 and index 3-3 in <Table 3>, the principles of determining $TTA_{D3}$ thereof are the same but specific values of $TTA_{D3}$ are different. This is because, in a communication situation where TTA for each terminal should be determined to be $TTA_{D3}$ (=$RTT_D$−$RTT_B$), a specific value of $TTA_{D3}$ may vary depending on a relay base station performing communication with the donor base station. For example, specific values corresponding to index 3-1 may be values determined in a situation where the donor base station communicates with the first relay base station via WBH 1, specific values corresponding to index 3-2 may be values determined in a situation where the donor base station communicates with the second relay base station via WBH 2, and specific values corresponding to index 3-3 may be values determined in a situation where the donor base station communicates with the third relay base station via WBH 3. In <Table 3>, values corresponding to UED 1 refer to TTA or RTA of uplink signals transmitted via UED 1, values corresponding to UED 2 refer to TTA or RAT of uplink signals transmitted via UED 2, values corresponding to UED 3 refer to TTA or RTA of uplink signals transmitted via UED 3, and values corresponding to UED 4 refer to TTA or RTA of uplink signals transmitted via UED 4. In <Table 3>, units of the values expressed for UED 1, UED 1, UED 2, UED 3, and UED 4, respectively, may be us. The values illustrated in <Table 3> are exemplary, and may vary depending on other elements (e.g., channel situations and distances between the donor base station and the terminals).

According to <Table 1>, the TTA of the uplink signals transmitted via UER may be determined to be one value among $TTA_{R1}$, $TTA_{R2}$, $TTA_{R3}$, and $TTA_{R4}$ depending on the communication situations. The principle of determining each of $TTA_{R1}$, $TTA_{R2}$, $TTA_{R3}$, and $TTA_{R4}$, and a specific value thereof are as shown in <Table 4> below.

TABLE 4

| TTA (or RTA) index | TTA and RTA of uplink signal transmitted via UER | UER1 | UER2 | UER3 | UER4 |
|---|---|---|---|---|---|
| 1 | $TTA_{R1} = RTT_R + UDG_R$ | 4.2 | 3.7 | 5.3 | 5.2 |
|   | $RTA_{R1} = UDG_R$ | 2.5 | 2.5 | 2.5 | 2.5 |
| 2 | $TTA_{R2} = RTT_R$ | 1.7 | 1.2 | 2.8 | 2.7 |
|   | $RTA_{R2} = 0$ | 0 | 0 | 0 | 0 |
| 3 | $TTA_{R3} = RTT_R + TTA_{B1}$ | 10.9 | 10.4 | 12.0 | 11.9 |
|   | $RTA_{R3} = TTA_{B1}$ | 9.2 | 9.2 | 9.2 | 9.2 |
| 4 | $TTA_{R4} = RTT_R + TTA_{B2}$ | 8.4 | 7.9 | 9.5 | 9.4 |
|   | $RTA_{R4} = TTA_{B2}$ | 6.7 | 6.7 | 6.7 | 6.7 |

In <Table 4>, UER 1 refers to a wireless access channel between a relay base station (e.g., the base station 130) and a fifth relay base station, UER 2 refers to a wireless access channel between the relay base station and a sixth terminal, UER 3 refers to a wireless access channel between the relay base station and a seventh terminal, and UER 4 refers to a wireless access channel between the relay base station and an eighth terminal. One of the fifth to eighth terminals may be the terminal 140. In <Table 4>, values corresponding to UER 1 refer to TTA or RTA of uplink signals transmitted via UER 1, values corresponding to UER 2 refer to TTA or RAT of uplink signals transmitted via UER 2, values corresponding to UER 3 refer to TTA or RTA of uplink signals transmitted via UER 3, and values corresponding to UER 4 refer to TTA or RTA of uplink signals transmitted via UER 4. In <Table 4>, units of the values expressed for UER 1, UER 2, UER 3, and UER 4, respectively, may be us. The values illustrated in <Table 4> are exemplary, and may vary depending on other elements (e.g., channel situations and distances between the relay base station and the terminals).

In <Table 2> to <Table 4>, an RTA value of less than 0 means that a reception time point of an uplink signal, which is associated with a base station, is delayed compared to a reference synchronization time point of the base station. In order for a base station to change configurations of base station elements for receiving an uplink signal to configurations for transmitting a downlink signal, the base station should secure a protection section corresponding to a minimum UDG, and therefore the base station may further designate at least one of uplink symbols as the protection section if the RTA has a value smaller than the UDG. However, if the RTA is equal to or greater than the UDG, the base station may not designate at least one of the uplink symbols as the protection section, and may reduce waste due to designation of the protection section.

<Table 5> indicates directions of signals transmitted via respective channels in subframes corresponding to respective indexes (0 to 9).

TABLE 5

| Subframe index | 0 | 1 | 2 | 3 | 4 | 5 | 6 | 7 | 8 | 9 |
|---|---|---|---|---|---|---|---|---|---|---|
| Wireless access channel related to donor base station | D | D | U | D | U | U | D | U | D | U |
| WBH 1 | D | U | D | D | D | U | D | U | D | U |
| Wireless access channel related to first relay base station | D | U | D | U | D | U | U | D | D | U |
| WBH 2 | D | U | D | D | U | U | D | — | U | D |
| Wireless access channel related to second relay base station | D | U | D | D | U | U | D | U | U | D |
| WBH 3 | D | D | U | D | D | U | D | — | U | D |
| Wireless access channel related to third relay base station | D | D | U | D | D | U | D | U | U | D |

According to <Table 5>, different communication situations may be defined for each subframe. In <Table 5>, "D" refers to downlink, and "U" refers to uplink, and "-" indicates that there is no wireless signal transmitted via a corresponding channel. In <Table 5>, communication situations corresponding to respective subframes are exemplary, and the communication situations may be different from those in <Table 5> for each subframe.

If directions of signals transmitted via respective channels in subframes corresponding to respective indexes (0 to 9) are the same as those in <Table 5>, TTA (or RTA) indexes of the uplink signals transmitted via respective channels in each subframe are as shown in <Table 6> below.

TABLE 6

| Subframe index | 0 | 1 | 2 | 3 | 4 | 5 | 6 | 7 | 8 | 9 |
|---|---|---|---|---|---|---|---|---|---|---|
| Wireless access channel related to donor base station | — | — | 2 | — | 2 | 1 | — | 3-1 | — | 2 |
| WBH 1 | — | 2 | — | — | — | 1 | — | 3 | — | 2 |
| Wireless access channel related to first relay base station | — | 4 | — | 2 | — | 3 | 2 | — | — | 4 |
| WBH 2 | — | 2 | — | — | 2 | 1 | — | — | 2 | — |
| Wireless access channel related to second relay base station | — | 4 | — | — | 4 | 3 | — | 1 | 4 | — |
| WBH 3 | — | — | 2 | — | — | 1 | — | — | 2 | — |
| Wireless access channel related to third relay base station | — | — | 4 | — | — | 3 | — | 1 | 4 | — |

In <Table 6>, "-" indicates that there is no signal transmitted via a corresponding channel, or a signal transmitted via the channel is a downlink signal.

Figure 16:
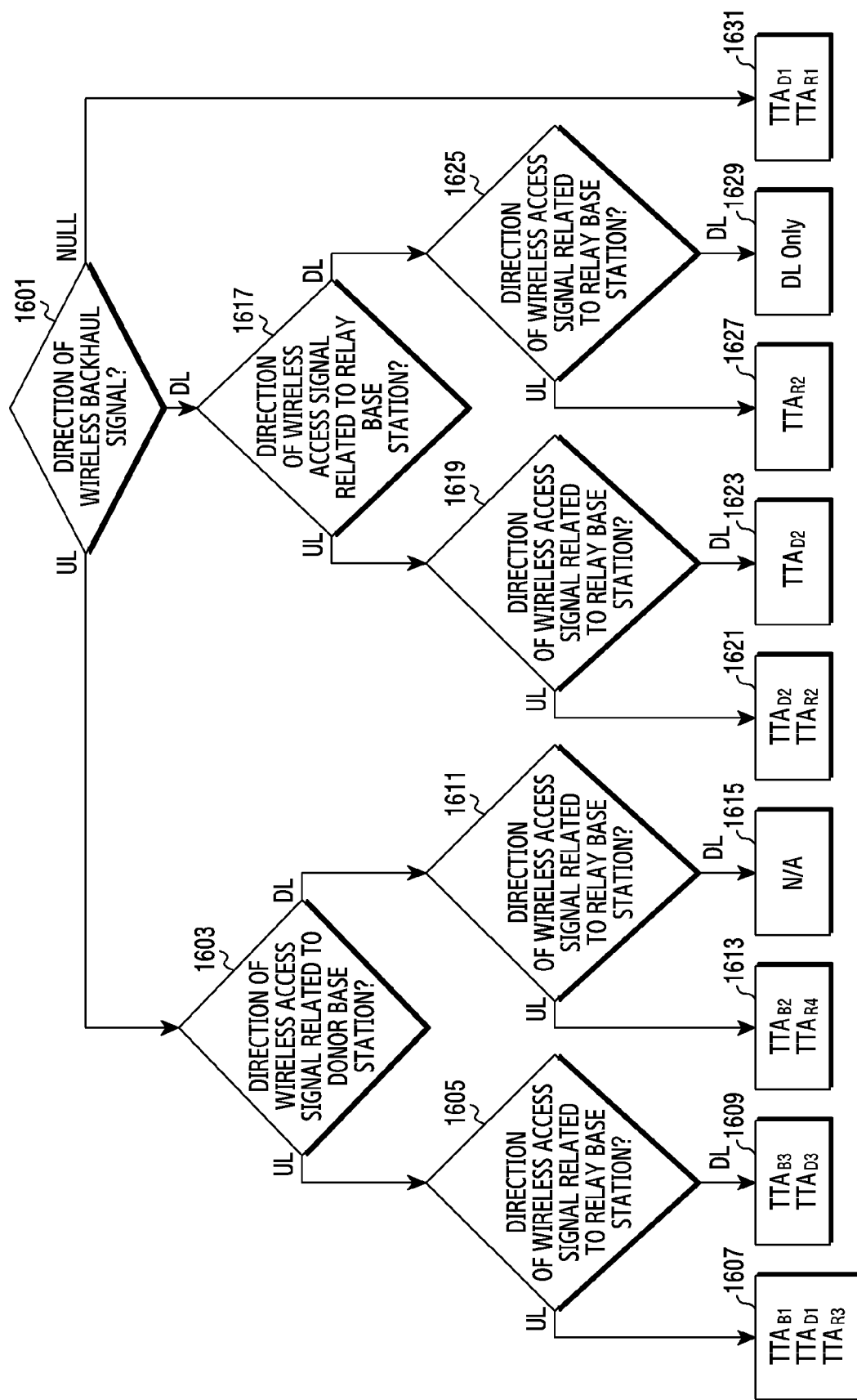
FIG. 16 illustrates a flowchart of a TTA determination device in the wireless communication system according to various embodiments of the disclosure.

FIG. 16 illustrates a flowchart of a TTA determination device in the wireless communication system according to various embodiments of the disclosure. For example, the TTA determination device of FIG. 16 may be a device different from the base station 110 and the base station 130. As another example, the TTA determination device may be included in the base station 110 and/or device 130. In this case, the TTA determination device described hereinafter may be performed by a controller (e.g., the controller 240) of the base station 110 and/or the base station 130.

Referring to FIG. 16, in operation 1601, the TTA determination device determines a direction of a wireless backhaul signal related to a donor base station (e.g., the base station 110).

If the direction of the wireless backhaul signal is uplink, in operation 1603, the TTA determination device determines a direction of a wireless access signal related to the donor base station.

If the direction of the wireless backhaul signal is uplink, and the direction of the wireless access signal related to the donor base station is uplink, in operation 1605, the TTA determination device determines a direction of the wireless access signal related to a relay base station (e.g., the base station 130).

If the direction of the wireless backhaul signal is uplink, the direction of the wireless access signal related to the donor base station is uplink, and the direction of the wireless access signal related to the relay base station is uplink, in operation 1607, the TTA determination device determines TTA of the wireless backhaul signal as $TTA_{B1}$, determines TTA of the wireless access signal related to the donor base station as $TTA_{D1}$, and determines TTA of the wireless access signal related to the relay base station as $TTA_{R3}$.

If the direction of the wireless backhaul signal is uplink, the direction of the wireless access signal related to the donor base station is uplink, and the direction of the wireless access signal related to the relay base station is downlink, in operation 1609, the TTA determination device determines TTA of the wireless backhaul signal as $TTA_{B3}$, and determines TTA of the wireless access signal related to the donor base station as $TTA_{D3}$.

If the direction of the wireless backhaul signal is uplink, and the direction of the wireless access signal related to the donor base station is downlink, in operation 1611, the TTA determination device determines the direction of the wireless access signal related to a relay base station.

If the direction of the wireless backhaul signal is uplink, the direction of the wireless access signal related to the donor base station is downlink, and the direction of the wireless access signal related to the relay base station is uplink, in operation 1613, the TTA determination device determines TTA of the wireless backhaul signal as $TTA_{B2}$, and determines TTA of the wireless access signal related to the relay base station as $TTA_{R4}$.

If the direction of the wireless backhaul signal is uplink, the direction of the wireless access signal related to the donor base station is downlink, and the direction of the wireless access signal related to the relay base station is downlink, in operation 1615, the TTA determination device may not determine TTA of the signals.

If the direction of the wireless backhaul signal is downlink, in operation 1617, the TTA determination device determines the direction of the wireless access signal related to the donor base station.

If the direction of the wireless backhaul signal is downlink, and the direction of the wireless access signal related to the donor base station is uplink, in operation 1619, the TTA determination device determines the direction of the wireless access signal related to the relay base station.

If the direction of the wireless backhaul signal is downlink, the direction of the wireless access signal related to the donor base station is uplink, and the direction of the wireless access signal related to the relay base station is uplink, in operation 1621, the TTA determination device determines TTA of the wireless access signal related to the donor device as $TTA_{D2}$, and determines TTA of the wireless access signal related to the relay base station as $TTA_{R2}$.

If the direction of the wireless backhaul signal is downlink, the direction of the wireless access signal related to the donor base station is uplink, and the direction of the wireless access signal related to the relay base station is downlink, in operation 1623, the TTA determination device determines TTA of the wireless access signal related to the donor base station as $TTA_{D2}$.

If the direction of the wireless backhaul signal is downlink, and the direction of the wireless access signal related to the donor base station is downlink, in operation 1625, the TTA determination device determines the direction of the wireless access signal related to the relay base station.

If the direction of the wireless backhaul signal is downlink, the direction of the wireless access signal related to the donor base station is downlink, and the direction of the wireless access signal related to the relay base station is uplink, in operation 1627, the TTA determination device determines TTA of the wireless access signal related to the relay base station as $TTA_{R2}$.

If the direction of the wireless backhaul signal is downlink, the direction of the wireless access signal related to the donor base station is downlink, and the direction of the wireless access signal related to the relay base station is downlink, in operation 1629, the TTA determination device may not determine TTA of the signals.

If the direction of the wireless backhaul signal has a null value, in other words, if the donor base station and the relay device do not transmit or receive signals via wireless backhaul, the TTA determination device may determine TTA of the wireless access signal related to the donor base station as $TTA_{D1}$, and may determine TTA of the wireless access signal related to the relay base station as $TTA_{R1}$.

In FIG. 16, the sequence of determining the directions of the signals are exemplary, and the TTA determination device may determine the directions of the signals in a sequence different from that illustrated in FIG. 16.

Various embodiments of the disclosure may be applied not only to a wireless communication system including one relay base station and one donor base station, as shown in FIG. 1, but also to a multi-hop relay system in which one relay base station functions as a donor base station of another relay base station. In a multi-hop relay system, a base station corresponding to an n-th hop may function as a donor base station of a base station corresponding to an (n+1)th hop. Similarly, the base station corresponding to the (n+1)th hop may function as a relay base station of the base station corresponding to the nth hop. Likewise, in the multi-hop relay system, donor base station n and relay base station n+1 may be defined.

As shown in <Table 3>, in a situation where TTA of an uplink signal transmitted via UED should be determined to be $TTA_{D3}$ (=a communication situation corresponding to operation 1609 of FIG. 16), a specific value of $TTA_{D3}$ may vary depending on the relay base station performing communication with the donor base station. Further, in a communication situation corresponding to operation 1615 of FIG. 16, TTA of the wireless backhaul signal may not be easily determined. Therefore, if these communication situations are not considered, TTA for each node in the multi-hop relay system may be determined more simply. Hereinafter, on the basis of FIG. 17A to FIG. 17C, TTA determination methods in the multi-hop relay system of a case where these communication situations have been excluded are described.

Figure 17A:
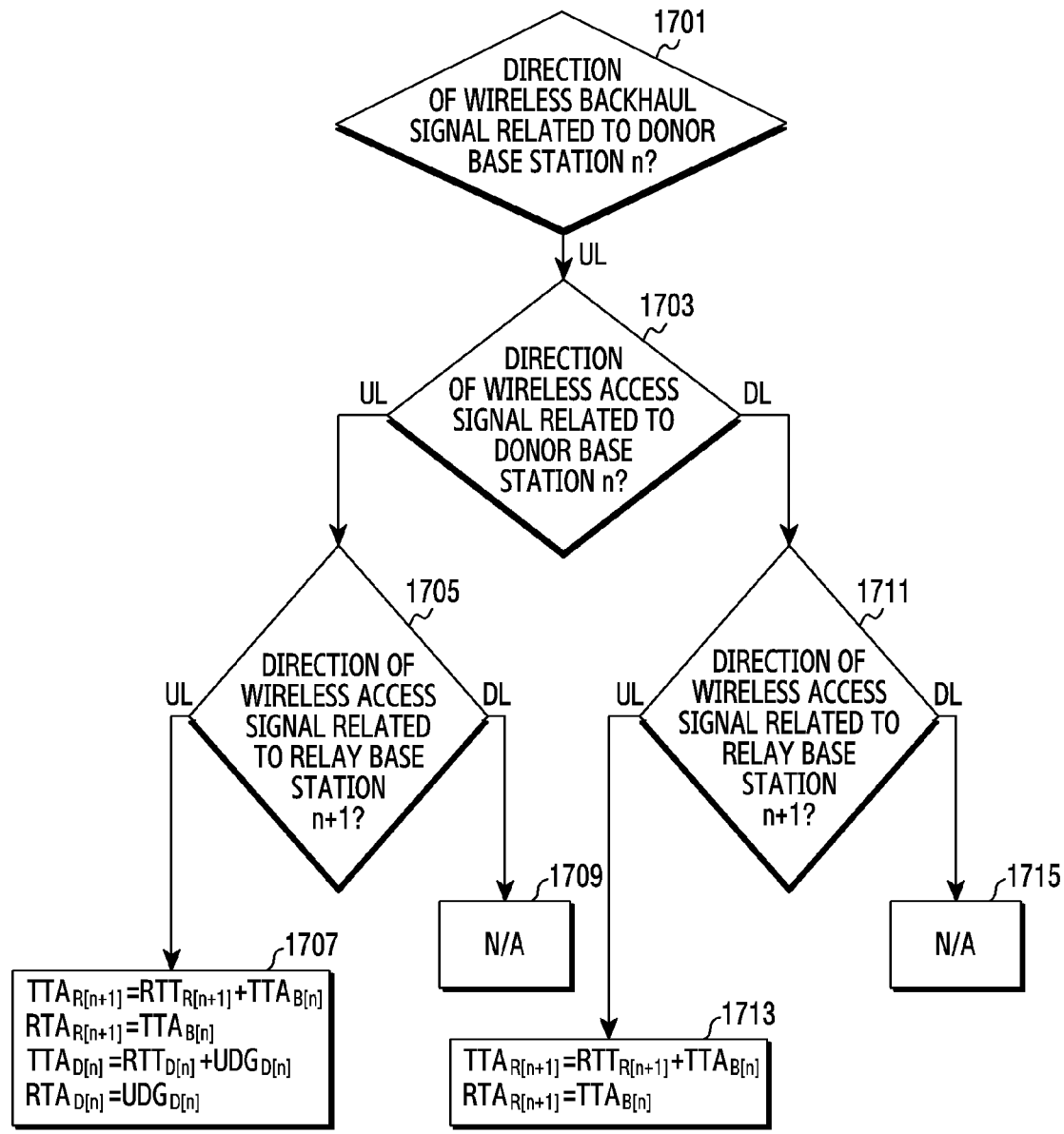
FIG. 17A to FIG. 17C illustrate flowcharts of a TTA determination device when a multi-hop relay scheme is supported in the wireless communication system according to various embodiments of the disclosure.
Figure 17B:
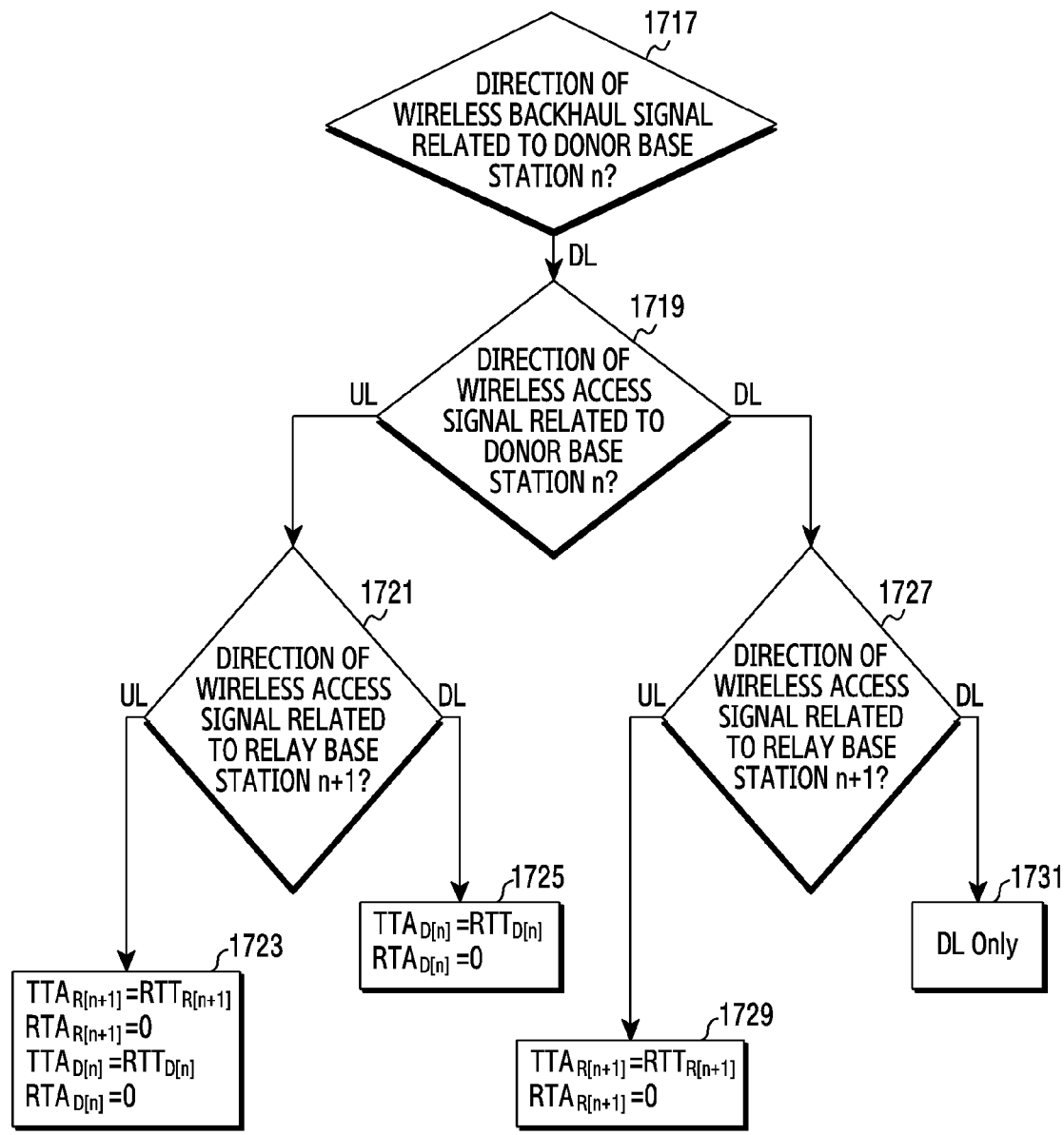
Figure 17C:
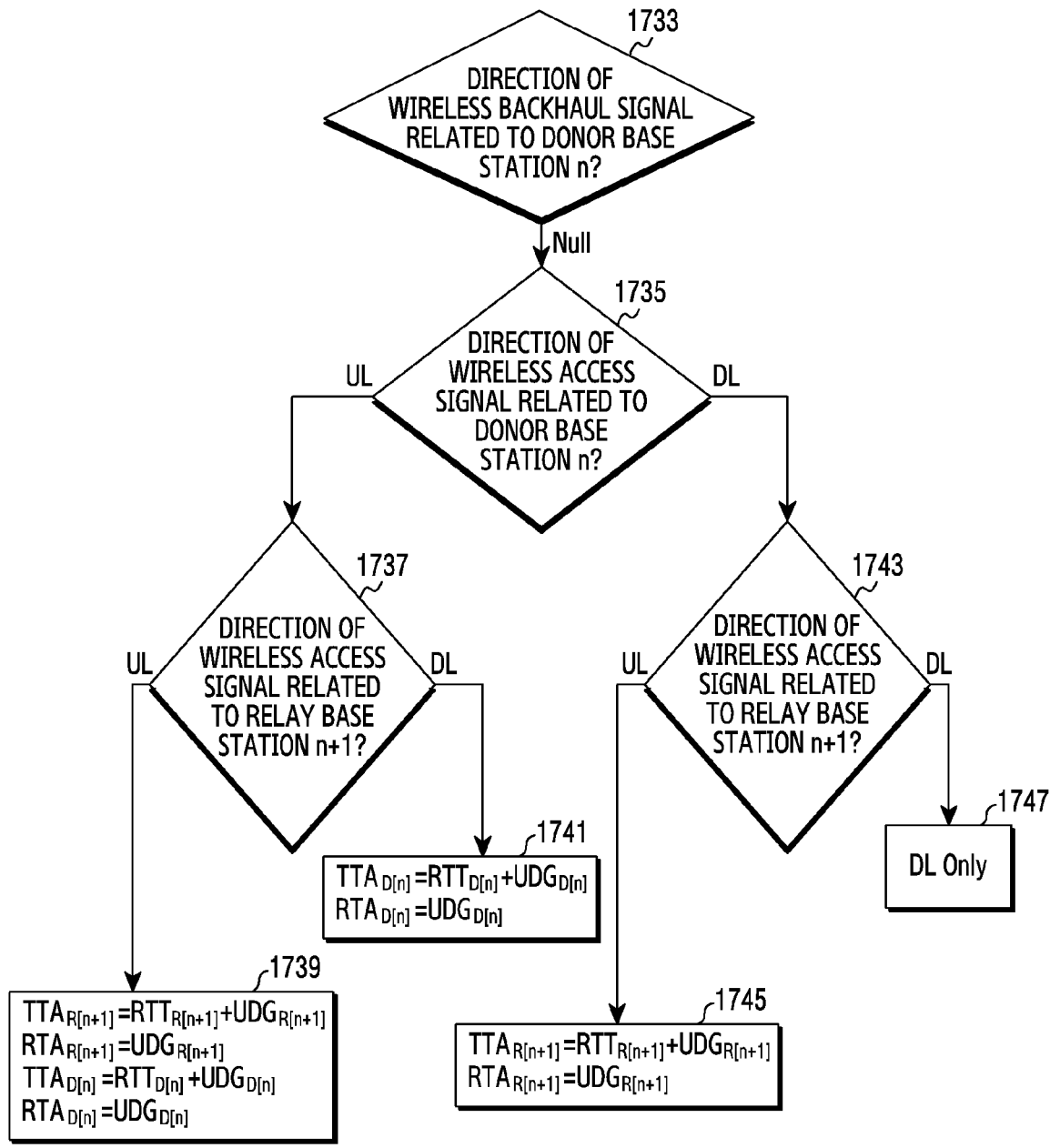

FIG. 17A to FIG. 17C illustrate flowcharts of a TTA determination device when a multi-hop relay scheme is supported in the wireless communication system according to various embodiments of the disclosure. In FIG. 17A to FIG. 17C, donor base station n and relay base station n+1 in the multi-hop relay system and signals related thereto are considered. For example, a TTA determination device may be a device different from donor base station n and relay base station n+1. As another example, the TTA determination device may be included in donor base station n and/or relay base station n+1, wherein operations of the TTA determination device, which are described hereinafter, may be performed by donor base station n and/or relay base station n+1.

Referring to FIG. 17A, in operation 1701, the TTA determination device determines that a direction of a wireless backhaul signal related to donor base station n is uplink.

If the direction of the wireless backhaul signal is uplink, in operation 1703, the TTA determination device determines a direction of a wireless access signal related to donor base station n.

If the direction of the wireless backhaul signal is uplink, and the direction of the wireless access signal related to donor base station n is uplink, in operation 1705, the TTA determination device determines a direction of a wireless access signal related to relay base station n+1.

If the direction of the wireless backhaul signal is uplink, the direction of the wireless access signal related to donor base station n is uplink, and the direction of the wireless access signal related to relay base station n+1 is uplink, in operation 1707, the TTA determination device determines $TTA_{R[n+1]}$, which is TTA of the wireless access signal related to relay base station n+1, to be a sum of $RTT_{R[n+1]}$ and $TTA_{B[n]}$, and determines $TTA_{D[n]}$, which is TTA of the wireless access signal related to donor base station n, to be a sum of $RTT_{D[n]}$ and $UDG_{D[n]}$. $RTT_{R[n+1]}$ refers to a time taken for a signal to travel a round-trip time between relay base station n+1 and a serving terminal of relay base station n+1, $TTA_{B[n]}$ refers to a time offset at which relay base station n+1 transmits an uplink wireless backhaul signal to donor base station n, $RTT_{D[n]}$ refers to a time taken for a signal to travel a round-trip distance between donor base station n and a serving terminal of donor base station n, and $UDG_{D[n]}$ refers to a minimum time required for donor base station n to change configurations of base station elements for receiving an uplink wireless access signal to configurations for transmitting a downlink wireless access signal. $RTA_{R[n+1]}$, which is RTA of the wireless access signal related to relay base station n+1, may be determined to be $TTA_{B[n]}$, and $RTA_{D[n]}$, which is RTA of the wireless access signal related to donor base station n, may be determined to be $UDG_{D[n]}$.

A case, in which the direction of the wireless backhaul signal is uplink, the direction of the wireless access signal related to donor base station n is uplink, and the direction of the wireless access signal related to relay base station n+1 is downlink, corresponds to a communication situation that is not considered, and therefore the TTA determination device may not determine TTA of the signals, in operation 1709.

If the direction of the wireless backhaul signal is uplink, and the direction of the wireless access signal related to donor base station n is downlink, in operation 1711, the TTA determination device determines the direction of the wireless access signal related to relay base station n+1.

If the direction of the wireless backhaul signal is uplink, the direction of the wireless access signal related to donor base station n is downlink, and the direction of the wireless access signal related to relay base station n+1 is uplink, in operation 1713, the TTA determination device determines $TTA_{R[n+1]}$, which is TTA of the wireless access signal related to relay base station n+1, to be a sum of $RTT_{R[n+1]}$ and $TTA_{B[n]}$. $RTA_{R[n+1]}$, which is RTA of the wireless access signal related to relay base station n+1, may be determined to be $TTA_{B[n]}$.

A case, in which the direction of the wireless backhaul signal is uplink, the direction of the wireless access signal related to donor base station n is downlink, and the direction of the wireless access signal related to relay base station n+1 is downlink, corresponds to a communication situation that is not considered, and therefore the TTA determination device may not determine TTA of the signals, in operation 1715.

Referring to FIG. 17B, in operation 1717, the TTA determination device determines that the direction of the wireless backhaul signal related to donor base station n is uplink.

If the direction of the wireless backhaul signal is downlink, in operation 1719, the TTA determination device determines the direction of the wireless access signal related to donor base station n.

If the direction of the wireless backhaul signal is downlink, and the direction of the wireless access signal related to donor base station n is uplink, in operation 1721, the TTA determination device determines the direction of a wireless access signal related to relay base station n+1.

If the direction of the wireless backhaul signal is downlink, the direction of the wireless access signal related to donor base station n is uplink, and the direction of the wireless access signal related to relay base station n+1 is uplink, in operation 1723, the TTA determination device determines $TTA_{R[n+1]}$, which is TTA of the wireless access signal related to relay base station n+1, to be $RTT_{R[n+1]}$, and determines $TTA_{D[n]}$, which is TTA of the wireless access signal related to donor base station n, to be $RTT_{D[n]}$. $RTA_{R[n+1]}$, which is RTA of the wireless access signal related to relay base station n+1, may be determined to be 0 (=a reference synchronization time point of relay base station n+1), and $RTA_{D[n]}$, which is RTA of the wireless access signal related to donor base station n, may be determined to be 0 (=a reference synchronization time point of donor base station n).

If the direction of the wireless backhaul signal is downlink, the direction of the wireless access signal related to donor base station n is uplink, and the direction of the wireless access signal related to relay base station n+1 is downlink, in operation 1725, the TTA determination device determines $TTA_{D[n]}$, which is TTA of the wireless access signal related to donor base station, to be $RTT_{D[n]}$. $RTA_{D[n]}$, which is RTA of the wireless access signal related to donor base station n, may be determined to be 0 (=the reference synchronization time point of donor base station n).

If the direction of the wireless backhaul signal is downlink, and the direction of the wireless access signal related to donor base station n is downlink, in operation 1727, the TTA determination device determines the direction of a wireless access signal related to relay base station n+1.

If the direction of the wireless backhaul signal is downlink, the direction of the wireless access signal related to donor base station n is downlink, and the direction of the wireless access signal related to relay base station n+1 is uplink, in operation 1729, the TTA determination device determines $TTA_{R[n+1]}$, which is TTA of the wireless access signal related to relay base station n+1, to be $RTT_{R[n+1]}$. $RTA_{R[n+1]}$, which is RTA of the wireless access signal related to relay base station n+1, may be determined to be 0 (=the reference synchronization time point of relay base station n+1).

A case, in which the direction of the wireless backhaul signal is downlink, the direction of the wireless access signal related to donor base station n is downlink, and the direction of the wireless access signal related to relay base station n+1 is downlink, is a case in which all directions of the signals are downlink, and therefore the TTA determination device may not determine TTA of the signals, in operation 1731.

Referring to FIG. 17C, in operation 1733, the TTA determination device determines that the direction of the wireless backhaul signal related to donor base station n is null. In other words, the TTA determination device determines that donor base station n and relay base station n do not transmit or receive signals via wireless backhaul.

If the direction of the wireless backhaul signal is null, in operation 1735, the TTA determination device determines the direction of the wireless access signal related to donor base station n.

If the direction of the wireless backhaul signal is null, and the direction of the wireless access signal related to donor base station n is uplink, in operation 1737, the TTA determination device determines the direction of a wireless access signal related to relay base station n+1.

If the direction of the wireless backhaul signal is null, the direction of the wireless access signal related to donor base station n is uplink, and the direction of the wireless access signal related to relay base station n+1 is uplink, in operation 1739, the TTA determination device determines $TTA_{R[n+1]}$, which is TTA of the wireless access signal related to relay base station n+1, to be a sum of $RTT_{R[n+1]}$ and $UDG_{R[n+1]}$, and determines $TTA_{D[n]}$, which is TTA of the wireless access signal related to donor base station n, to be a sum of $RTT_{D[n]}$ and $UDG_{D[n]}$. $UDG_{R[n+1]}$ refers to a minimum time required for relay base station n+1 to change configurations of base station elements for receiving an uplink wireless access signal to configurations for transmitting a downlink wireless access signal. $RTA_{R[n+1]}$, which is RTA of the wireless access signal related to relay base station n+1, may be determined to be $UDG_{R[n+1]}$, and $RTA_{D[n]}$, which is RTA of the wireless access signal related to donor base station n, may be determined to be $UDG_{[n]}$.

If the direction of the wireless backhaul signal is null, the direction of the wireless access signal related to donor base station n is uplink, and the direction of the wireless access signal related to relay base station n+1 is downlink, in operation 1741, the TTA determination device determines $TTA_{D[n]}$, which is TTA of the wireless access signal related to donor base station n, to be a sum of $RTT_{D[n]}$ and $UDG_{D[n]}$. $RTA_{D[n]}$, which is RTA of the wireless access signal related to donor base station n, may be determined to be $UDG_{D[n]}$.

If the direction of the wireless backhaul signal is null, and the direction of the wireless access signal related to donor base station n is downlink, in operation 1743, the TTA determination device determines the direction of the wireless access signal related to relay base station n+1.

If the direction of the wireless backhaul signal is null, the direction of the wireless access signal related to donor base station n is downlink, and the direction of the wireless access signal related to relay base station n+1 is uplink, in operation 1745, the TTA determination device determines $TTA_{R[n+1]}$, which is TTA of the wireless access signal related to relay base station n+1, to be a sum of $RTT_{R[n+1]}$ and $UDG_{R[n+1]}$.

$RTA_{R[n+1]}$, which is RTA of the wireless access signal related to relay base station n+1, may be determined to be $UDG_{R[n+1]}$.

A case, in which the direction of the wireless backhaul signal is downlink, the direction of the wireless access signal related to donor base station n is downlink, and the direction of the wireless access signal related to relay base station n+1 is downlink, is a case in which all directions of the signals are downlink, and therefore the TTA determination device may not determine TTA of the signals, in operation 1747.

The sequences of determining the directions of the signals in FIG. 17A to FIG. 17C are exemplary, and the TTA determination device may determine the directions of the signals in a sequence different from that illustrated in FIG. 17A to FIG. 17C.

According to various embodiments of the disclosure, in order for a terminal to transmit an uplink signal according to suitable TTA, a base station should provide the terminal with information related to TTA. For example, the base station may transmit, to the terminal, information relating to TTA via at least one of a PDCCH (e.g., downlink control information (DCI) transmitted on the PDCCH), a media access control (MAC) control element (CE), a radio resource control (RRC), and a radio link control (RLC). The information relating to TTA may be transmitted during a procedure of initial access to the base station by the terminal. For example, if the terminal transmits a random access channel (RACH) signal to the base station and accesses the base station, the base station may transmit information relating to TTA to the terminal. The information relating to TTA may further include a baseline TTA value which is to be used by the terminal for transmission of information corresponding to PUCCH.

According to various embodiments of the disclosure, the base station may transmit information relating to TTA to the terminal each time a wireless resource for uplink communication of the terminal is allocated. The base station first transmits, to the terminal, a list of all TTA values available to the terminal, and then the base station may transmit, to the terminal, only an index corresponding to a TTA value in the list, which is to be used by the terminal in a current communication situation. According to various embodiments, the list of TTA values may include TTA values and TTA indexes corresponding to respective communication situations as shown in <Table 1>, <Table 2>, <Table 3>, <Table 4>, <Table 5>, and <Table 6>. The amount of control information transmitted by the base station to the terminal may be reduced. The terminal may retrieve a TTA value in the TTA list, which corresponds to an index received from the base station, and then may transmit an uplink signal to the base station according to the retrieved TTA value.

The TTA value is determined according to a communication situation, and TTA indexes designated for all terminals in a specific communication situation are the same. Therefore, the base station may transmit information relating to TTA as common information (e.g., broadcast information) to all terminals and, in this case, the amount of control information transmitted to the terminal by the base station may be further reduced.

According to various embodiments of the disclosure, a communication situation may vary for each subframe. In this case, the base station may transmit, to the terminal, information relating to TTA at each subframe. A plurality of communication situations may be repeated periodically. For example, the plurality of communication situations may be repeated for each 40 subframes. TTA values correspond to communication situations, and therefore when the plurality of communication situations are periodically repeated, the TTA values may be also periodically repeated. The base station may broadcast, as system information, information including at least one of a sequence in which a plurality of communication situations are repeated and a period in which the plurality of communication situations are repeated, and the amount of control information transmitted to the terminal by the base station may be further reduced.

If the terminal moves and a distance between the base station and the terminal changes, or a communication environment and a communication path change, a TTA value may also change. In this case, the base station may transmit information relating to a changed TTA value to the terminal. However, even if a specific value of TTA changes, the principle of determining TTA in each communication situation and an TTA index corresponding to each communication situation may not change. Therefore, according to various embodiments of the disclosure, a plurality of tables including lists of TTA values may be defined in advance. Each of the plurality of tables may be distinguished by an index. If the base station determines that a TTA value for the terminal has been changed, the base station may identify a table including the TTA value changed in a corresponding communication situation. The base station may provide the terminal with information relating to the index of the identified table, and the terminal may identify a TTA value corresponding to an existing TTA index in a table of the received index.

Hereinafter, a procedure of transmitting information relating to TTA will be described in more detail in FIG. 18 to FIG. 19.

Figure 18:
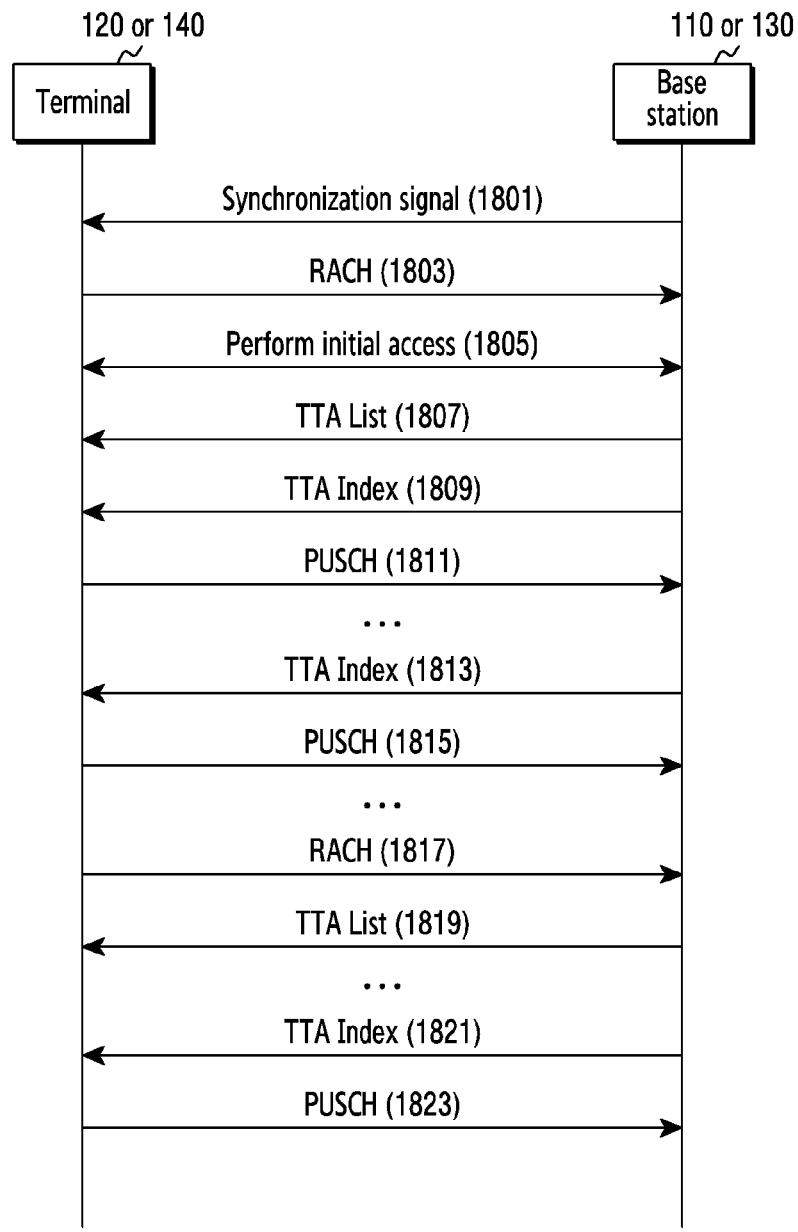
FIG. 18 illustrates a flowchart of transmitting information relating to TTA between a terminal and a base station in the wireless communication system according to various embodiments of the disclosure.

FIG. 18 illustrates a flowchart of transmitting information relating to TTA between a terminal and a base station in the wireless communication system according to various embodiments of the disclosure. The signal flow illustrated in FIG. 18 may be transmitted or received between a donor base station (e.g., the base station 110) and a serving terminal (e.g., the terminal 120) of the donor base station. Alternatively, the signal flow illustrated in FIG. 18 may be transmitted or received between a relay base station (e.g., the base station 130) and a serving terminal (e.g., the terminal 140) of the relay base station.

Referring to FIG. 18, in operation 1801, a terminal transmits a synchronization signal to a terminal. The terminal may receive the synchronization signal so as to be time-synchronized with the base station. Although not illustrated, the terminal receives system information and broadcast control information from the base station, and acquires information necessary for accessing the base station by the terminal.

In operation 1803, the terminal transmits an RACH signal to the base station. In order to access the base station, the terminal may transmit the RACH signal to the base station.

In operation 1805, the terminal performs initial access to the base station. The terminal may receive acknowledgment (ACK) information for the RACH signal, and the terminal may perform initial access to the base station.

Although not illustrated, after operation 1805, the base station calculates TTA values to be used by the terminal, which has performed the initial access, in respective communication situations, and generates a list of the TTA values. According to various embodiments, the list of TTA values may include TTA values and TTA indexes corresponding to respective communication situations as shown in <Table 1>, <Table 2>, <Table 3>, <Table 4>, <Table 5>, and <Table 6>.

In operation 1807, the terminal transmits the TTA list to the base station. The TTA list may be transmitted via at least one of PDCCH, MAC CE, RRC, and RLC.

In operation 1809, the base station transmits a TTA index to the terminal. The base station may transmit a TTA index in the TTA list, which corresponds to a current communication situation, to the terminal.

In operation 1811, the terminal transmits a PUSCH, which is an uplink signal, to the base station. The terminal may identify a TTA value corresponding to the TTA index in the TTA list, which is received from the base station, and may transmit the PUSCH to the base station according to the TTA value.

The TTA list has already been transmitted to the terminal in operation 1807, and therefore the base station transmits only the TTA index to the terminal in operation 1813 when the communication situation is changed. That is, the base station does not retransmit the TTA list to the terminal.

In operation 1815, the terminal transmits the PUSCH to the base station. The terminal may identify a TTA value corresponding to a TTA index in the TTA list, which is newly received from the base station, and may transmit the PUSCH to the base station according to the TTA value.

If the terminal moves and a distance between the base station and the terminal changes, or a communication environment and a communication path change, the terminal transmits the RACH signal to the base station in operation 1817. Thereafter, the base station re-calculates TTA values to be used by the terminal in respective communication situations, and generates a list of the TTA values. Hereinafter, operations performed in operations 1819 to 1823 are the same as the operations performed in operations 1807 to 1811.

In FIG. 18, the base station first transmits a TTA list to the terminal, and transmits only a TTA index to the terminal each time a communication situation changes. However, this is exemplary, and the base station may indicate a TTA value itself to the terminal each time the communication situation changes. In this case, the base station may not transmit the TTA list to the terminal. A plurality of communication situations may be periodically repeated, and therefore the base station may transmit, to the terminal, information including at least one of a current communication situation after the terminal performs initial access, a sequence in which the plurality of communication situations are repeated, and a period in which the plurality of communication situations are repeated, and then TTA-related signaling may not be performed to the terminal. In FIG. 18, it has been described that the information relating to TTA (e.g., the TTA list) is transmitted in the initial access procedure. However, this is exemplary, and the information relating to TTA may be transmitted at a time point other than the initial access procedure.

Figure 19:
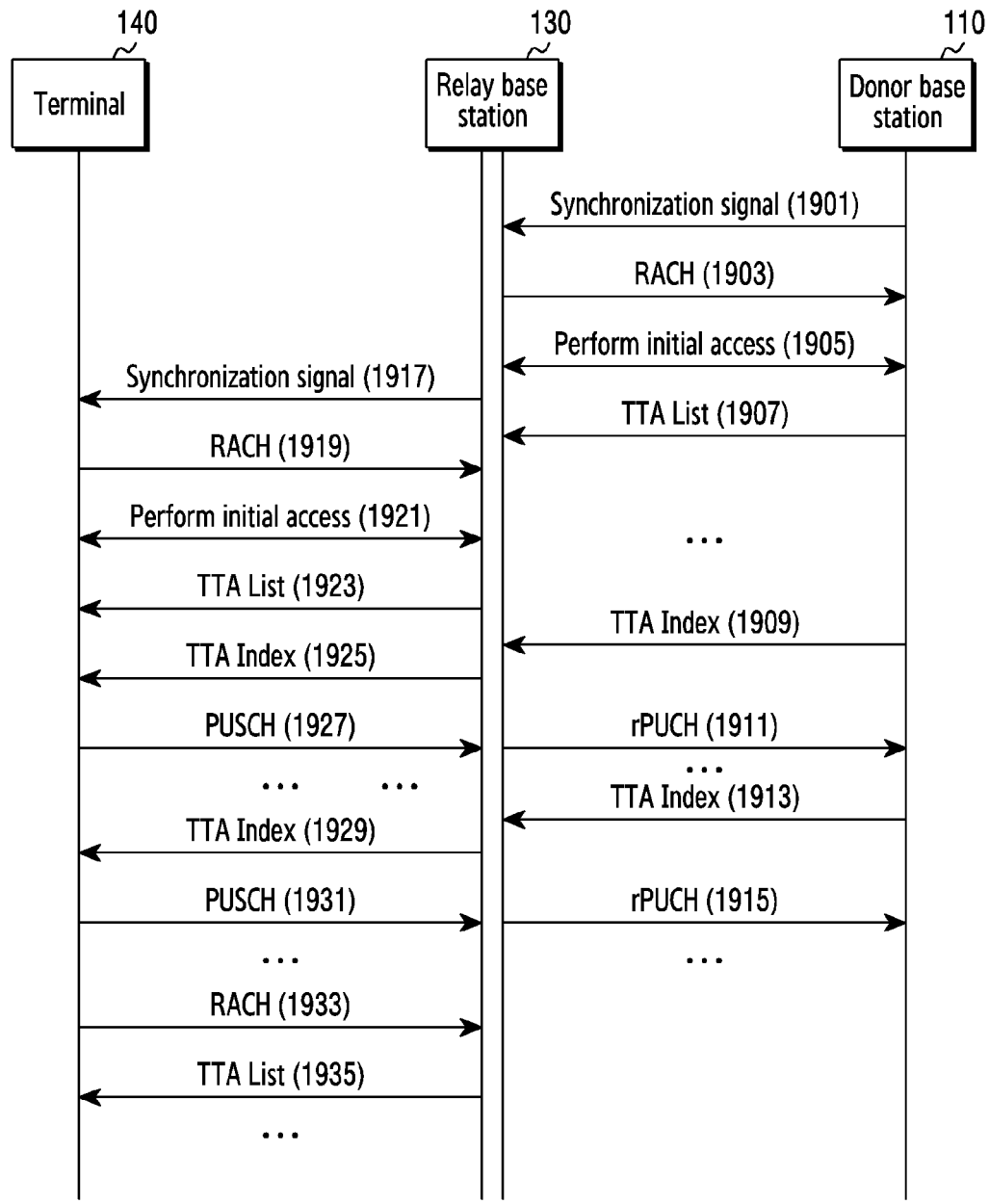
FIG. 19 illustrates a procedure of transmitting information relating to TTA between a donor base station, a relay base station, and a terminal in the wireless communication system according to various embodiments of the disclosure.

FIG. 19 illustrates a procedure of transmitting information relating to TTA between a donor base station, a relay base station, and a terminal in the wireless communication system according to various embodiments of the disclosure.

Referring to FIG. 19, in operation 1901, a donor base station transmits a synchronization signal to a relay base station. The relay base station may receive the synchronization signal from the donor base station so as to be time-synchronized with the donor base station. Although not illustrated, the relay base station receives system information and broadcast control information from the donor base station, and acquires information necessary for accessing the donor base station by the relay base station.

The relay base station transmits an RACH signal to the donor base station in operation 1903, and the relay base station performs initial access to the donor base station so as to initiate wireless backhaul communication, in operation 1905.

Although not illustrated, after operation 1905, the donor base station calculates TTA values to be used by the relay base station, which has performed the initial access, in respective communication situations, and generates a list of the TTA values.

In operation 1907, the donor base station transmits the TTA list to the relay base station. The TTA list may be transmitted via at least one of PDCCH, MAC CE, RRC, and RLC.

In operation 1909, the donor base station transmits a TTA index to the relay base station. The donor base station may transmit a TTA index in the TTA list, which corresponds to a current communication situation, to the relay base station.

In operation 1911, the relay base station transmits an rPUCH, which is an uplink wireless backhaul signal, to the donor base station. The relay base station may identify a TTA value corresponding to the TTA index in the TTA list, which is received from the donor base station, and may transmit the rPUCH to the donor base station according to the TTA value.

The TTA list has already been transmitted to the relay base station in operation 1907, and therefore the donor base station transmits only the TTA index to the relay base station in operation 1913 when the communication situation is changed. That is, the donor base station does not retransmit the TTA list to the relay base station.

In operation 1915, the relay base station transmits the rPUCH to the base station. The relay base station may identify a TTA value corresponding to the TTA index in the TTA list, which is received from the donor base station, and may transmit the rPUCH to the donor base station according to the TTA value.

Although not illustrated, if a communication environment and a communication path between the relay base station and the donor base station are changed, the relay base station may re-perform operations in operations 1901 to 1907.

Operations performed between the terminal and relay base station in operations 1917 to 1931 are the same as the operations performed in operations 1801 to 1815 of FIG. 18. However, a downlink signal received from the donor base station by the relay base station and a downlink signal transmitted to the terminal by the relay base station should be time-synchronized, and therefore the relay base station first performs initial access to the donor base station so as to be time-synchronized with the donor base station, and then the relay base station transmits a synchronization signal to the terminal in operation 1917. When the relay base station calculates TTA values used by the terminal in respective communication situations, TTA values for the relay base station may be required. Therefore, the relay base station may first receive, from the donor base station, a list the TTA values for the relay base station, may calculate TTA values to be used by the terminal in respective communication situations, and then may transmit the TTA list to the terminal in operation 1923. The TTA values to be used by the terminal in respective communication situations may vary depending on a communication situation related to the donor base station, and therefore the relay base station may receive, from the donor base station, information relating to the communication situation (e.g., at least one among information relating to a current communication situation, information relating to a sequence in which a plurality of communication situations are repeated, and information relating to a period in which the plurality of communication situations are repeated), and may determine TTA values to be used by the terminal in respective communication situations, on the basis of the received information relating to the communication situation.

If the terminal moves and a distance between the relay base station and the terminal changes, or a communication environment and a communication path change, the terminal transmits the RACH signal to the relay base station in operation 1933. Thereafter, the relay base station re-calculates TTA values to be used by the terminal in respective communication situations, generates a list of the TTA values, and transmits the generated list of the TTA values to the terminal in operation 1935.

In FIG. 19, the donor base station first transmits a TTA list to the relay base station, and transmits only a TTA index to the relay base station each time a communication situation changes. However, this is exemplary, and the donor base station may indicate a TTA value itself to the relay base station each time the communication situation changes. In this case, the donor base station may not transmit the TTA list to the relay base station. A plurality of communication situations may be periodically repeated, and therefore the donor base station may transmit, to the relay base station, information including at least one of a current communication situation after the relay base station performs initial access, a sequence in which the plurality of communication situation are repeated, and a period in which the plurality of communication situations are repeated, and then TTA-related signaling may not be performed to the relay base station. In FIG. 19, it has been described that the information relating to TTA (e.g., the TTA list) is transmitted in the initial access procedure. However, this is exemplary, and the information relating to TTA may be transmitted at a time point other than the initial access procedure.

In the embodiments described above, it has been assumed that the base station 110 and base station 130 concurrently perform communication with two nodes (that is, each base station uses two antennas). However, this is exemplary, and a base station may concurrently perform wireless access communication and wireless backhaul communication by using three or more antennas. In this case, a symbol structure of a symbol, to which a reference signal for channel estimation is assigned, may be different from a symbol structure illustrated in FIG. 6. For example, if a base station concurrently performs wireless backhaul communication and wireless access communication by using three antennas or more, at least three symbols (e.g., a first symbol, a second symbol, and a third symbol) of different structures, to which the reference signal has been assigned, may be required. For example, in a first symbol, the reference signal may be assigned to sub-carrier index n=6k (k=0, 1, . . . , M/6−1, wherein M is a total number of sub-carriers), a null sub-carrier may be assigned to sub-carrier indexes n=6k+2 and n=6k+4, and data may be assigned to the remaining sub-carrier indexes (=M/2 sub-carrier indexes). In a second symbol, the reference signal may be assigned to sub-carrier index 6k+2, a null sub-carrier may be assigned to sub-carrier indexes n=6k and n=6k+4, and data may be assigned to the remaining sub-carrier indexes (=M/2 sub-carrier indexes). In a third symbol, the reference signal may be assigned to sub-carrier index n=6k+4, a null sub-carrier may be assigned to sub-carrier indexes n=6k and n=6k+2, and data may be assigned to the remaining sub-carrier indexes (=M/2 sub-carrier indexes). As the example described above, if the reference signal is assigned to each six sub-carriers, the base station may concurrently perform communication using a maximum of six antennas, and may concurrently estimate six channels. However, according to a sub-carrier interval, to which the reference signal is assigned, the base station may use a larger number of antennas. For example, if the reference signal is assigned to each eight sub-carriers, the base station may concurrently perform communication using a maximum number of eight antennas.

According to various embodiments of the disclosure, the technique of removing interference between a wireless backhaul signal and a wireless access signal has been described. However, this is exemplary, and various embodiments of the disclosure may be also applied to a plurality of wireless access signals related to the base station. For example, if the base station receives, while transmitting a downlink signal to one terminal, an uplink signal from another terminal, the base station may transmit, to the another terminal, information relating to a transmission time point for time-synchronization of the downlink signal and the uplink signal, and may receive the uplink signal transmitted from the another terminal according to the transmission time point, so as to remove SI having occurred from the downlink signal. Various embodiments of the disclosure may be also applied to a plurality of wireless backhaul signals related to the base station. For example, if the base station receives, while transmitting a downlink signal to another base station, an uplink signal from another base station, the base station may transmit, to the another base station, information relating to a transmission time point for time-synchronization of the downlink signal and the uplink signal, and may receive the uplink signal transmitted from the another base station according to the transmission time point, so as to remove SI having occurred from the downlink signal.

According to various embodiments of the disclosure, if the base station concurrently performs wireless access communication and wireless backhaul communication in the same frequency band as that of the terminal or the another base station, interference between a wireless access signal and a wireless backhaul signal may be removed. However, if frequencies or carriers, in which wireless access communication and wireless backhaul communication are performed, are different but adjacent, or different adjacent frequency resources are used in the same frequency band or carrier, various embodiments of the disclosure may be used to prevent occurrence of adjacent channel interference (ACI). If signals received in adjacent frequency bands (or adjacent carriers or adjacent frequency resources) are not time-synchronized with each other, DFT or FFT calculation for a signal received via any one frequency band may cause ACI for a signal received via adjacent another frequency band. ACI may be removed by time-synchronization of signals received via adjacent frequency bands. According to various embodiments of the disclosure, even if a base station receives signals related to the base station via adjacent frequency bands, the base station may adjust TTA of signals such that the signals related to the base station are time-synchronized with each other, and therefore ACI may not occur. In other words, according to various embodiments of the disclosure, ACI does not occur in received signals, and therefore a procedure of estimating or removing ACI may be omitted.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, the programs may be stored in a memory including a combination of some or all of the memories. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access a device that performs an embodiment of the disclosure via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a base station (BS) in a wireless communication system, the method comprising:
   transmitting, to at least one node, information relating to a transmission time point for time-synchronization of a wireless backhaul signal and a wireless access signal which are related to the base station;
   receiving, from the at least one node, at least one signal transmitted in accordance with the transmission time point; and
   removing, from the at least one signal, interference between the wireless backhaul signal and the wireless access signal, wherein the at least one signal comprises at least one of the wireless backhaul signal and the wireless access signal,
   wherein the interference is determined based on at least one of a reference signal for the wireless backhaul signal or a reference signal for the wireless access signal, and
   wherein the reference signal for the wireless backhaul signal and the reference signal for the wireless access signal are located in sub-carriers of different indexes in a symbol of a same index.

2. The method of claim 1, wherein:
   the wireless backhaul signal is a downlink signal;
   the at least one signal is the wireless access signal; and
   the transmission time point is a time point preceding a reference synchronization time point of the at least one node by a round-trip time of a signal between the at least one node and the base station.

3. The method of claim 1, wherein:
   the at least one node comprises another base station, the at least one signal comprises the wireless access signal and the wireless backhaul signal that is an uplink signal transmitted from the another base station;
   the another base station receives an uplink wireless access signal from a terminal; and
   the transmission time point is a time point preceding a reference synchronization time point of the at least one node by a sum of a round-trip time of a signal between the at least one node and the base station and a time for switching a communication mode of the base station.

4. The method of claim 3, wherein:
   the uplink wireless access signal is transmitted in accordance with a transmission time point for time-synchronization of the uplink wireless access signal and the wireless backhaul signal; and
   a transmission time point of the uplink wireless access signal is a time point preceding a transmission time point of the wireless backhaul signal by a round-trip time of a signal between the terminal and the another base station.

5. The method of claim 1, wherein:
   the at least one signal is the wireless backhaul signal that is an uplink signal;
   the wireless access signal is a downlink signal;
   the at least one node receives an uplink wireless access signal from a terminal; and
   the transmission time point is a time point preceding a reference synchronization time point of the at least one node by a round-trip time of a signal between the at least one node and the base station.

6. The method of claim 5, wherein:
   the uplink wireless access signal is transmitted in accordance with a transmission time point for time-synchronization of the uplink wireless access signal and the wireless backhaul signal; and
   a transmission time point of the uplink wireless access signal is a time point preceding a transmission time point of the wireless backhaul signal by a round-trip time of a signal between the terminal and another base station.

7. The method of claim 1, wherein:
   the at least one node comprises another base station and a terminal;
   the at least one signal comprises the wireless backhaul signal that is an uplink signal transmitted from the another base station and the wireless access signal transmitted from the terminal;
   the another base station transmits a downlink wireless access signal;

a transmission time point of the wireless backhaul signal is a reference synchronization time point of the another base station; and a transmission time point of the wireless access signal is a time point delayed, by a round-trip time of a signal between the another base station and the base station, from a time point preceding a reference synchronization time point of the terminal by a round-trip time of a signal between the terminal and the base station.

8. The method of claim 1, wherein:

the information relating to the transmission time point comprises at least one among an index of a value for the transmission time point, a list of values for a plurality of transmission time points comprising the transmission time point, information relating to a current communication situation, information relating to a sequence in that a plurality of communication situations are repeated, and information relating to a period in which the plurality of communication situations are repeated;

the current communication situation corresponds to the transmission time point; and the plurality of communication situations correspond to the plurality of transmission time points, respectively.

9. The method of claim 8, wherein the information relating to the transmission time point is transmitted during a procedure of performing initial access to the base station by the at least one node.

10. A method performed by a terminal in wireless communication system, the method comprising:

receiving, from a base station, information relating to a transmission time point for time-synchronization of a wireless backhaul signal and a wireless access signal which are related to the base station; and transmitting, to the base station, the wireless access signal in accordance with the transmission time point, wherein at least one of a reference signal for the wireless access signal or a reference signal for the wireless backhaul signal is used to determine interference between the wireless backhaul signal and the wireless access signal, and wherein the reference signal for the wireless backhaul signal and the reference signal for the wireless access signal are located in sub-carriers of different indexes in a symbol of a same index.

11. The method of claim 10, wherein:

the information relating to the transmission time point comprises at least one among a value for the transmission time point, an index of the value for the transmission time point, a list of values for a plurality of transmission time points comprising the transmission time point, information relating to a current communication situation, information relating to a sequence in which a plurality of communication situations are repeated, and information relating to a period in which the plurality of communication situations are repeated;

the current communication situation corresponds to the transmission time point; and the plurality of communication situations correspond to the plurality of transmission time points, respectively.

12. The method of claim 10, wherein the information relating to the transmission time point is received during a procedure of performing initial access to the base station by the terminal.

13. A base station (BS) in a wireless communication system, the BS comprising:

a transceiver; and at least one processor operably coupled to the transceiver, and configured to:

transmit, to at least one node, information relating to a transmission time point for time-synchronization of a wireless backhaul signal and a wireless access signal which are related to the base station;

receive, from the at least one node, at least one signal transmitted in accordance with the transmission time point; and remove, from the at least one signal, interference between the wireless backhaul signal and the wireless access signal, wherein the at least one signal comprises at least one of the wireless backhaul signal and the wireless access signal, wherein the interference is determined based on at least one of a reference signal for the wireless backhaul signal or a reference signal for the wireless access signal, and wherein the reference signal for the wireless backhaul signal and the reference signal for the wireless access signal are located in sub-carriers of different indexes in a symbol of a same index.

14. The BS of claim 13, wherein:

the wireless backhaul signal is a downlink signal;

the at least one signal is the wireless access signal; and the transmission time point is a time point preceding a reference synchronization time point of the at least one node by a round-trip time of a signal between the at least one node and the base station.

15. The BS of claim 13, wherein:

the at least one node comprises another base station, the at least one signal comprises the wireless access signal and the wireless backhaul signal that is an uplink signal transmitted from the another base station;

the another base station receives an uplink wireless access signal from a terminal; and the transmission time point is a time point preceding a reference synchronization time point of the at least one node by a sum of a round-trip time of a signal between the at least one node and the base station and a time for switching a communication mode of the base station.

16. The BS of claim 15, wherein:

the uplink wireless access signal is transmitted in accordance with a transmission time point for time-synchronization of the uplink wireless access signal and the wireless backhaul signal; and a transmission time point of the uplink wireless access signal is a time point preceding a transmission time point of the wireless backhaul signal by a round-trip time of a signal between the terminal and the another base station.

17. The BS of claim 13, wherein:

the at least one signal is the wireless backhaul signal that is an uplink signal;

the wireless access signal is a downlink signal;

the at least one node receives an uplink wireless access signal from a terminal; and the transmission time point is a time point preceding a reference synchronization time point of the at least one node by a round-trip time of a signal between the at least one node and the base station.

18. The BS of claim 17, wherein:

the uplink wireless access signal is transmitted in accordance with a transmission time point for time-synchronization of the uplink wireless access signal and the wireless backhaul signal; and a transmission time point of the uplink wireless access signal is a time point preceding a transmission time point of the wireless backhaul signal by a round-trip time of a signal between the terminal and another base station.

19. The BS of claim 13, wherein:

the at least one node comprises another base station and a terminal;

the at least one signal comprises the wireless backhaul signal that is an uplink signal transmitted from the another base station and the wireless access signal transmitted from the terminal;

the another base station transmits a downlink wireless access signal;

a transmission time point of the wireless backhaul signal is a reference synchronization time point of the another base station; and a transmission time point of the wireless access signal is a time point delayed, by a round-trip time of a signal between the another base station and the base station, from a time point preceding a reference synchronization time point of the terminal by a round-trip time of a signal between the terminal and the base station.

* * * * *